(12) United States Patent
Park et al.

(10) Patent No.: US 6,332,266 B1
(45) Date of Patent: Dec. 25, 2001

(54) HEAT EXCHANGER ASSEMBLING APPARATUS

(75) Inventors: Myung-ho Park; Pyung-soo Kang; Jae-woo Kim; Kwang-hee Lee, all of Taejon (KR)

(73) Assignee: Halla Climate Control Corporation, Taejon (KR)

( * ) Notice: Subject to any disclaimer, the term of this patent is extended or adjusted under 35 U.S.C. 154(b) by 0 days.

(21) Appl. No.: 09/459,323

(22) Filed: Dec. 13, 1999

(30) Foreign Application Priority Data

Dec. 11, 1998 (KR) .................................................. 98-54525

(51) Int. Cl.[7] .................................................. B23P 15/26
(52) U.S. Cl. .............................. 29/726; 29/33 G; 29/783; 29/791
(58) Field of Search .................................... 29/726, 726.5, 29/727, 890.052, 33 G, 33 K, 791, 792, 793, 794, 783, 785, 786, 822, 823, 890.039, 890.046

(56) References Cited

U.S. PATENT DOCUMENTS

| | | | |
|---|---|---|---|
| 4,321,739 | * | 3/1982 | Martin et al. ........................... 29/726 |
| 4,637,132 | * | 1/1987 | Iwase et al. ............................ 29/726 |
| 4,698,904 | * | 10/1987 | Nozawa et al. ......................... 29/726 |
| 5,206,990 | * | 5/1993 | Wright ................................. 29/726 |
| 5,226,234 | * | 7/1993 | Beddome et al. .............. 29/890.039 |
| 5,426,847 | * | 6/1995 | Honma et al. ........................... 29/726 |
| 5,870,819 | * | 2/1999 | Maybee et al. ......................... 29/726 |
| 5,937,935 | * | 8/1999 | Schornhorst et al. .......... 29/890.039 |
| 5,966,808 | * | 10/1999 | Maybee et al. ......................... 29/727 |
| 5,996,217 | * | 12/1999 | Tokunaga et al. ...................... 29/726 |
| 6,003,224 | * | 12/1999 | Mcintosh et al. ....................... 29/726 |
| 6,067,704 | * | 5/2000 | Warren et al. .......................... 29/727 |

* cited by examiner

Primary Examiner—S. Thomas Hughes
Assistant Examiner—T. Nguyen
(74) Attorney, Agent, or Firm—Leydig, Voit, & Mayer, Ltd.

(57) ABSTRACT

A heat exchanger assembling apparatus includes a main conveyer for transferring a tray, at least one fin transfer conveyer and one molding plate transfer conveyer, installed at one side of the main conveyer to be parallel thereto and having a predetermined length, a plurality of fin plate assembling devices, installed between the fin transfer conveyer and the molding plate transfer conveyer in a lengthwise direction of the main conveyer, a fin molding device, connected to the fin transfer conveyer, for molding a fin, a plate molding device, installed at one side of the main conveyer, for manufacturing a plate and supplying the manufactured plate to the molding plate transfer conveyer, a fin molding plate supply device for supplying the fin molding plate assembly assembled by the fin plate assembling devices to the tray intermittently transferred by the main conveyer, an end plate assembly supply device, a special plate assembly supply device and a manifold plate assembly supply device, sequentially installed at an outlet portion of the main conveyer, for respectively supplying an end plate assembly, a special plate assembly and a manifold plate assembly to the tray, and a picking device, installed at an outlet portion of the main conveyer, for picking a heat exchanger assembly supported at the tray and loading the picked heat exchanger assembly in a cleaning tray.

35 Claims, 43 Drawing Sheets

HEAT EXCHANGER ASSEMBLING APPARATUS

BACKGROUND OF THE INVENTION

1. Field of the Invention

The present invention relates to an apparatus for assembling a heat exchanger, and more particularly, to an apparatus for assembling a drawn-cup type heat exchanger.

2. Description of the Related Art

FIG. 1 shows an example of a general drawn-cup type heat exchanger. As shown in the drawing, a drawn-cup type heat exchanger 10 includes tube assemblies 13 where a tank portion 11 is formed and a radiation path portion 12 through which heat exchange medium passes is formed, a fin 14 inserted between the tube assemblies 13, an end plate 15 disposed at both side portions of the heat exchanger, a special tube assembly 16 having a baffle for changing flow of heat, and a manifold tube assembly 18 where a manifold is installed, which are stacked and braze-combined.

To assemble the drawn-cup type heat exchanger 10 having the above structure, the fin 14 is inserted between two sheets of molding plates completely molded to form a fin plate assembly. An end plate assembly formed by inserting the fin 14 between the plate-fin assembly, the end plate 15 and a molding plate, a special plate assembly formed by inserting the fin 14 between a plate in which the tank portion 11 at one side thereof is blocked for baffle, and a manifold plate assembly to which a manifold is coupled, are stacked and braze-combined.

However, in manufacturing the drawn-cup type heat exchanger, each part constituting the heat exchanger is separately manufactured and the assembly and stacking thereof is manually performed using predetermined tools. Thus, numerous work steps are required during the manufacture of the heat exchanger, and productivity thereof is lowered.

SUMMARY OF THE INVENTION

To solve the above problems, it is an objective of the present invention to provide an apparatus for assembling a heat exchanger which enables manufacture and assembly of parts forming a drawn-cup type heat exchanger in a continuous process so that productivity in manufacturing the heat exchanger can be improved and a rate of defective products can be drastically reduced.

Accordingly, to achieve the above objective, there is provided a heat exchanger assembling apparatus comprising a main conveyer for transferring a tray, at least one fin transfer conveyer and one molding plate transfer conveyer, installed at one side of the main conveyer to be parallel thereto and having a predetermined length, a plurality of fin plate assembling devices, installed between the fin transfer conveyer and the molding plate transfer conveyer in a lengthwise direction of the main conveyer, a fin molding device, connected to the fin transfer conveyer, for molding a fin, a plate molding device, installed at one side of the main conveyer, for manufacturing a plate and supplying the manufactured plate to the molding plate transfer conveyer, a fin molding plate supply device for supplying the fin molding plate assembly assembled by the fin plate assembling devices to the tray intermittently transferred by the main conveyer, an end plate assembly supply device, a special plate assembly supply device and a manifold plate assembly supply device, sequentially installed at an outlet portion of the main conveyer, for respectively supplying an end plate assembly, a special plate assembly and a manifold plate assembly to the tray, and a picking device, installed at an outlet portion of the main conveyer, for picking a heat exchanger assembly supported at the tray and loading the picked heat exchanger assembly in a cleaning tray.

In the present invention, the heat exchanger assembling apparatus further comprises a cleaning device for cleaning a heat exchanger assembly completely picked, an installation device for installing the completely cleaned heat exchanger assembly, and a heat exchanger loading and unloading device for loading and unloading the heat exchanger installed at the brazing jig in and from the brazing tray.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
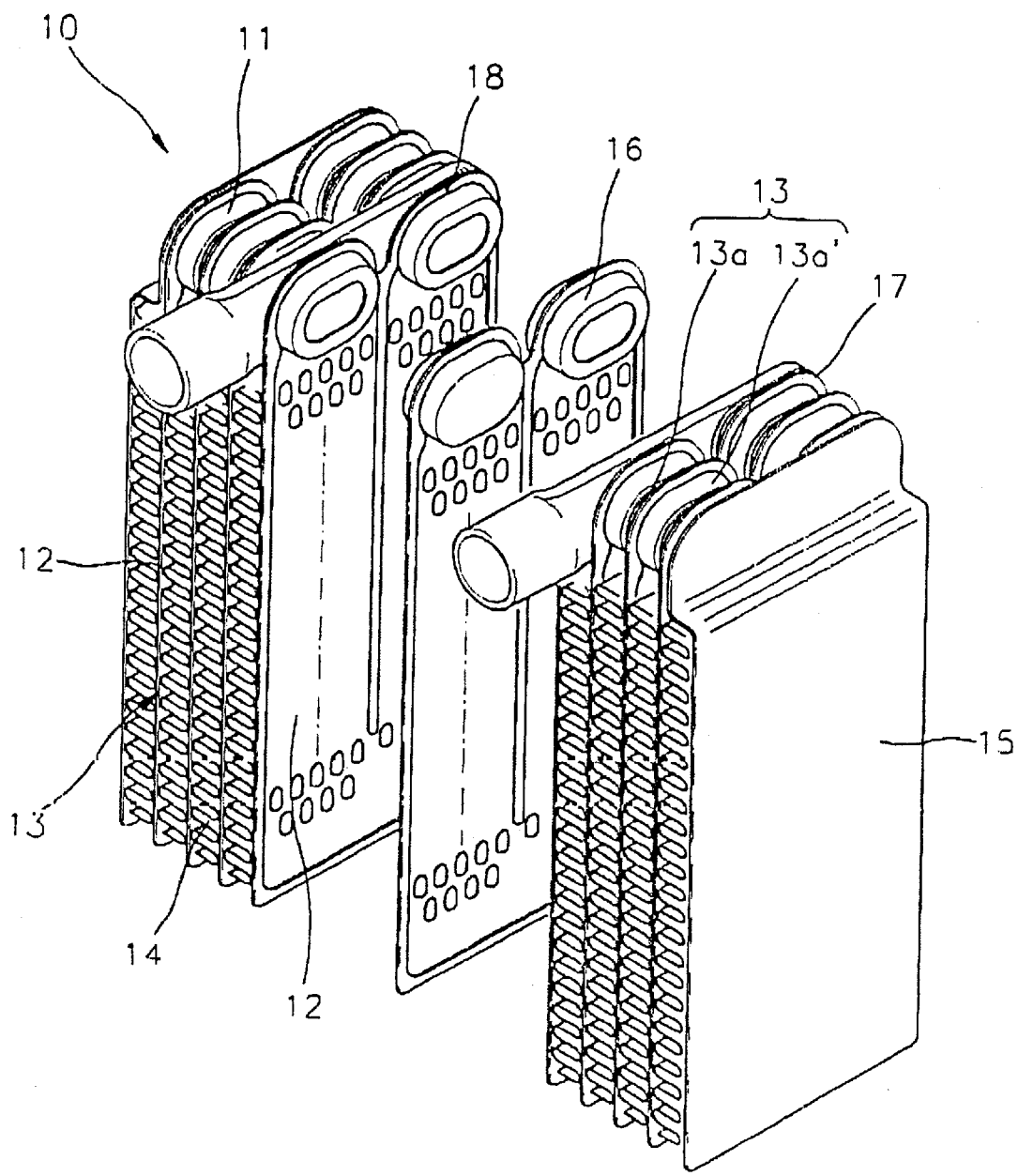
FIG. 1 is a perspective view showing a general heat exchanger.
Figure 2:
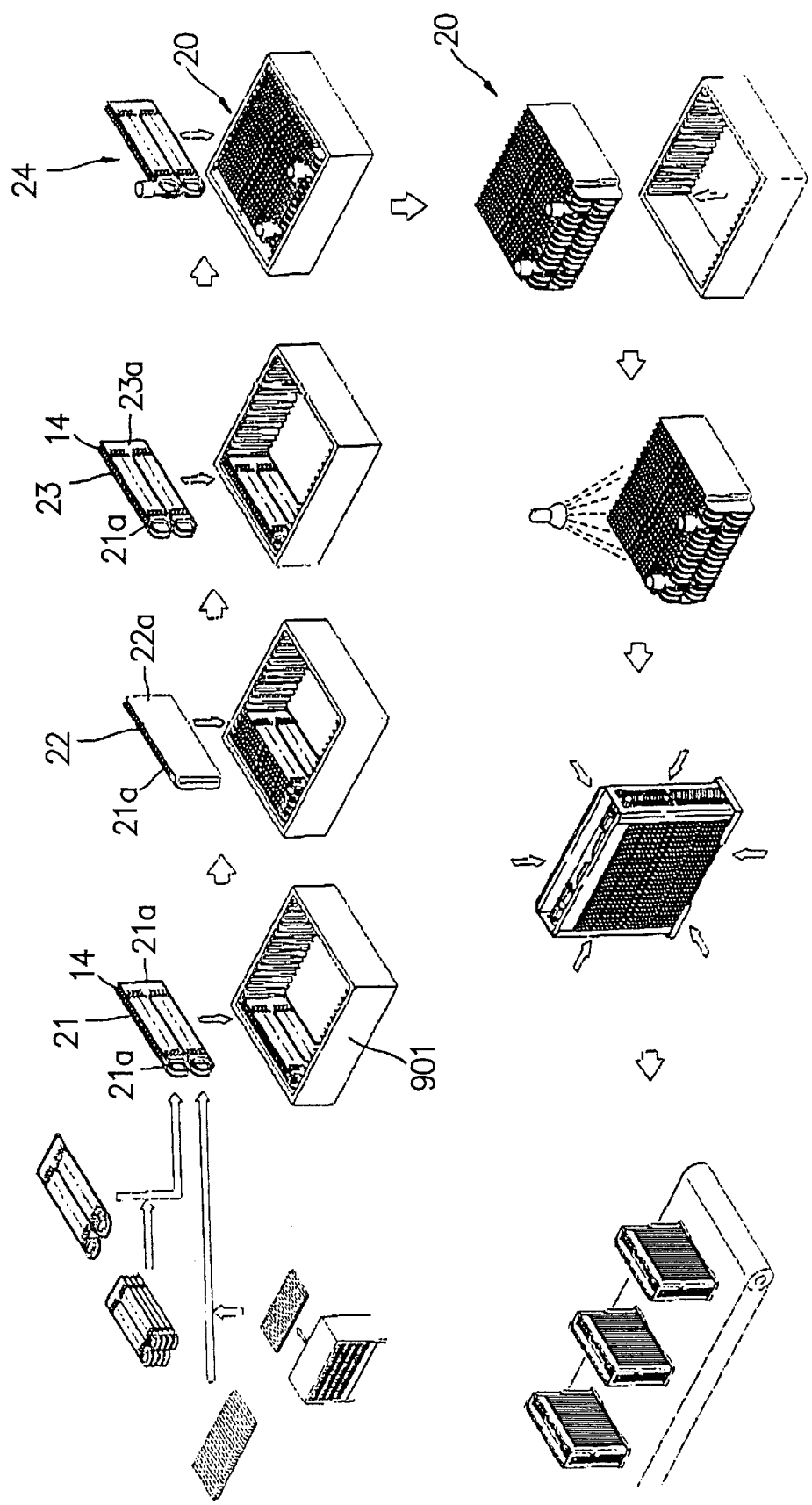
FIG. 2 is a view showing a flow of assembly of an apparatus for assembling a heat exchanger according to the present invention.
Figure 3:
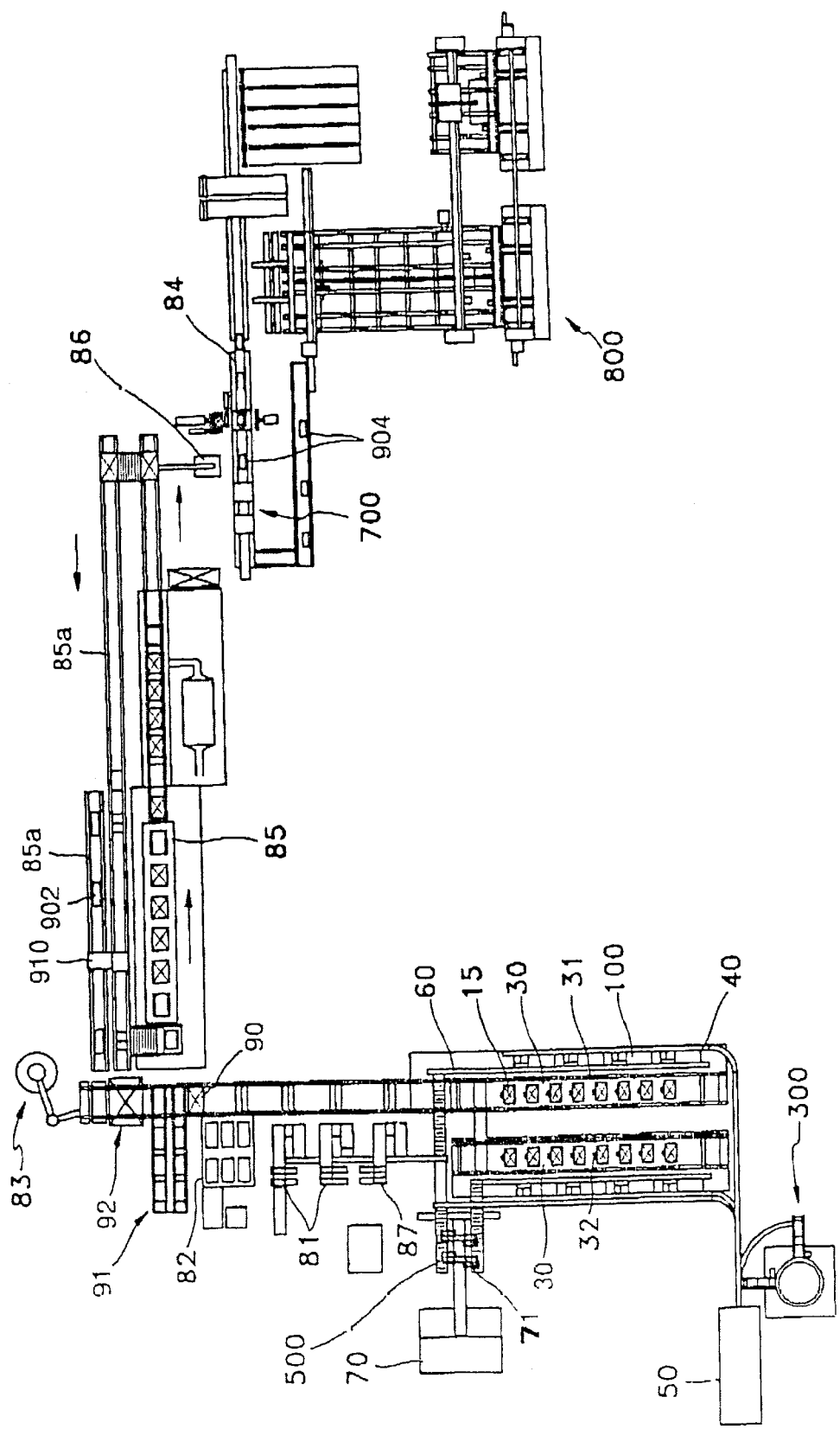
FIG. 3 is a plan view showing the apparatus for assembling a heat exchanger according to the present invention.

An apparatus for assembling a heat exchanger according to the present invention manufactures a molding plate and a fin forming a drawn-cup type heat exchanger and, after assembling and cleaning them, braze-combines them by putting the same in a brazing furnace. A preferred embodiment thereof is shown in FIGS. 2 and 3.

As shown in the drawings, the apparatus for assembling a heat exchanger according to the present invention includes main conveyers 30 installed parallel to each other for transferring a tray 901 for supporting a heat exchanger assembly 20 and interrupting the transfer of the tray 901 during stacking plate assemblies in each process, fin transfer conveyers 40 installed parallel to one side of each of the main conveyers 30 and having a predetermined length, and a fin molding device 50, installed at one side end portion of the fin transfer conveyer 40, for manufacturing a fin 14 to be supplied to the fin transfer conveyers 40.

Also, at least one molding plate transfer conveyer 60 is installed between the fin transfer conveyer 40 and the main conveyer 30 and connected to a plate molding device 70. A fin plate assembling device 100 is installed between the fin transfer conveyer 40 and the molding plate transfer conveyer 60 in the lengthwise direction thereof, for assembling the fin and the plate and also supplying an assembled fin plate assembly 21 to the tray 901. The plate molding device 70 is installed at one side of the main conveyer 30, for manufacturing and supplying molding plates to the molding plate transfer conveyer 60. Here, a fin delay supply device 300 is installed between the fin molding device 50 and the fin transfer conveyer 40, and a molding plate delay supply device 500 is installed between the plate molding device 70 and the plate transfer conveyer 60. A plate separation device 71 for separately supplying the molding plate supplied from the plate molding device 70 to the molding plate transfer conveyer 60 is installed between the transfer conveyers.

Also, a special plate assembly supply device 87 is installed at an outlet side of the main conveyer 30, for supplying a special plate assembly tube 22. An end plate assembly supply device 81 is for supplying an end plate assembly 23. A manifold assembly supply device 82 is installed adjacent to the outlet of the main conveyer 30, for supplying a manifold plate assembly 24, a test apparatus 90 is installed at the outlet side of the main conveyer 30, for checking whether the heat exchanger assembly 20 loaded in the tray 901 is normally assembled. A bypass conveyer (not shown) is for picking a defective heat exchanger assembly according to the determination of the test apparatus 90. A picking device 83 is for picking the heat exchanger assembly 20 supported in the tray 901 and loading the same in a cleaning tray.

A cleaning device 85 for loading the heat exchanger assembly 20 picked from the tray 901 in a cleaning tray 902 and cleaning the heat exchanger assembly 20 is installed near the picking device 83. A conveyer 85a for supplying an empty cleaning tray 902 is installed at one side of the cleaning device 85. A cleaning tray adjustment device 910 for adjusting the cleaning tray according to the type of the heat exchanger assembly is installed at one side of the conveyer 85a.

A supply conveyer 84 for supplying a completely assembled heat exchanger assembly to the brazing furnace is installed at an outlet side of the cleaning device 85. A manipulator 86 for picking the heat exchanger assembly 20 from the cleaning tray 902 picked from the cleaning device 85 and installing the picked heat exchanger assembly at a brazing jig 904 transferred by the supply conveyer 84, is installed at the outlet side of the cleaning device 85.

A clamping device 700 for fixing the heat exchanger assembly 20 installed at the brazing jig 904 to a jig in a pressed state is installed at the supply conveyer 84. A loading and unloading device 800 of the heat exchanger assembly for loading and unloading the heat exchanger assembly 20 installed at the brazing jig 904 in and from a brazing tray 903 for brazing is installed at an outlet side of the supply conveyer 84.

In a description for each of the apparatuses for assembling a heat exchanger according to the present invention having the above structure, a common chain conveyer which intermittently transfers the tray 901 supporting the heat exchanger assemblies 20 is used as the main conveyers 30. A support device 32 for interrupting transfer of the tray 901 until the plate assemblies are completed loaded in the tray 901, is installed at a frame 31 of the main conveyer 30 at the position corresponding to the fin plate assembling device 100. Although not shown in detail in the drawing, the support device 32 includes a support plate which is supported at the upper portion of the main conveyer 30 until the fin molding plate assembly 21 is loaded in the tray 901, and a tray transfer device for elevating the tray 901 transferred by the main conveyer 30 to be supported at a supporter or return the tray 901 to the main conveyer from the supporter.

The fin transfer conveyers 40 are for transferring the fins molded by the fin molding device 50 to the fin plate assembling device 100, and a common belt conveyer is used therefor.

The fin delay supply device 300 is for stacking a predetermined amount of the fins 14 supplied from the fin molding device 50 and supplying the fins 14 while a fin molding material is loaded in the fin molding device 50. The fin delay supply device 300 is connected to the fin transfer conveyer 40 connected to a fin mill apparatus which is the fin molding device 50 for manufacturing the fin 14 by molding a metal plate in a winding roll, for example.

Figure 4:
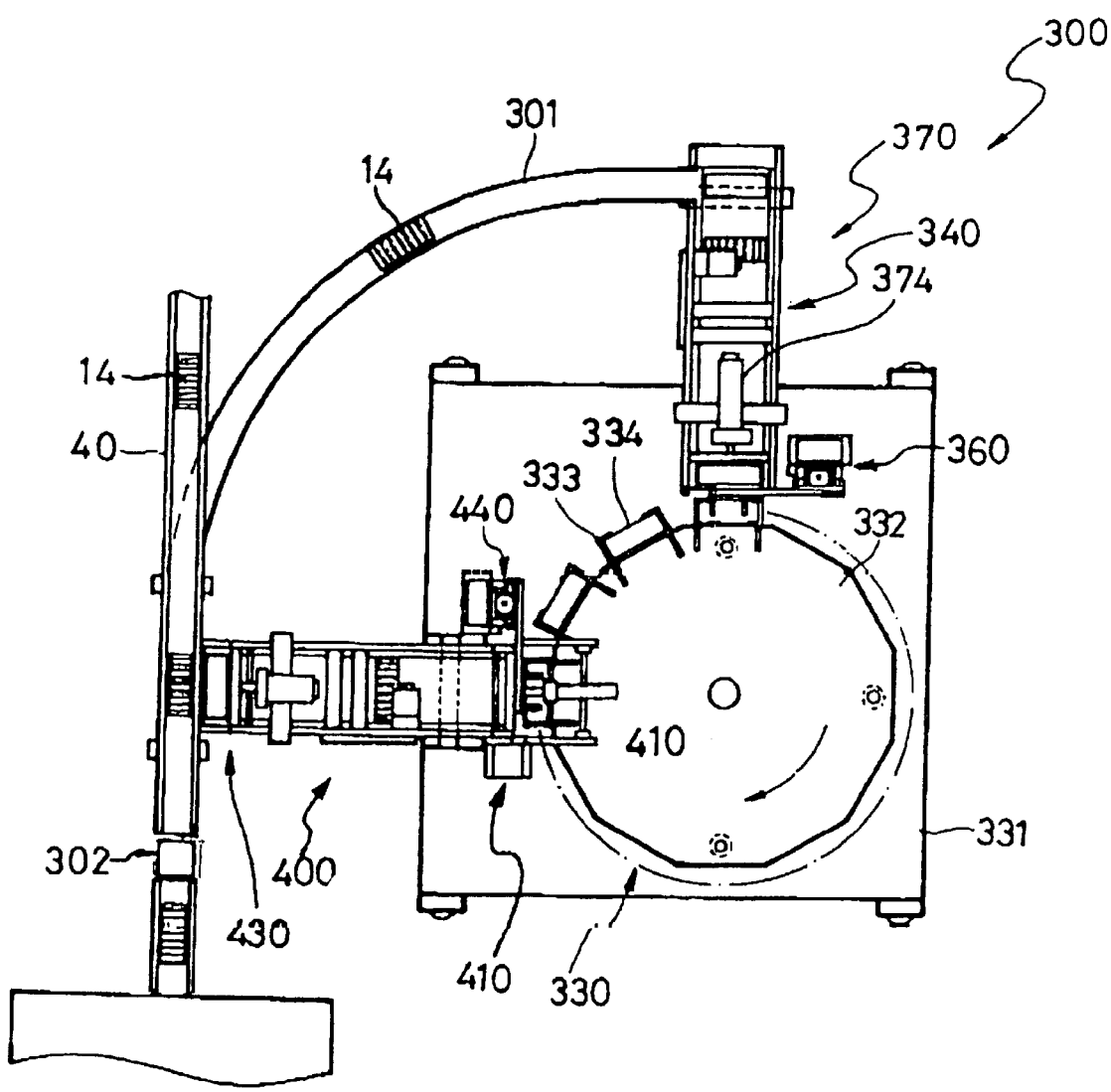
FIG. 4 is a plan view showing a fin delay supply apparatus according to the present invention.
Figure 5:
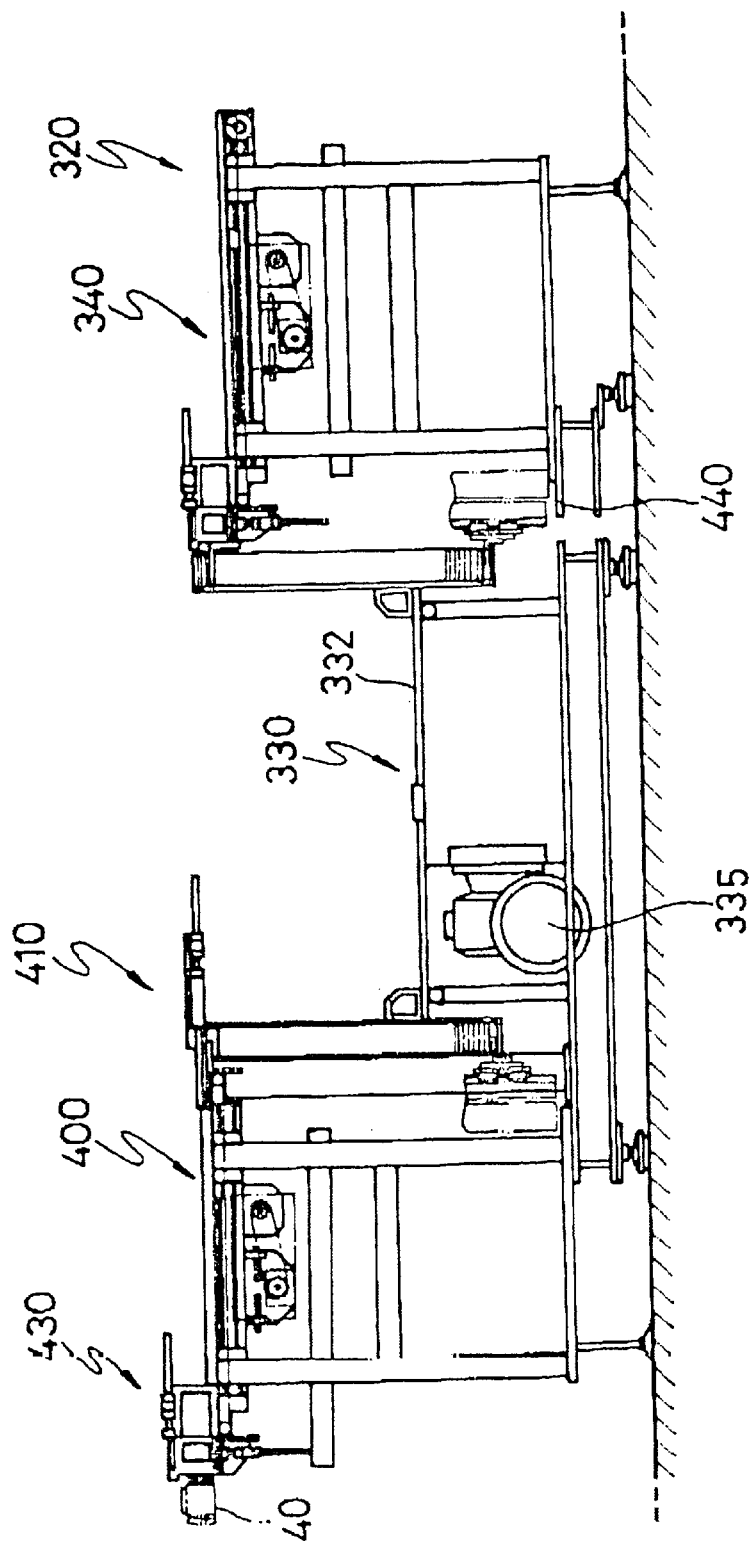
FIG. 5 is a side view showing the fin delay supply apparatus according to the present invention.
Figure 11:
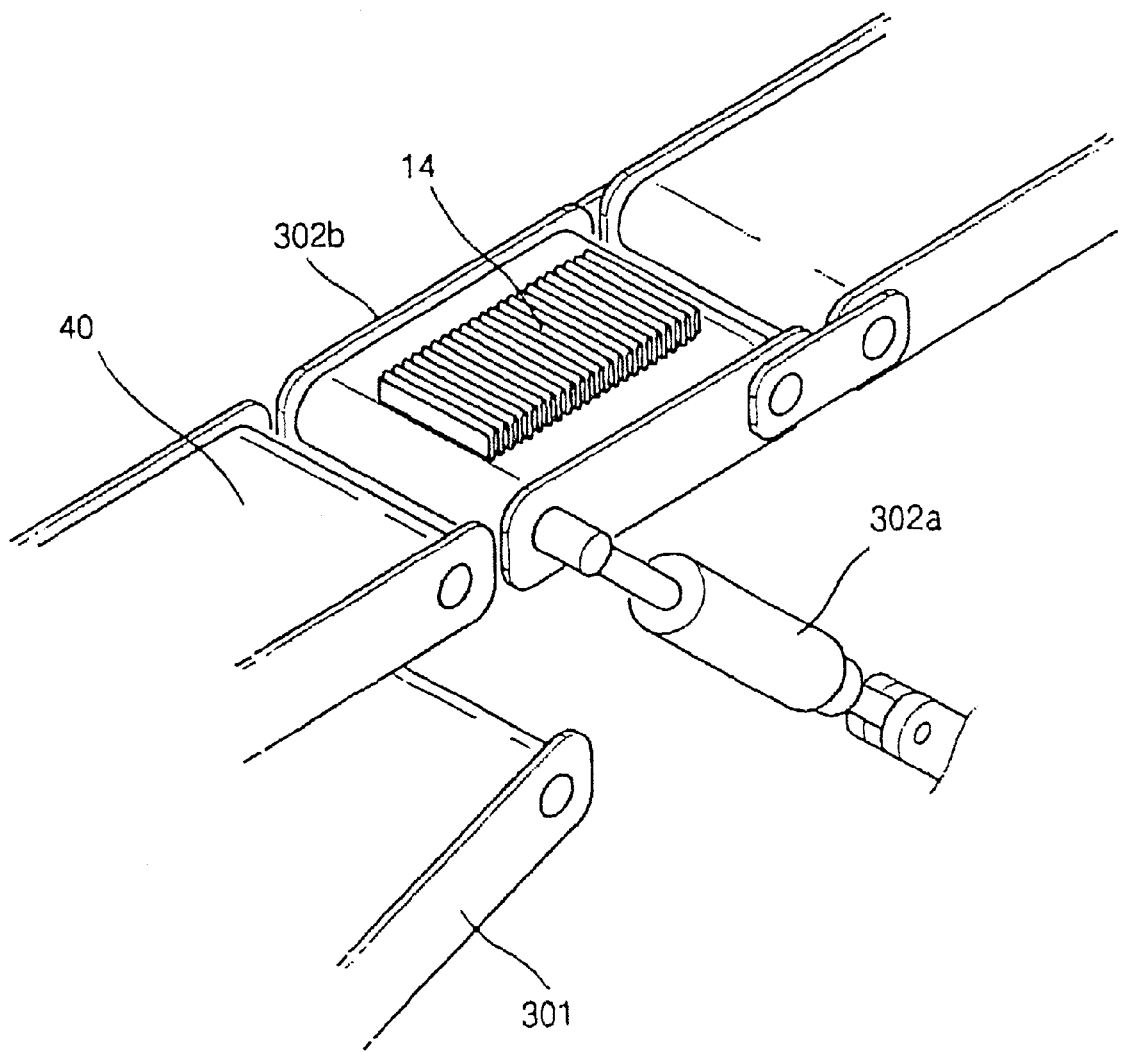
FIG. 11 is a perspective view showing a coupling device.

FIGS. 4 and 11 show a preferred embodiment of the fin delay support device 300. As shown in the drawings, the fin delay supply device 300 includes a fin supply line 301 for supplying the fin 14 from the fin transfer conveyer 40, a connection device 302 for selectively connecting the fin supply line 301 to the fin transfer conveyer 40, a fin loading apparatus 310 connected to the connection device 302, a fin loading portion 330 where the fin 14 loaded by the fin loading apparatus 310 is loaded, and a fin supply device 400 for supplying the fin 14 loaded in the fin loading portion 330 to the fin transfer conveyer 40.

The fin loading portion 330 is for loading a plurality of fins 14, including a base plate 331, a loading portion frame 332 rotatably installed with respect to the base plate 331, a fin receiving case 334 supported by a plurality of receiving case supporters 333 installed at the loading portion frame 332, and a loading portion frame driving device 335 for rotating the loading portion frame 332. Here, the edge of the loading portion frame 332 is formed to be circular or polygonal, and the receiving case supporters 333 are plurally installed to be spaced at predetermined intervals.

Figure 6:
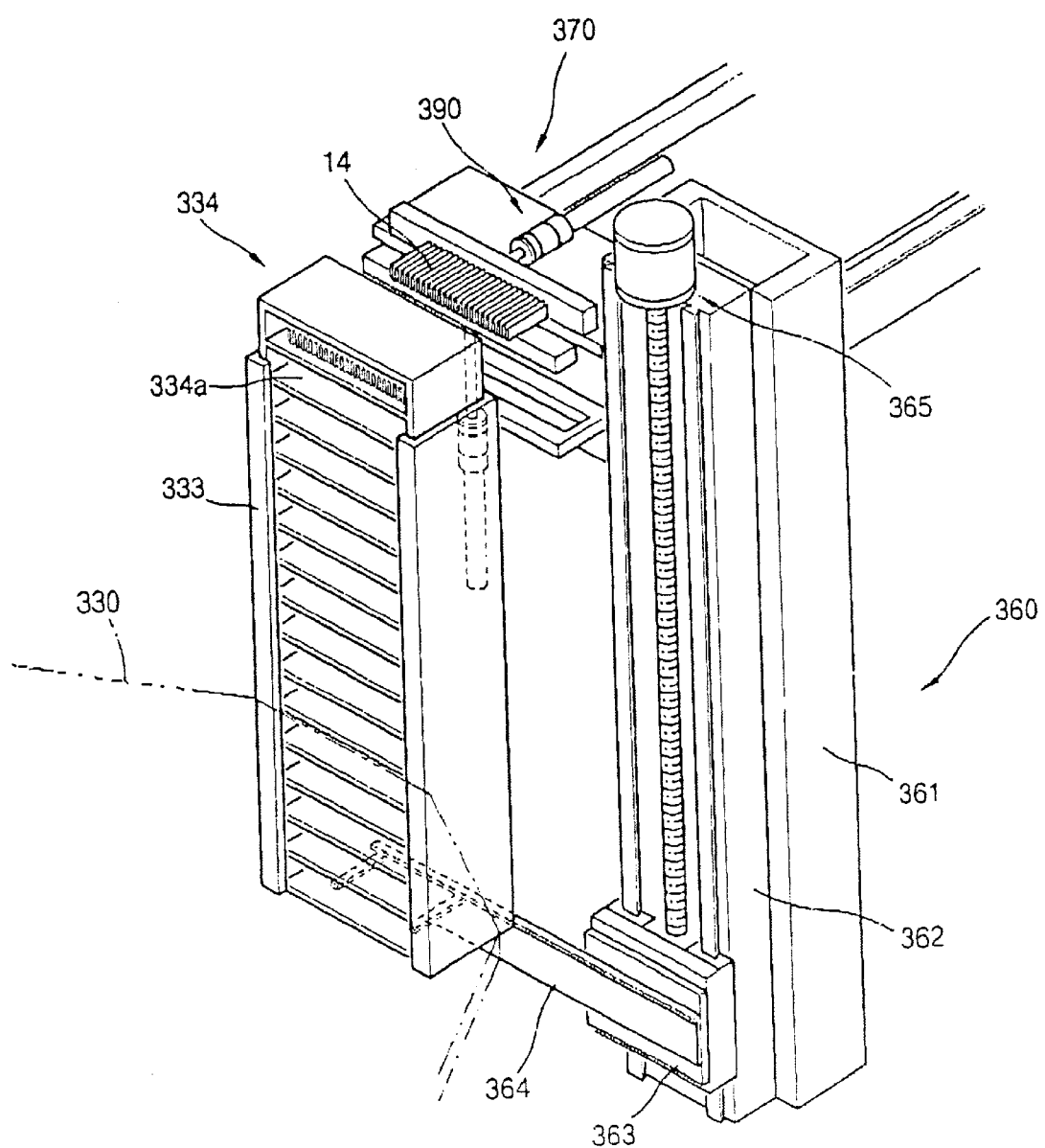
FIG. 6 is a perspective view showing a state in which a receiving case is supplied with a fin.

Referring to FIG. 6, the fin receiving case 334 has a plurality of receiving portions 334a for accommodating the fin 14, and is installed to be capable of sliding at the receiving case supporters 333 which are plurally installed at the outer circumferential surface of the loading portion frame 332 at predetermined intervals.

Figure 7:
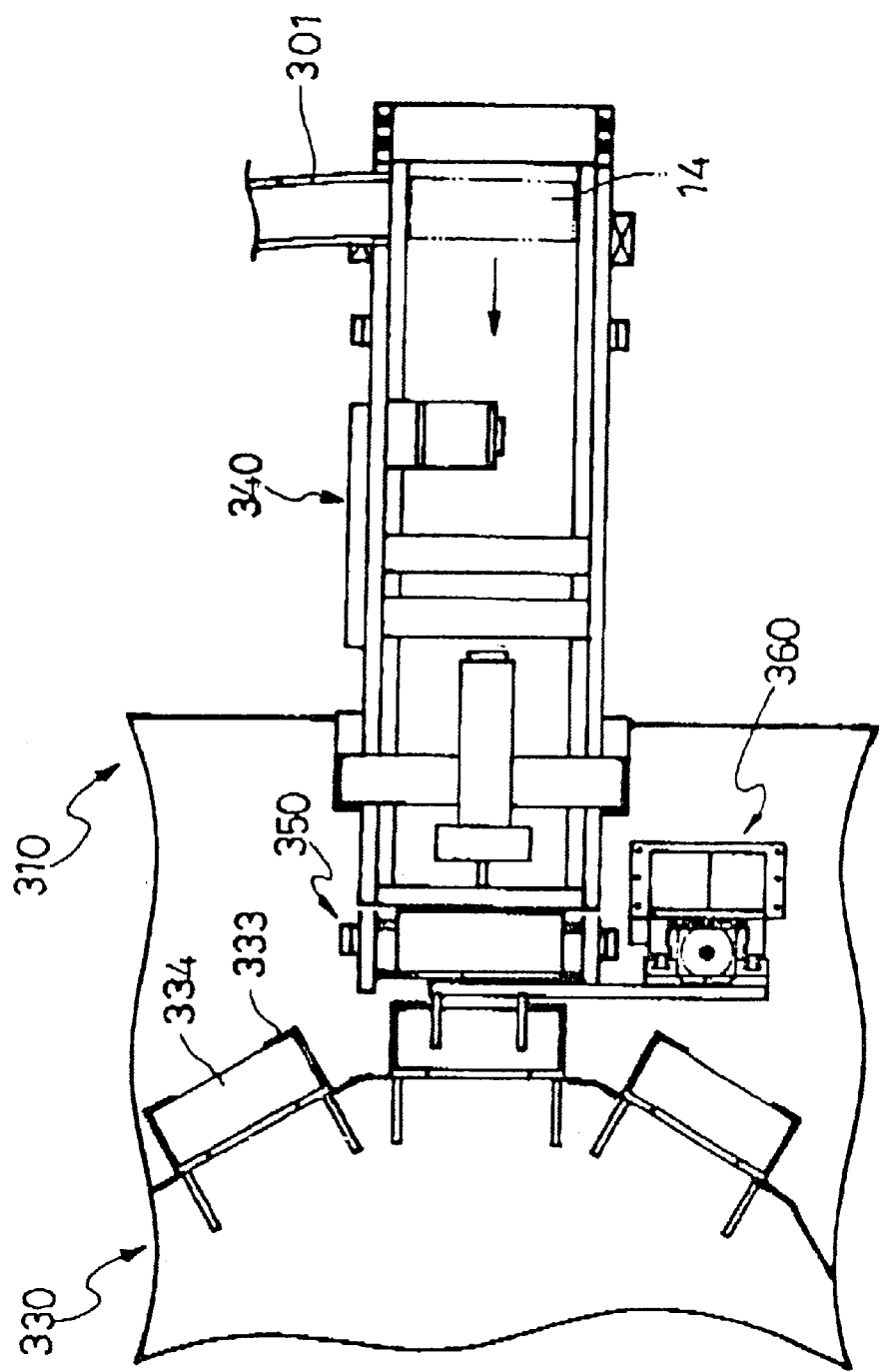
FIGS. 7 and 8 are a plan view and a side view of a fine loading apparatus, respectively.
Figure 8:
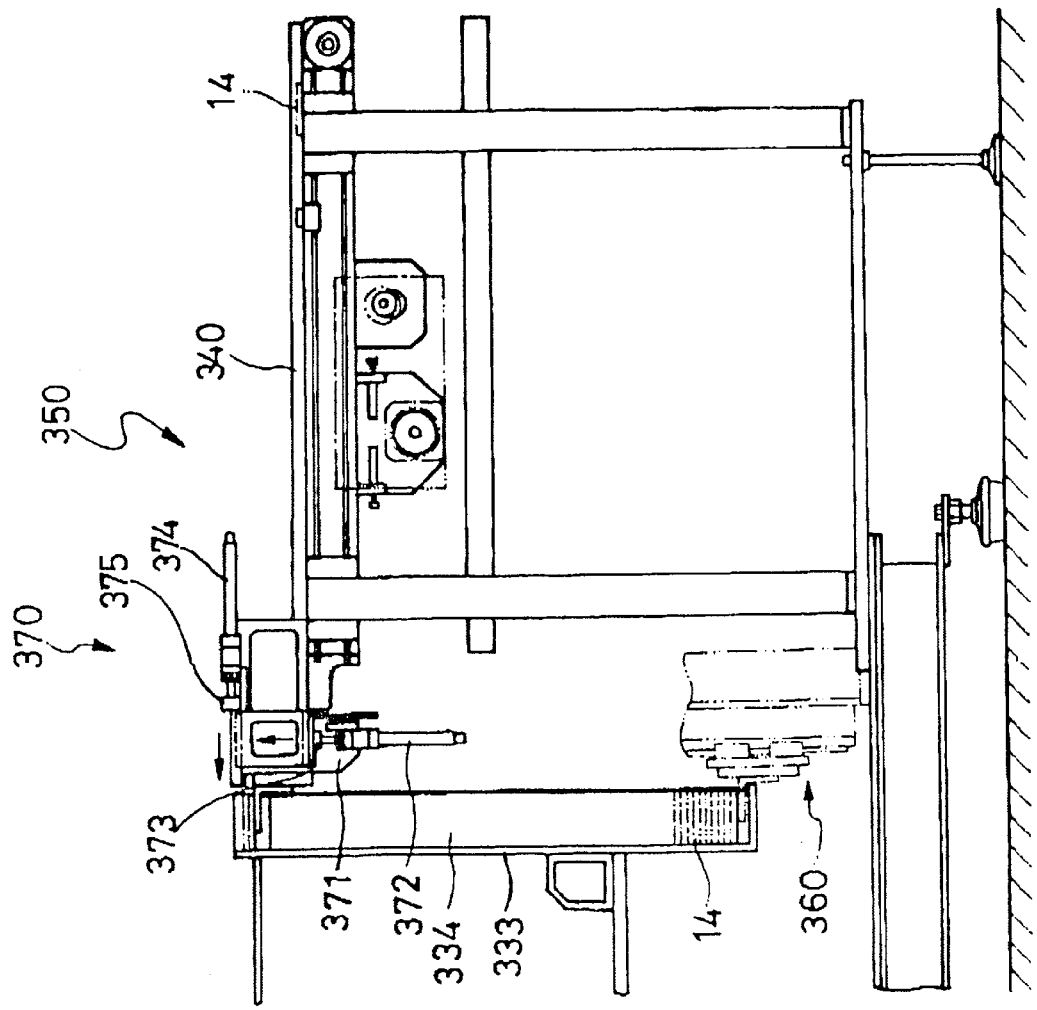

FIGS. 7 and 8 are a plan view and a side view showing the fin loading apparatus 310. Referring to the drawings, the fin loading apparatus 310 is for loading the fin 14 supplied to the fin supply line 301 in each of the receiving portions 334a of the fin receiving case 334, including a loading conveyer 340 connected to the fin supply line 301 and a fin receiving apparatus 350 installed at an end portion of the loading conveyer 340. A belt conveyer is used as the loading conveyer 340. The fin receiving apparatus 350 is for accommodating the fin 14 in the fin receiving case 334, including a fin receiving case transfer device 360 for elevating the fin receiving case 334 with respect to the receiving case supporters 333, and a first push device 370 installed at an outlet side of the loading conveyer 340 for transferring the fin 14 transferred by the loading conveyer 340 to the receiving portion 334a of the fin receiving case 334.

FIGS. 6 and 7 show a first receiving case transfer device 360. As shown in the drawings, the first receiving case transfer device 360 includes a fist supporter 361 installed to be separated a predetermined distance from the outlet side of the loading conveyer 340, a first guide portion 362 installed with respect to the first supporter 361, a first transfer member 363 moving up and down along the first guide portion 362, a fist arm 364 installed at the first transfer member 363 for locating the fin receiving case 334 disposed at the outlet side of the loading conveyer 340 at the lower portion of the receiving case supporter 333 according to the rotation of the loading frame 332, and a first actuator 365 installed at the first supporter 361 for elevating the first transfer member 363. Here, as the first actuator 365, a linear motor, a ball screw and a cylinder can be used to move the first transfer member 363 up and down.

The first push device 370, as shown in FIGS. 7 and 8, includes a cylinder 372 vertically installed by a bracket 371 at the outlet side of the loading conveyer 340, an elevation plate 373 installed at a rod of the cylinder 372, and a cylinder 374 installed at the outlet side of the loading conveyer 340 for transferring the fin 14 elevated by the elevation plate 373 to the receiving portion 334a. The cylinders 372 and 374 make a right angle and a pusher 375 is installed at a rod of the cylinder 374. Although not shown, a guide member for guiding the elevation plate 373 is installed at both sides of the elevation plate 373.

Referring to FIGS. 4, 5, 9 and 10, the fin supply device 400 is for supplying the fin 14 loaded in the fin loading portion 330 to the fin transfer conveyer 40, and includes a fin picking device 410 for picking the fin 14 from the receiving portion 334a, a supply conveyer 420 for transmitting the picked fin 14 toward the fin transfer conveyer 40, and a second push device 430 for transferring the fin 14 transferred by the supply conveyer 420 to the transfer conveyer 40.

The fin picking device 410 is for sequentially discharging the fin 14 accommodated in the fin receiving case 334 supported at the loading frame 332, and includes a second receiving case transfer device 440 for elevating the fin receiving case 330 disposed at an inlet of the supply conveyer 420, and a picking portion 450 installed at the inlet side of the supply conveyer 420 for transferring the fin 14 accommodated in the receiving portions 334a of the fin receiving case 330 to the supply conveyer 420. As the second receiving case transfer device 440 has the same structure as that of the first receiving case transfer device 360, a detailed description thereof will be omitted.

The picking portion 450 includes a guide plate 452 supported at the bracket 451 installed at the inlet of the supply conveyer 420 and having an opening 452a formed therein, through which the fin receiving case 330 is elevated, and a cylinder 453 installed at an end portion of the guide plate 452, and a pusher 454 installed at a rod of the third cylinder 453. Here, the supply conveyer 420 is a belt conveyer.

The second push device 430 includes a cylinder 432 vertically installed at a bracket 431 at the outlet of the supply conveyer 420, an elevation plate 433 installed at a rod of the fourth cylinder 432, and a cylinder 434 installed at the outlet of the supply conveyer 420 for transferring the fin 14 elevated by the elevation plate 433, in which a pusher 434a is installed at a rod thereof.

The fin supply line 301, as shown in FIGS. 4 and 11, connects the fin transfer conveyer 40 and an inlet side of the loading conveyer 340. The connection device 302 for allowing the fin 14 to be selectively supplied to the fin transfer conveyer 40 and the fin supply line 301 is provided at the inlet sides of the fin transfer conveyer 40 and the fin supply line 301. The connection device 302 forms a part of the fin transfer conveyer 40 and includes a pivot conveyer 302b pivoting by a cylinder 302a. Accordingly, when the pivot conveyer 302b is disposed to be horizontally, the fin 14 is moved toward the fin transfer conveyer 40 and, when the pivot conveyer 302b pivots by the cylinder 302a, the fin 14 is moved toward the fin supply line 301 from the fin transfer conveyer 40.

The plate molding device 70 forms a molding plate by consecutively press-forming a rolled plate, in which a presser having a mold for forming a molding plate is used.

Figure 12A:
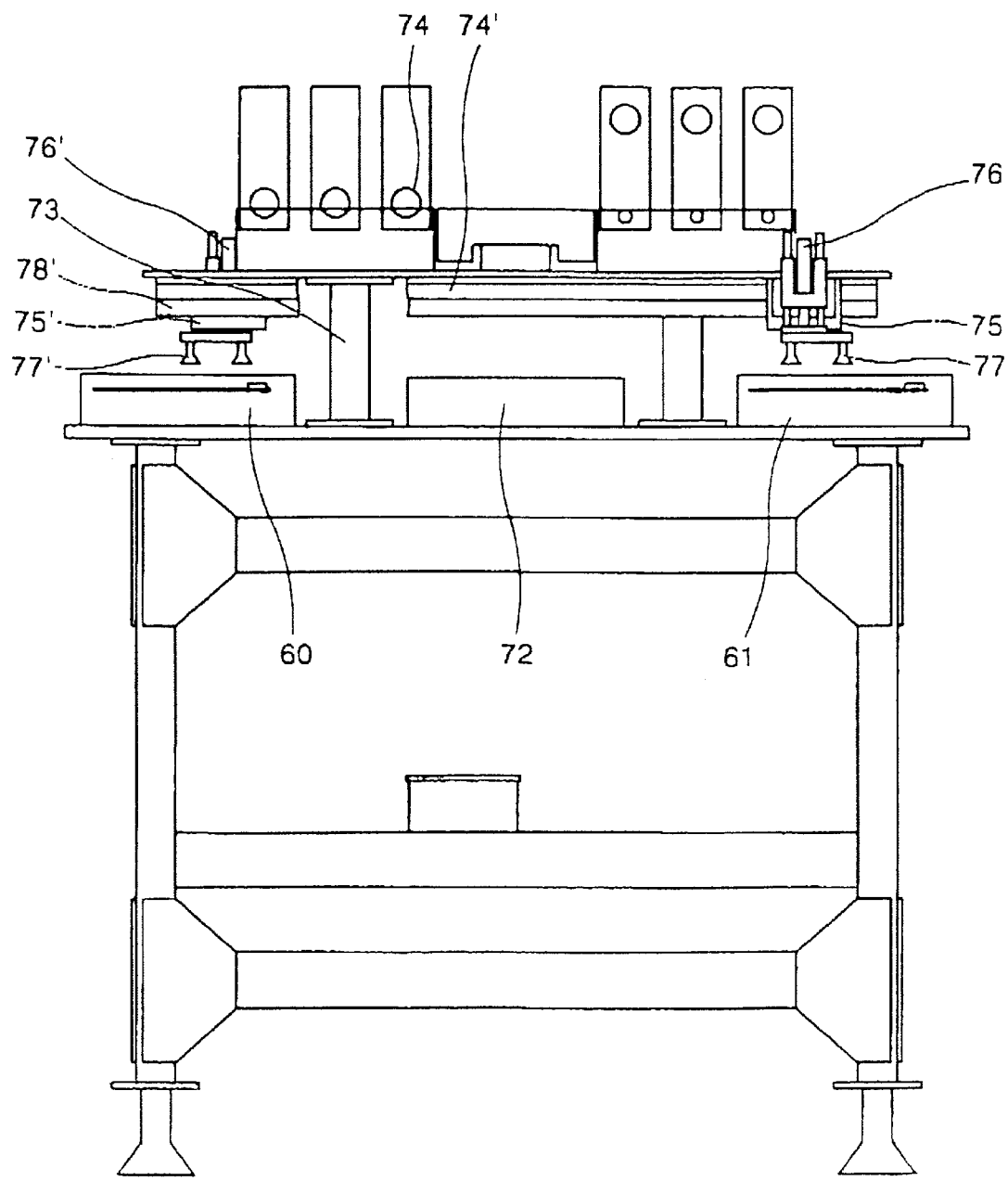
FIGS. 12A and 12B are a front view and a side view of a plate separation device.
Figure 12B:
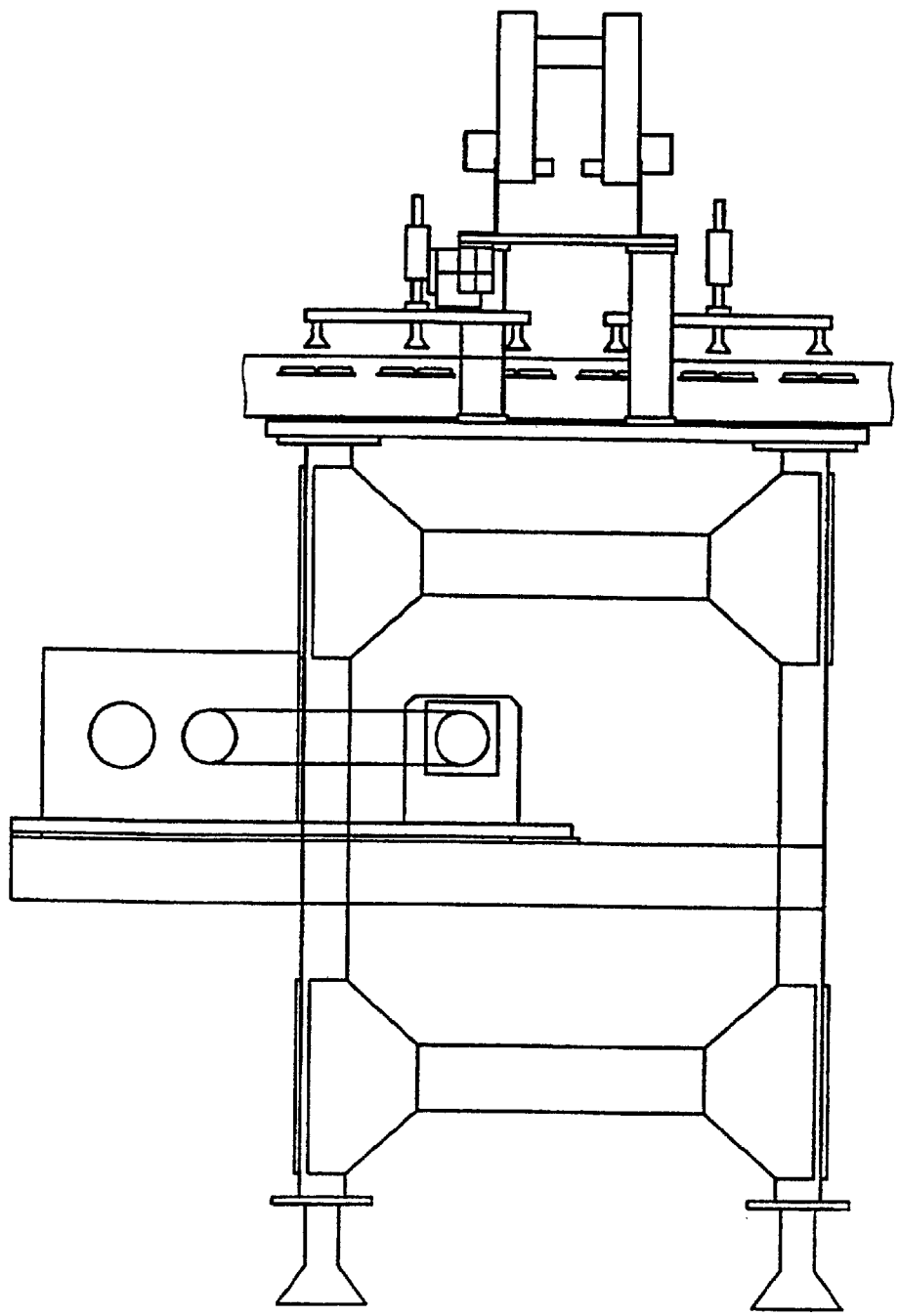

The molding plate separation device 71 is for supplying the molding plate transferred by the conveyer 72 from the plate molding device 70 to the molding plate transfer conveyer 60 disposed at both sides thereof, and a preferred embodiment thereof is shown in FIGS. 12A and 12B.

As shown in the drawings, a support 73 is installed at the frame where the molding plate transfer conveyer 60 is installed, and a pair of guide rails 74 and 74' crossing the conveyer 72 and the plate transfer conveyer 60 are installed at the support 73. Transfer blocks 75 and 75' are installed at the respective guide rails 74 and 74' to be capable of sliding, and cylinders 76 and 76' are vertically installed at the transfer blocks 75 and 75', respectivley. At least one absorbing member 77 and 77' for absorbing the molding plate is installed at a rod of each cylinder 76 and 76'. The transfer blocks 75 and 75' reciprocate along the guide rail 74 and 74' by rod-less cylinders 78 and 78' installed at the guide rail 74.

The molding plate delay supply device 500 stacks the molding plates supplied from the molding plate transfer conveyer 60 and supplies the molding plate when the operation is not smooth due to replacement of material supplied to the plate molding device 70 or malfunction. A preferred embodiment thereof is shown in FIGS. 12 through 16.

Referring to the drawings, the molding plate delay supply device 500 includes a base plate 501, a plate discharging apparatus 510 for stacking predetermined molding plates 13*a* or 13*b* from the upper portion of the base plate 501 and discharging the stacked plates as necessary, and a driving apparatus 600 for operating the plate discharging apparatus 510.

The molding plate delay supply apparatus according to the present invention having the above structure will be described in detail as follows.

Figure 14:
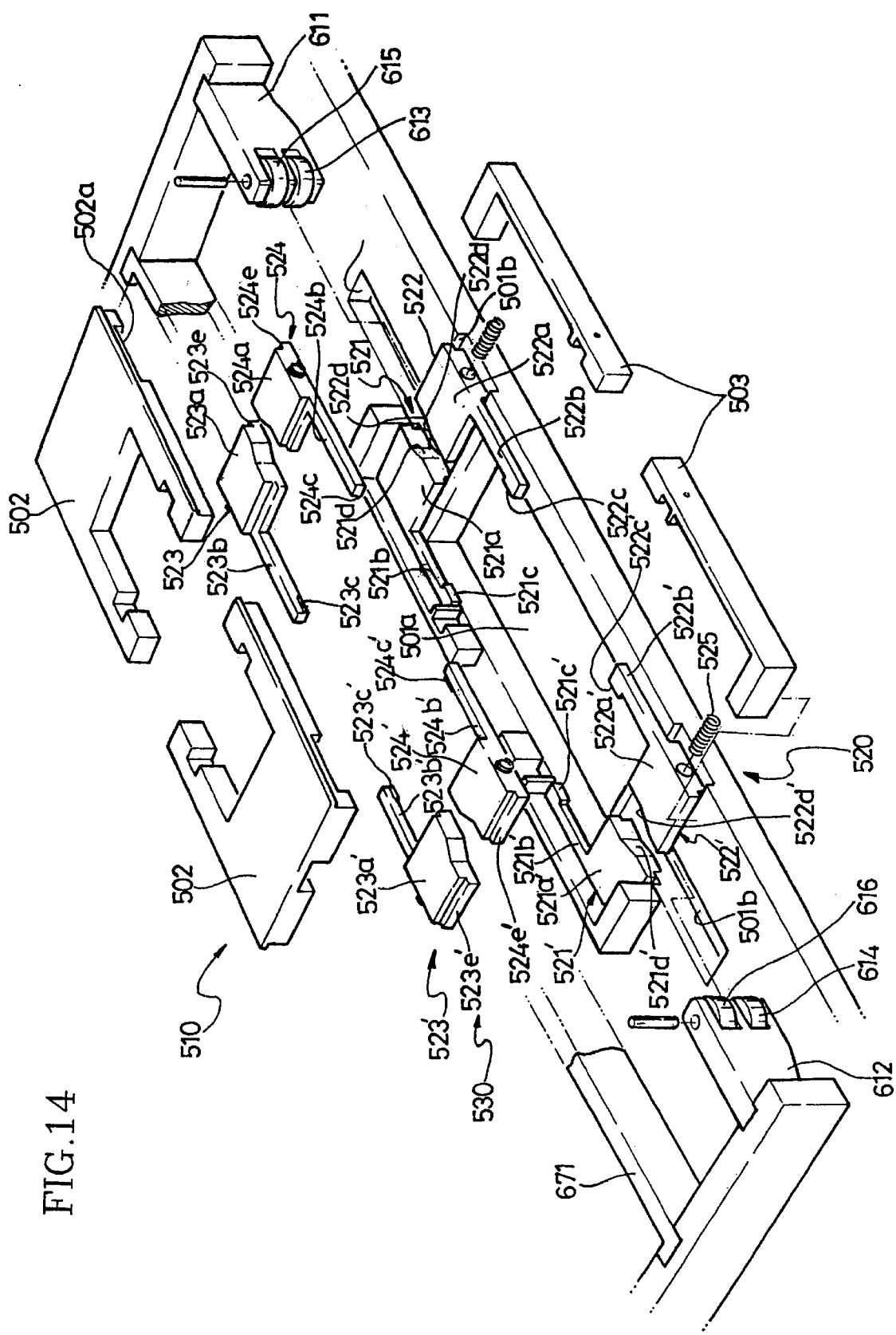
FIG. 14 is an exploded perspective view showing a discharging device of a plate delay supply apparatus.
Figure 15:
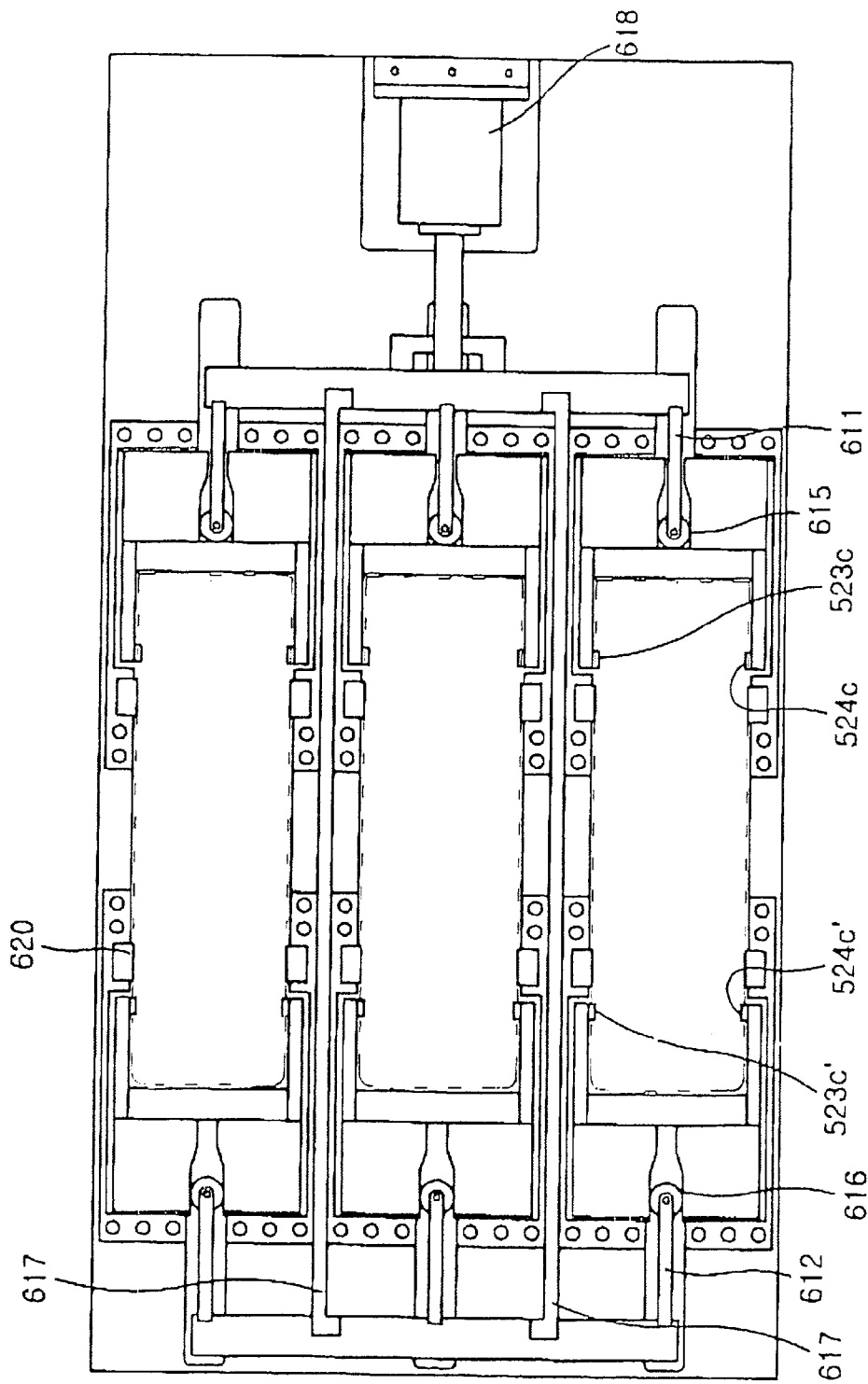
FIG. 15 is a plan view of the plate delay supply apparatus.
Figure 16:
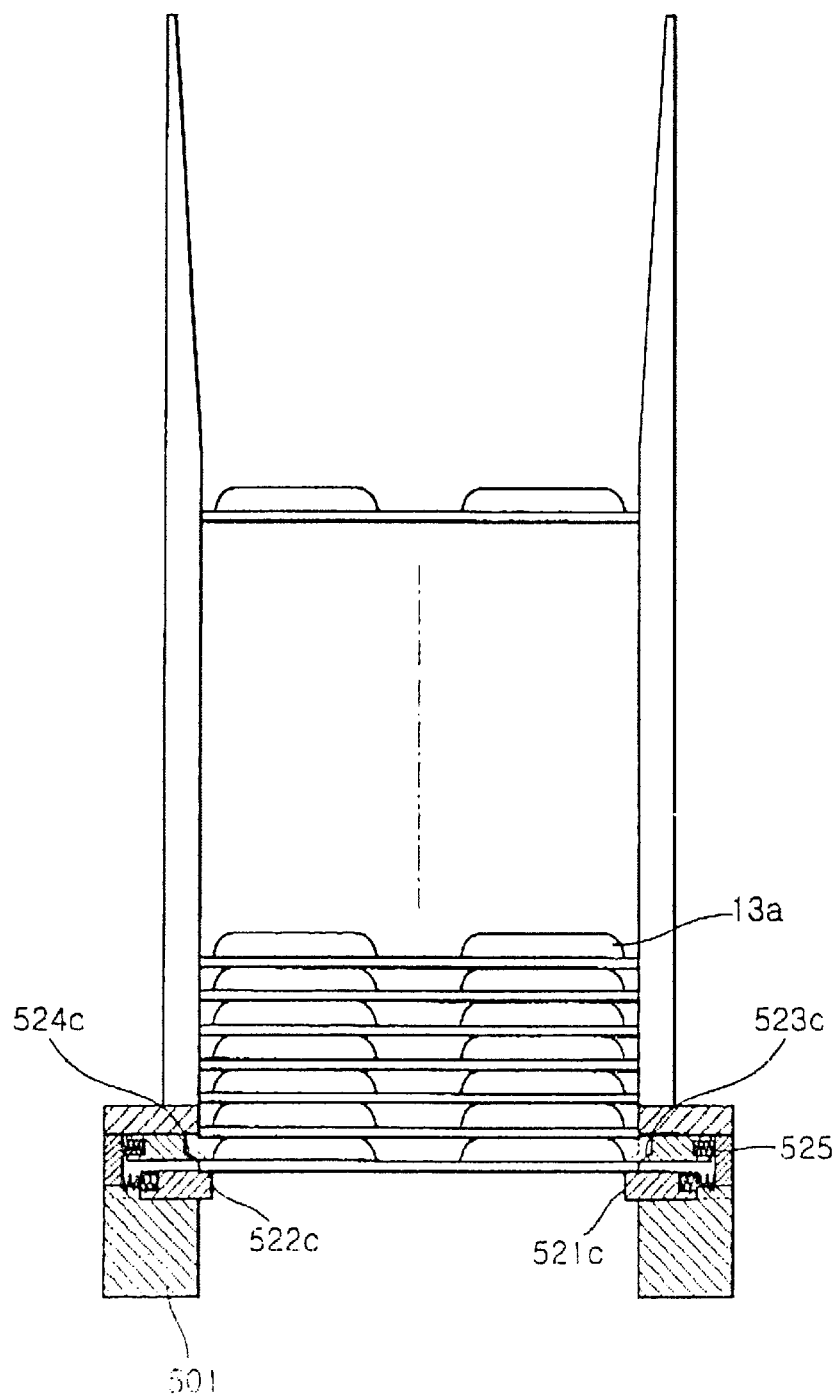
FIG. 16 is a sectional view showing the operation of the plate delay supply apparatus.

FIG. 14 is a perspective view showing the plate discharging apparatus 510 and a sliding operation apparatus by excerpting the same. FIG. 15 is a please view showing the molding plate delay supply apparatus 510 and FIG. 16 is a sectional view thereof. Referring to the drawings, at least one set of the plate discharging apparatus 510 is installed on the base plate 501, and the plate discharging apparatus 510 includes a first accommodating portion 520 for supporting the edge of the molding plate 13*a* disposed at the lowermost portion of the stacked molding plates, and a second accommodating portion 530 for supporting the edge of the second molding plate 13*a* from the bottom of the stacked molding plates. The first and second accommodating portions 520 and 530 have a stacked structure.

The first accommodating portion 520 of the plate discharging apparatus 510 includes pairs of first and second lower separators 521 and 522, and the third and fourth lower separators 521' and 522' respectively disposed at both sides of a molding plate discharging opening 501*a* formed in the base plate 501 to be separated a predetermined distance and capable of sliding in a direction facing each other.

The fist and second lower separators 521 and 522 and the third and fourth separators 521' and 522' include first and second lower body portions 521*a* and 522*a*, and third and fourth lower body portions 521*a'* and 522*a'*, respectively. First and second lower arm portions 521*b* and 522*b*, extended from one side thereof and where the first and second lower protrusions 521*c* and 522*c* for supporting the edge of one side of the molding plate 13*a* are formed, is formed at the first and second lower body portions 521*a* and 522*a*. Third and fourth lower arm portions 521*b'* and 522*b'*, extended from one side thereof and where the third and fourth lower protrusions 521*c'* and 522*c'* for supporting the edge of the other side of the molding plate 13*a* are formed, is formed at the third and fourth lower body portions 521*a'* and 522*a'*.

First and second lower inclined surfaces 521*d* and 522*d* are formed to be inclined a predetermined angle in a direction spreading with respect to the first and second lower arm portions 521*b* and 522*b* at the side surfaces of the first and second lower body portions 521*a* and 522*a* facing each other. The distance between the first and second lower inclined surfaces 521*d* and 522*d* gradually decreases from the portion where the first and second lower arm portions 521*b* and 522*b* are formed. Third and fourth lower inclined surfaces 521*d'* and 522*d'* are formed to be inclined a predetermined angle at the side surfaces of the third and fourth lower body portions 521*a'* and 522*a'* facing each other. The distance between the third and fourth lower inclined surfaces 521*d'* and 522*d'* gradually increases from the portion where the third and fourth lower arm portions 521*b'* and 522*b'* are formed.

The second accommodating portion 530 includes first and second upper separators 523 and 524 stacked with the first and second lower separators 521 and 522 and third and fourth upper separators 523' and 524' stacked with the third and fourth lower separators 521' and 522'. The first, second, third and fourth upper separators 523, 524, 523' and 524' have the same structures as those of the first, second, third and fourth lower separators 521, 522, 521' and 522', respectively. The first and second lower inclined surfaces 521*d* and 522*d* formed at the first and second lower body portions 521*a* and 522*a* of the first and second lower separators 521 and 522 are formed in a direction opposite to that of the first and second upper inclined surfaces 523*d* and 524 formed at the first and second upper body portions 523*a* and 524*a* of the first and second upper separators 523 and 524. Also, the third and fourth lower inclined surfaces 521*d'* and 522*d'* and the third and fourth upper inclined surfaces 523*d'* and 524*d'* of the third and fourth upper body portions 523*a'* and 524*a'* of the third and fourth upper separators 523' and 524' are formed in the directions opposite to each other.

A guide groove 501*b* is formed at the edge of the discharging opening 501*a* of the base plate 501 so that the first and second upper separators 521 and 522 and the third and fourth lower separators 521 and 522' can be supported to be capable of sliding with respect to the base plate 501. Guide portions 521*e*, 522*e*, 521*e'* and 522*e'* are formed on the lower surface of the first, second, third and fourth lower body portions 521*a*, 522*a*, 521*a* ' and 522*a'*, respectively. Guide portions 523*e*, 524*e*, 523*e'* and 524*e'* are formed on the lower surface of the first, second, third and fourth upper body portions 523*a*, 524*a*, 523*a'* and 524*a'* such that the first, second, third and fourth upper separators 523, 524, 523' and 524' can be supported to be capable of sliding in the guide groove 502*a* formed on the upper plate 502.

Side plates 503 are interposed between the base plate 501 and the edge of the upper plate 502 to support the upper plate 502 with respect to the base plate 501. Elastic springs 525 are installed between the side plates 503 and the first, second, third and fourth separators 521–524 so that the first and second separators 521 and 522 and the third and fourth separators 523 and 524 are elastically biased in the directions opposite to each other.

Figure 13:
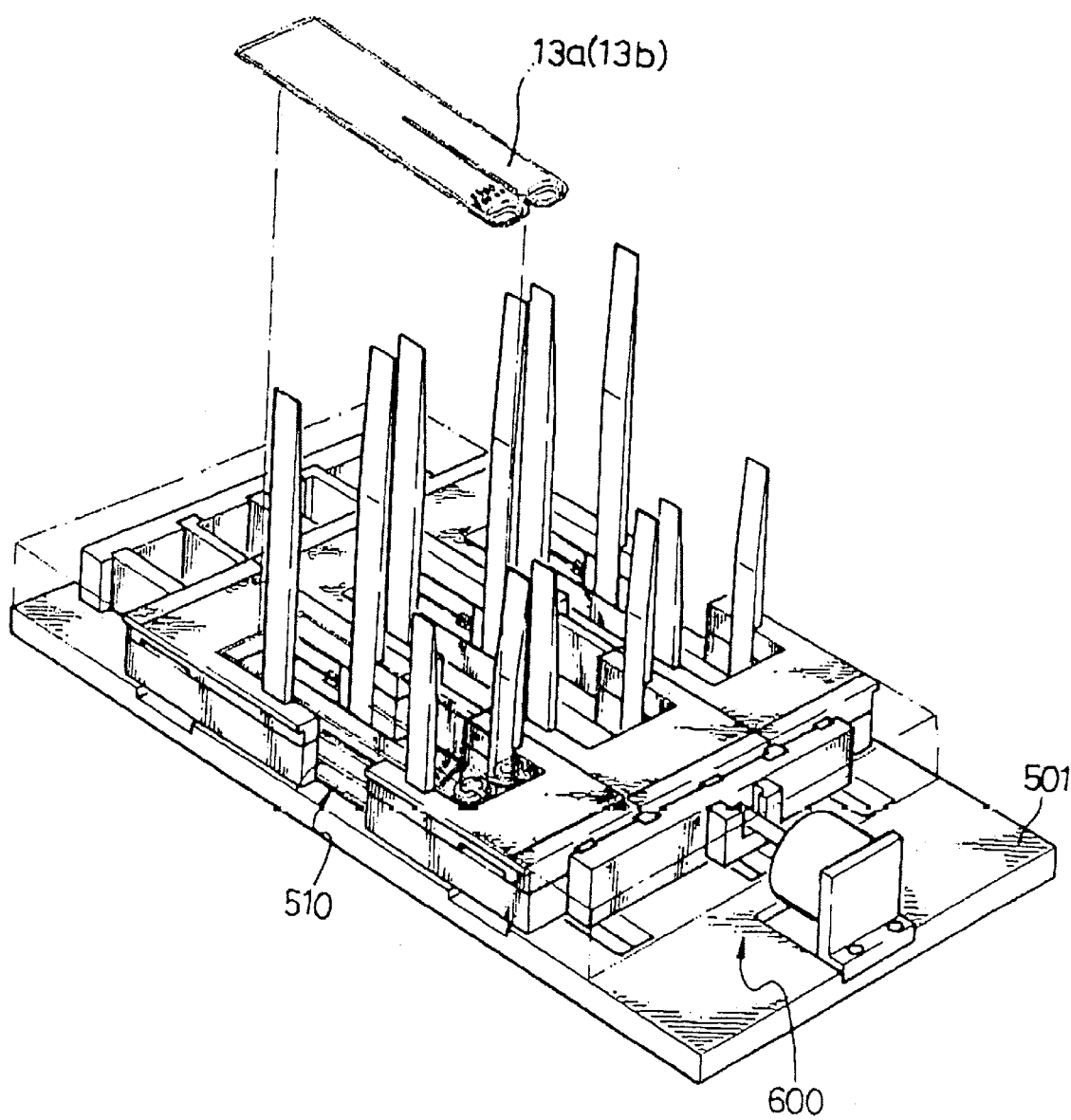
FIG. 13 is a perspective view showing a molding plate delay supply apparatus.

The driving apparatus 600 is for sliding the respective first and second upper and lower separators 521 and 522, and 523 and 524, and the third and fourth upper and lower separators 521 and 522, and 523 and 524, of the first and second accommodating portions 520 and 530 of the plate discharging apparatus 502, which is shown in FIGS. 13 through 15.

As shown in the drawings, the driving apparatus 600 includes first and second roller brackets 611 and 612 guided by the first and second guide grooves 501*b* and 501*b* formed in both sides of the base plate 501 where the first and second accommodating portions 520 and 530 are disposed, first lower rollers 613 and 614 installed at an end portion of the respective roller brackets 611 and 612 to be interposed between the first and second lower body potions 521a and 522a and the third and fourth lower body portions 521a' and 522a' of the first and second accommodating portions 520 and 530, and second upper rollers 615 and 616 interposed between the first and second upper body portions 523a and 523a and the third and fourth body portions 523a' and 524a'. The first and second roller brackets 611 and 612 are connected to each other by a connection rod 617. The connection rod 617 slides by a cylinder 618 installed at the base plate 501. Here, the connection rod 617 is supported to be capable of sliding between the base plate 501 and the upper plate 502. Reference numeral 620 denotes a supporter for supporting the molding plate by being supported at the upper plate 502.

Figure 17:
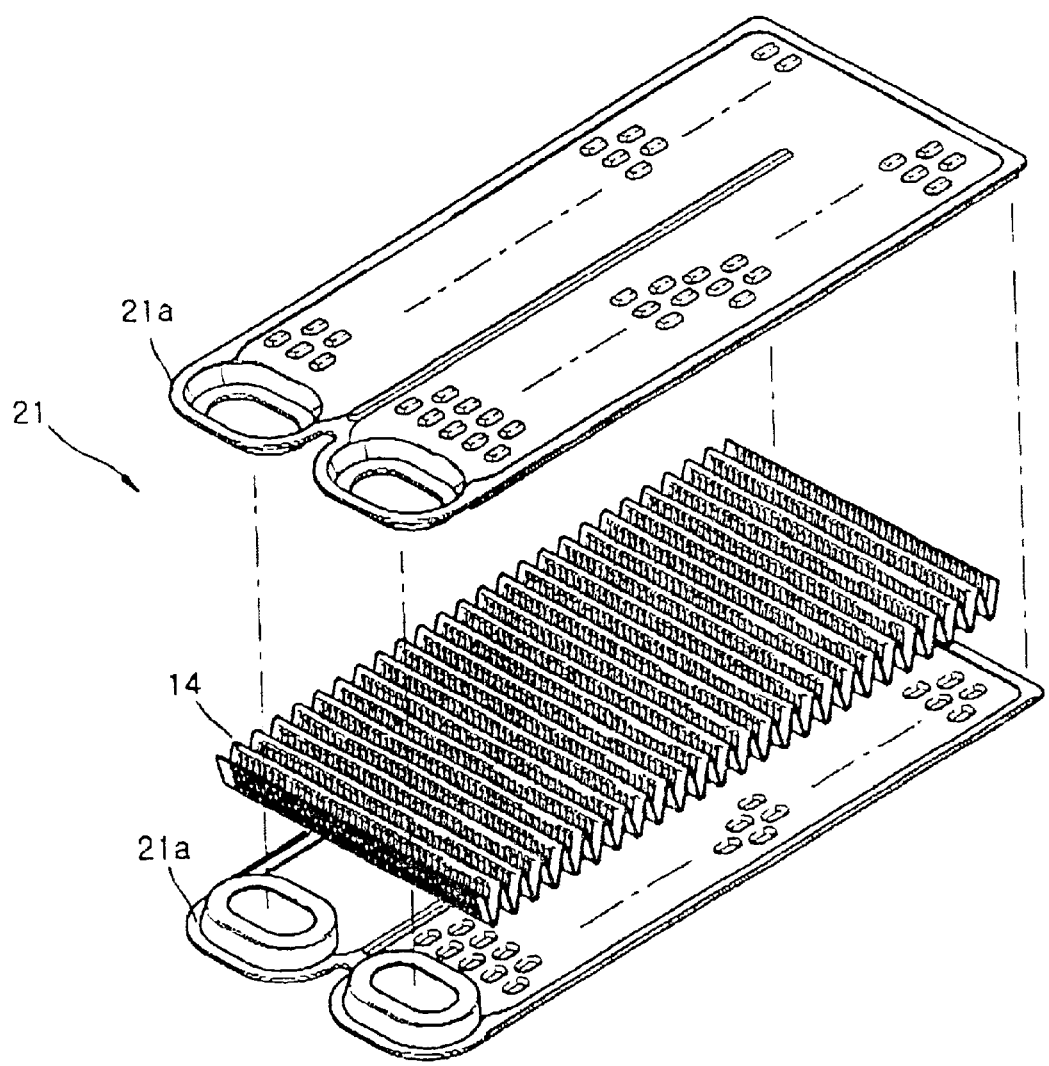
FIG. 17 is an exploded perspective side view showing a fin molding plate assembly.

The fin plate assembling device 100 is for interposing the fin 14 between the molding plates 21a and 21a, as shown in FIG. 17, and installs the same in the tray 901 transferred along the main conveyer 30. A preferred embodiment thereof is shown in FIGS. 18 through 26.

As shown in the drawings, the fin plate assembling device 100 includes a frame 111, a rotary assembly portion 120, rotated a predetermined angle by an actuator, for assembling the fin 14 and the molding plate 21a, the fin transfer conveyer 40 and a molding plate transfer device 150 installed at both sides of the rotary assembly portion 120 for intermittently transferring the fin 14 and the molding plate 21a, respectively, a molding plate insertion device 160 installed between the rotary assembly portion 120 and the molding plate transfer device 150 for inserting the molding plate in the rotary assembly portion 120, a molding plate supply device installed between the molding plate insertion device 160 and the molding plate transfer device 150, for supplying the molding plate 21a to the molding plate insertion device 160, a fin feeding device 190 for inserting the fin 14 intermittently transferred by the fin transfer conveyer 140 between two sheets of molding plates installed at the rotary assembly portion 120, and a drawing device 220 installed at the frame 111 for drawing the completely assembled fin plate assembly 21 from the rotary assembly portion 120. A discharging device 240 is further included which discharges the fin plate assembly 21 drawn from the rotary assembly portion 120 to transfer the same to the tray 901.

In the fin plate assembly of a heat exchanger having the above structure, the rotary assembly 120 installed at the frame 111 provides space for assembly where the fin 14 and the two sheets of molding plates 21a and 21a can be rotated for the assembly thereof. As shown in FIGS. 17 through 22, a base plate 121 having an opening 121a is installed at the frame 111, and brackets 122 and 122' are fixed at both end portions of the base plate 121. Rotary shafts 123 and 123' are rotatably installed at the brackets 122 and 122', respectively. A pair of rotary plates 124 and 124' forming space, in which two sheets of molding plates are inserted, are installed at both end portions of the rotary shafts 123 and 123' to be parallel to each other. The rotary shaft 123 at one side of the rotary shafts 123 and 123' fixed to the brackets 122 and 122' is coupled by a coupling 126 to a rotary shaft of a motor 125 which is an actuator fixed to the frame 111. Rotational spaces 127a and 127a', in which end portions of the rotary plates 124 and 124' can be inserted and rotated, are formed between the inner surfaces of the brackets 122 and 122' facing each other. Also, guide members 127 and 127' where drawing holes 127b and 127b' through which the fin plate assembly is drawn are formed perpendicularly above the centers of the rotary shafts 123 and 123' are installed on the inner surfaces of the brackets 122 and 122' facing each other. Insertion holes 127c and 127c' into which the molding plates are inserted are formed at both sides with respect to the rotational centers of the rotary shafts 123 and 123' in the guide members 127 and 127'. Extension portions 127d and 127d' for forming the drawing holes 127b and 127b' extending upward are formed at the guide members 127 and 127'. A gripping portion 128 for temporarily holding the fin plate assembly 21 drawn through the drawing holes 127b and 127b' is formed on the extension portions 127d and 127d' where the drawing holes 127b and 127b' are formed. The gripping portion 128 includes a fixing jaw 128a fixed to one side of each of the extension portions 127d and 127d' and a mobile jaw 128b installed to face the fixed jaw 128a and be elastically biased toward the fixed jaw 128a.

A tank insertion portion 129, in which the tank portion 11 of the molding plate 21a is inserted, for supporting the molding plate 21a in a horizontal state, is formed between the rotary plates 124 and 124'. The tank insertion portion 129 includes a tank support portion 129a extending from the rotary shaft 123' at one side thereof toward between the rotary plates 124 and 124' and sectioning a portion between the rotary plates 124 and 124' into a tank insertion portion of the molding plate, and a protruding portion 129b, protruding from an end portion of the tank support portion 129a toward the inner surface of the molding plate, for supporting the molding plate 21a. A sensor (not shown) for detecting the angle of rotation is provided at the rotational shaft of the rotary shaft.

Figure 18:
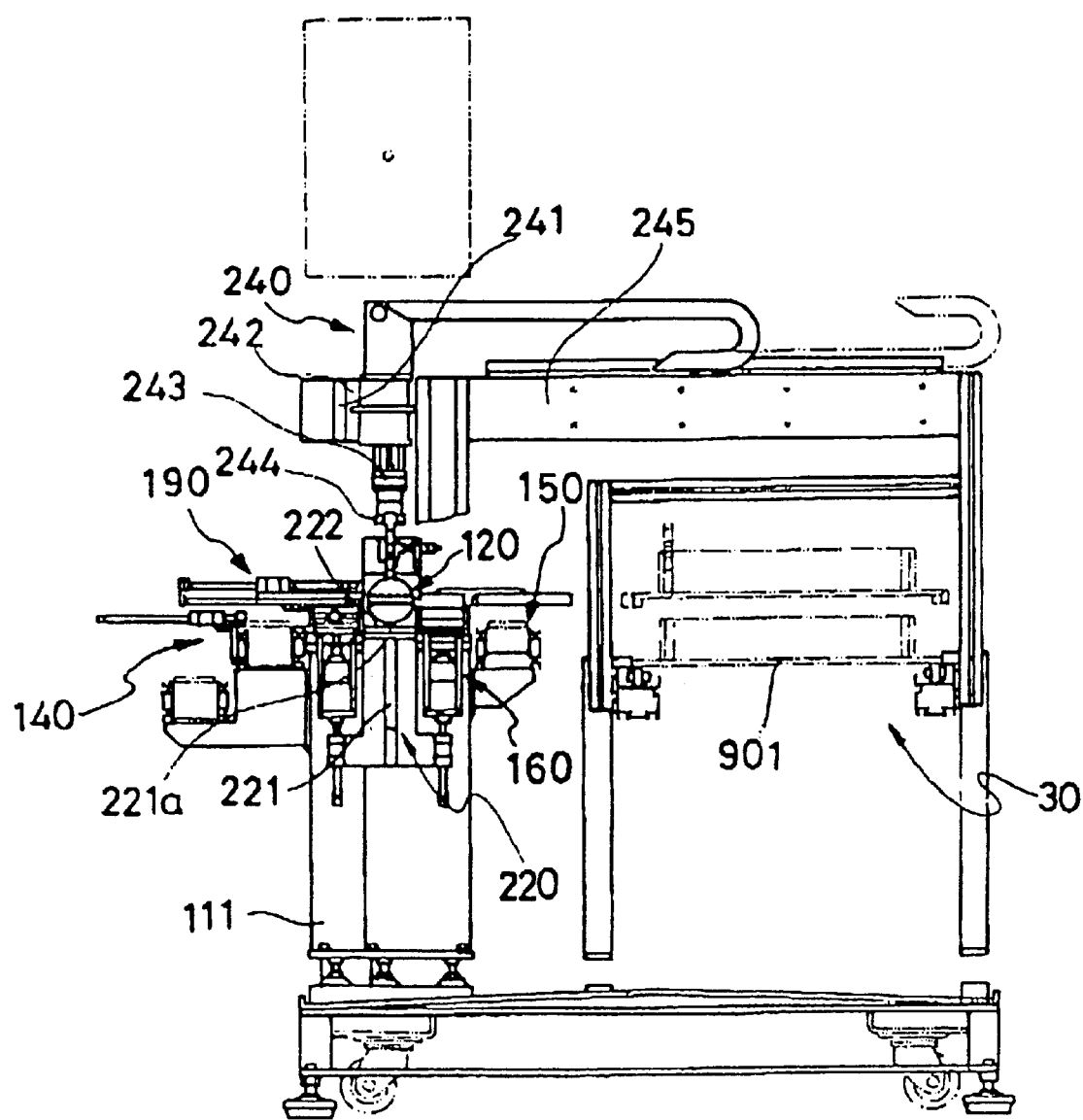
FIG. 18 is a side view of the fin molding plate assembly of the heat exchanger.
Figure 19:
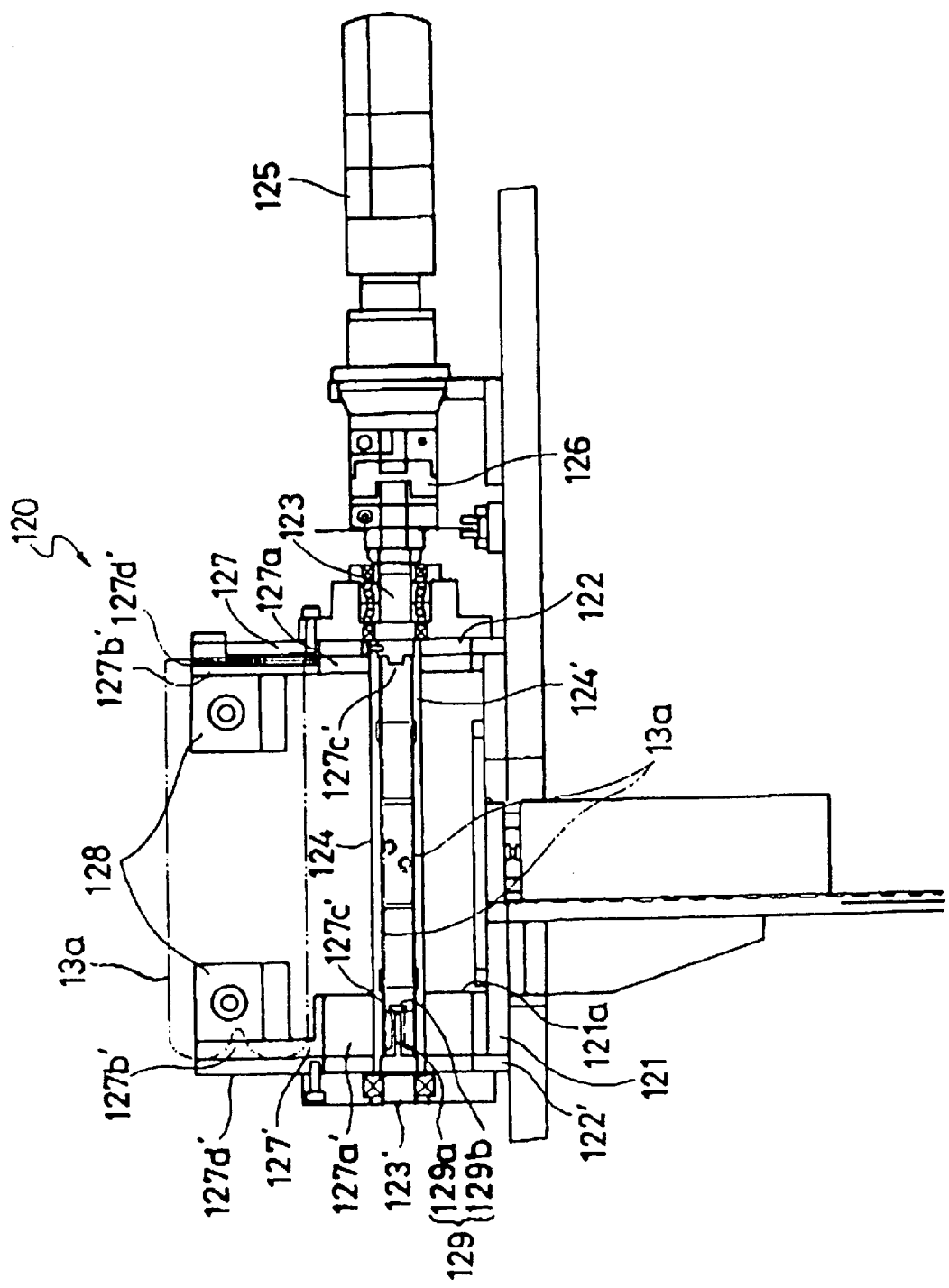
FIG. 19 is a side view of a rotary assembly shown in FIG. 18.

The fin transfer conveyer 40 and the molding plate transfer device 150, which are formed of belt conveyers, are installed at both sides of the frame 111 for transferring the fin 14 and the molding plate 121a. The molding plate insertion device 160 installed at one side of the rotary assembly portion 120 is for supplying the molding plate 21a to the assembly space formed between the rotary plates 124 and 124'. A preferred embodiment thereof is shown in FIGS. 18, 22 and 23.

As shown in the drawings, the molding plate insertion device 160 includes a guide plate 161 installed at a position lower than the rotational center of the rotary shaft and parallel thereto near the rotary assembly portion 120 and having a slot 161a in the lengthwise direction thereof, a transfer pin 162 sliding along the slot 161a, a cylinder 163 installed at the lower portion of the guide plate 161 for reciprocating the transfer pin 162 along the slot 161a, an elevating device 165 installed near an end portion of the guide plate 161 for transferring the molding plate 21a transferred from the guide plate 161 to the height of the rotational center of the rotary member, and a pusher portion 167 installed near the first elevating device 165 for inserting the raised molding plate 21a between the rotary plates 124 and 124'. Here, a rod-less cylinder is preferably used as the cylinder 163 for transferring the transfer pin 161a.

The elevating device 165 includes an elevating plate 165a installed at an end portion of the guide plate 161 and having the width parallel to that of the rotary plates 124 and 124' of the rotary assembly portion 120, and a cylinder 165b installed at the frame 111 for elevating the first elevating plate 165a from the height of the guide plate 161 to the height of the assembly space formed by the rotary plates 124 and 124'. Here, a first guider 165c for guiding the molding plate to the assembly space is provided between the rotary plates 124 and 124' and the rotary assembly.

Figure 22:
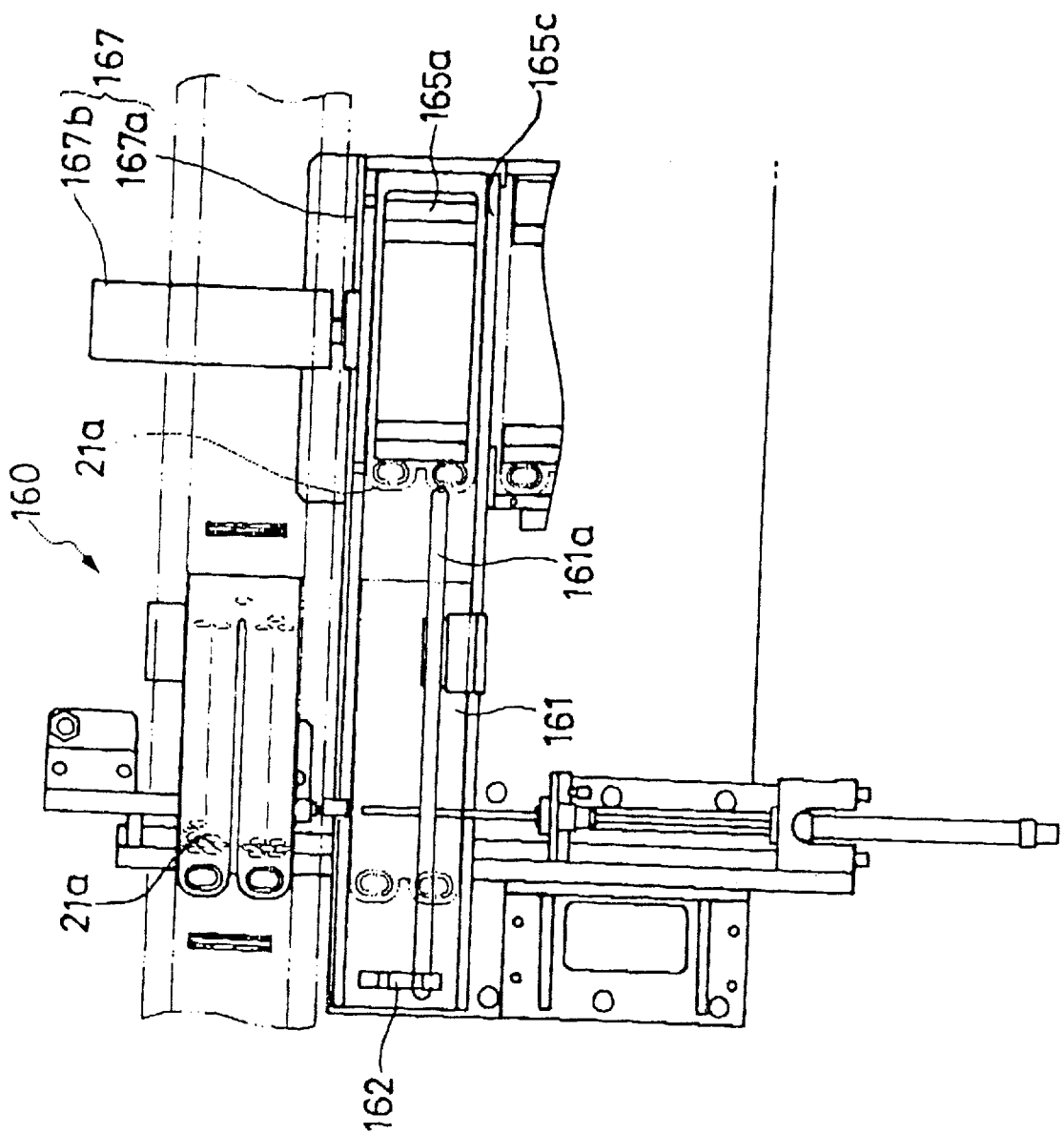
FIG. 22 is a plan view showing a molding plate transfer device and a molding plate insertion device.
Figure 23:
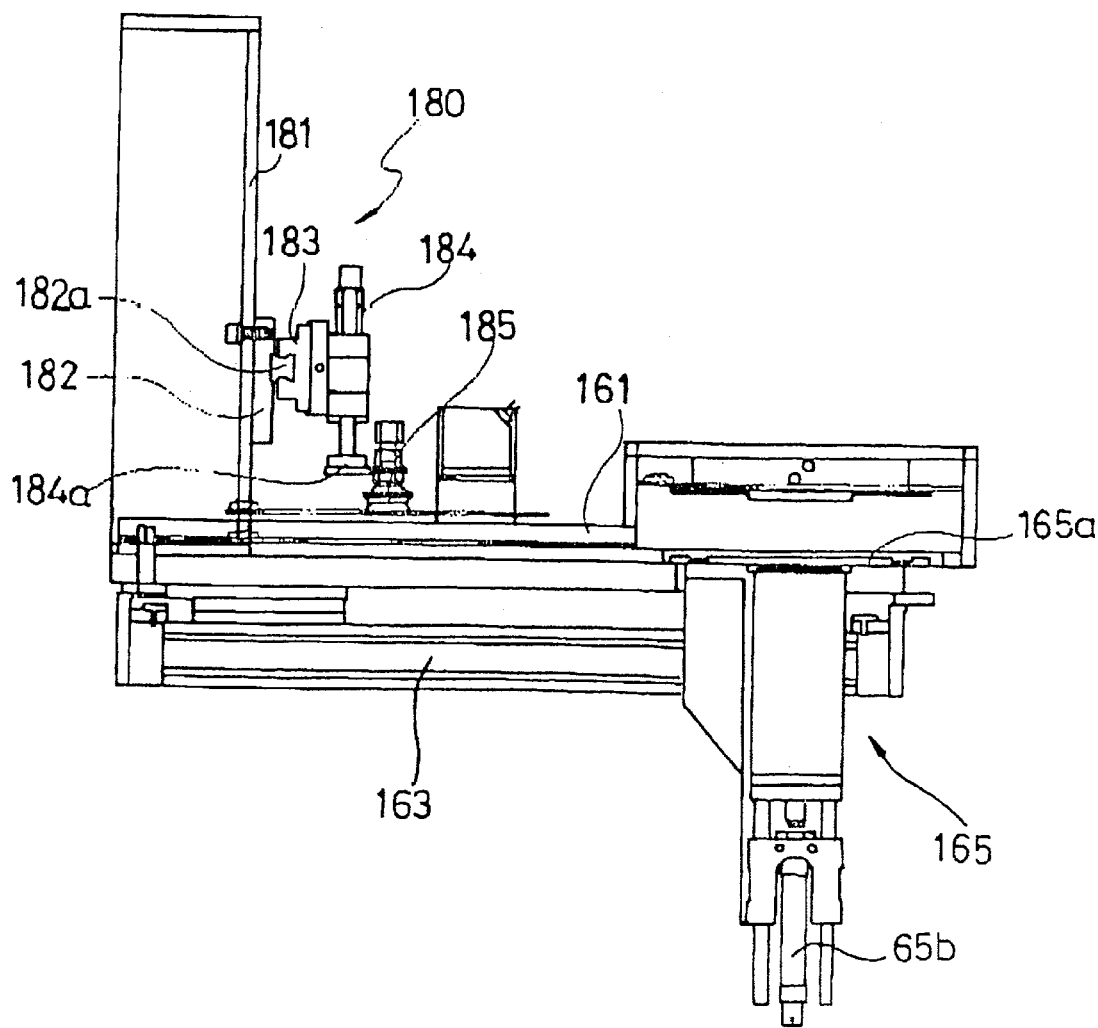
FIG. 23 is a side view showing a molding plate insertion device and a molding plate transfer device.

The pusher portion 167, as shown in FIGS. 22 and 23, is for inserting the molding plate 21a raised to the height of the molding plate assembly space by the first elevating plate 165a into the assembly space. As shown in the drawings, the pusher portion 167 includes a pusher 167a installed at the same height as that of the assembly space in a direction perpendicular to the guide plate 161, and a cylinder 167b for reciprocating the pusher 167a toward the assembly space.

Figure 24:
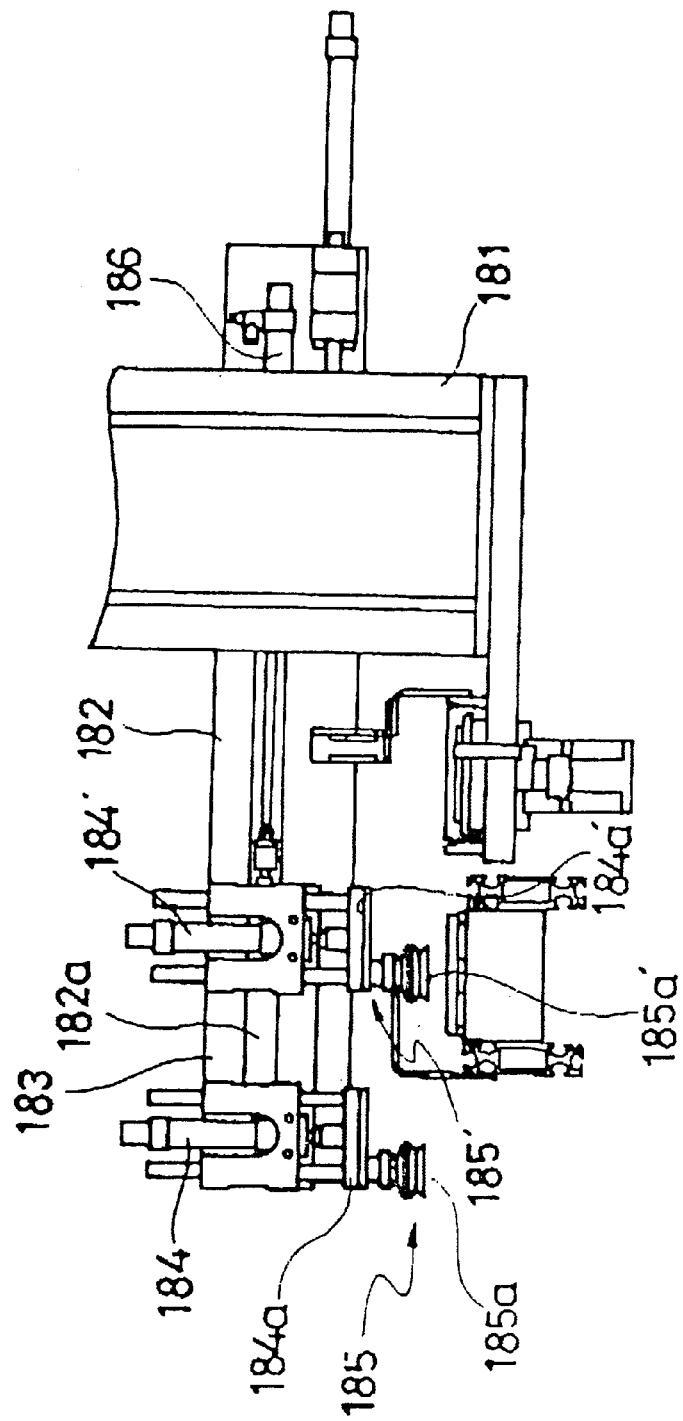
FIG. 24 is a front view of the molding plate transfer device.

The molding plate supply device 180 is for transferring the molding plate 21a transferred by the molding plate transfer conveyer 60 toward the guide plate 161. As shown in FIGS. 18, 23 and 24, the molding plate supply device 180 includes a support 181 installed at the frame 111, a rail plate 182 supported by the support 181 and disposed above the guide plate 161 and the molding plate transfer device 150 and having a rail 182a in the lengthwise direction thereof, a slider 183 installed at the rail 182a to be capable of sliding, a plurality of sliders 184 and 184' installed at the slider 183 at predetermined intervals, connection portions 184a and 184a' installed at the rods of the respective cylinders and guided by a guide rod, and absorbing portions 185 and 185' installed at the connection portions 184a and 184a', respectively. A cylinder 186 for reciprocating the slider 183 along the rail 182a is provided at the support 181. The absorbing portions 185 and 185' include an absorbing pad 185a installed at the rods of the cylinders 184 and 184', and a vacuum supply pipe (not shown) for providing a vacuum pressure to the absorbing pad 185a. The absorbing portions 185 and 185' are not limited to the above-described embodiment and any structures which can absorb the molding plate can be adopted therefor.

Figure 25A:
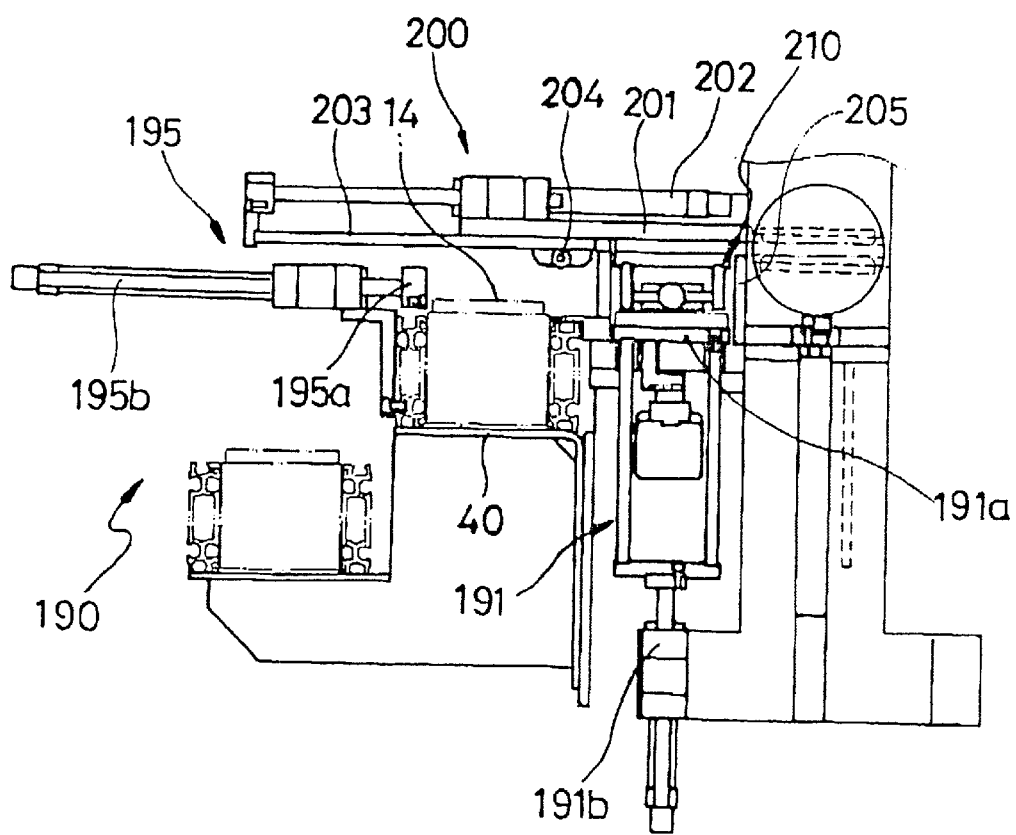
FIG. 25A is a plan view showing a fin feeding device.

The fin feeding device 190 is for inserting the fin 14 transferred by the fin transfer conveyer 40 between the molding plates 21a loaded in the assembly space. A preferred embodiment thereof is shown in FIG. 25A.

As shown in the drawing, the fin feeding device 190 includes an elevating device 191 installed between the fin transfer conveyer 40 and the rotary assembly, a pusher portion 195 installed at one side of the fin transfer conveyer 40 for transferring the fin transferred by the fin transfer conveyer 40 to an elevating plate 191a of the elevating device 191, and a fin insertion portion 200 for inserting the fin elevated by the elevating device 191 between the molding plates 21a installed in the assembly space. A fin compressing portion 210 for compressing the fin 14 to facilitate insertion of the fin 14 into the assembly space by the fin insertion portion 200 is further included.

The elevating device 191 includes the elevating plate 191a installed between the fin transfer conveyer 40 and the rotary assembly, and a cylinder 191b installed at the frame 111 for elevating the elevating plate 191a from the height of the upper surface of a belt of the fin transfer conveyer 40 to the height of the assembly space formed by the rotary plates 124 and 124'. Here, a guider 205 for guiding the molding is plate to the assembly space is provided between the rotary plates 124 and 124' of the rotary assembly portion 120 and the elevating plate 191a elevated by the cylinder 191b.

The pusher portion 195 is for transferring the fin 14 transferred by the fin transfer conveyer 40 to the upper surface of the elevating plate 191a lowered by the cylinder 191b. The pusher portion 195 includes a pusher 195a installed in a direction perpendicular to the fin transfer conveyer 40, and a cylinder 195b installed at a frame of the fin transfer conveyer 40 and having the pusher 195a installed at the rod thereof, for transferred the pusher 195a toward the elevating plate 191a.

The fin insertion portion 200 is for inserting the fin elevated by the elevating plate 191a between the molding plates installed in the assembly space. The fin insertion portion 200 includes a fixed bracket 201 installed on the upper surface the frame 111, a cylinder 202 fixedly installed at the fixed bracket 201, a pushing pin 203 installed at a rod of the cylinder 202 and extending under the fixed bracket 201, and a guide roller 204 installed under the fixed bracket 201 for guiding the pushing pin 203. Here, the height of the pushing pin 203 must be the same as that of the assembly space.

Figure 25B:
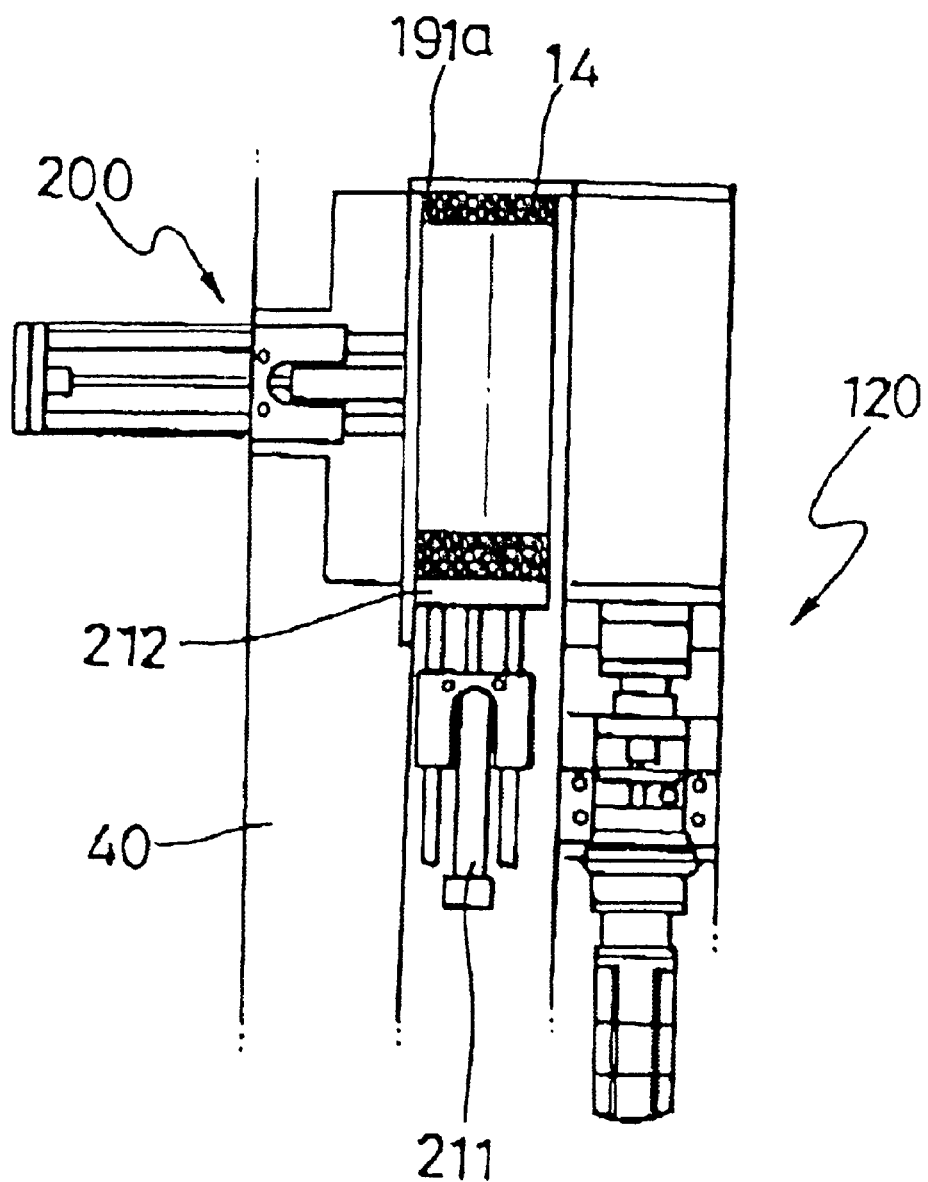
FIG. 25B is a plan view showing a fin compression device.

The fin compressing portion 210 is for smoothly inserting the fin into the assembly space between the rotary plates 124 and 124'. As shown in FIGS. 25A and 25B, the fin compressing portion 210 includes a cylinder 211 installed at the fixed bracket 201 and a compressing plate 212 installed at a rod of the cylinder 211 for compressing the fin accommodated on the elevating plate 191a.

Figure 20:
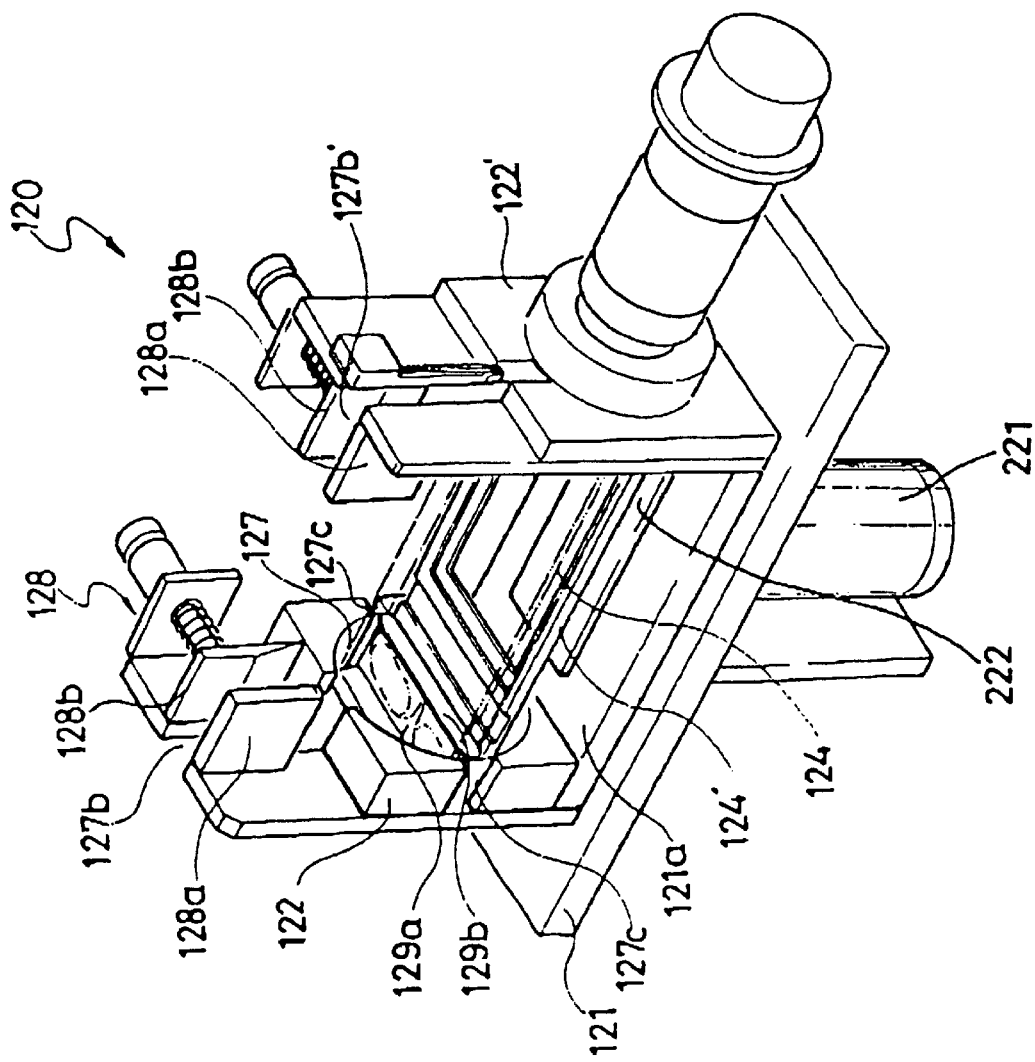
FIG. 20 is a perspective view of the rotary assembly.
Figure 21:
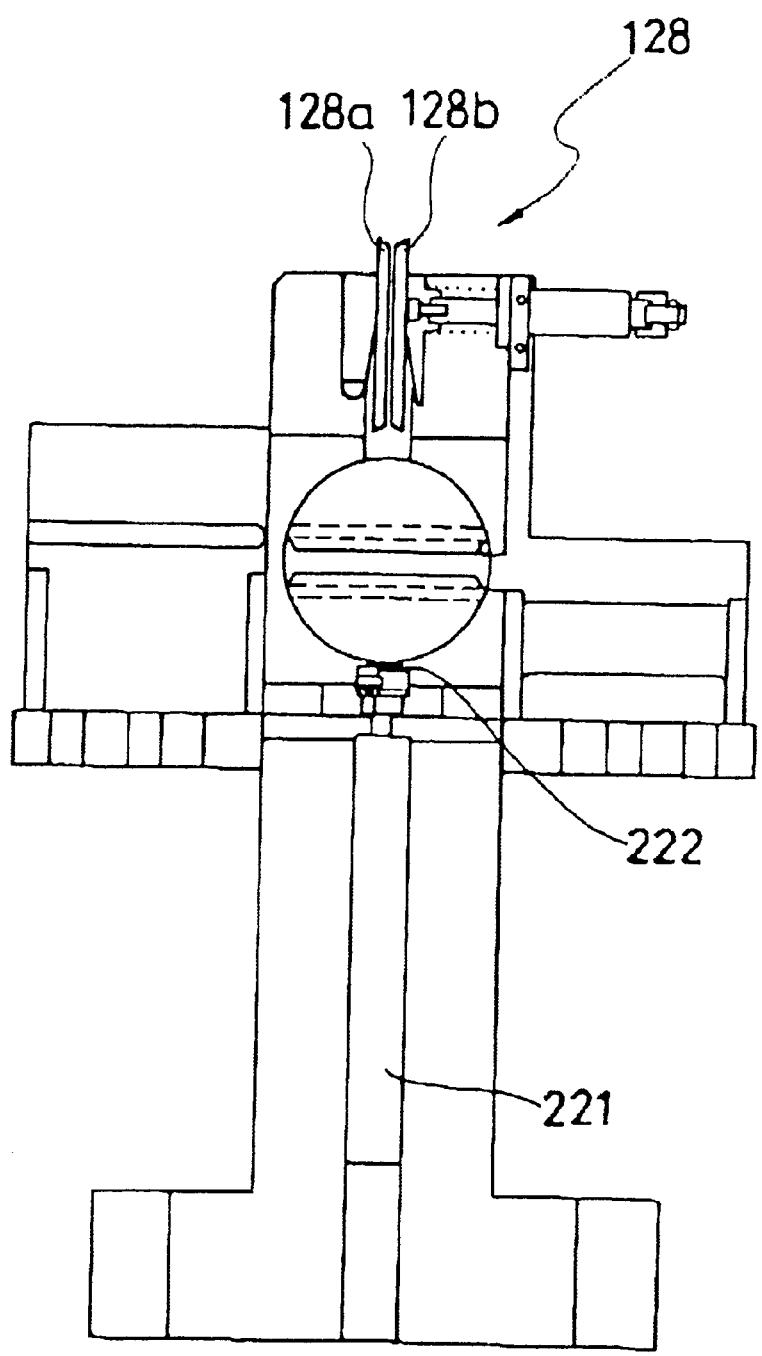
FIG. 21 is a side view showing a grip portion of the rotary assembly.

The drawing device 220 is for drawing the completely assembled fin plate assembly 21 formed by the rotary plates 124 and 124'. The drawing device 220, as shown in FIGS. 18, 20 and 21, includes a cylinder 221 disposed at the lower portion of the base plate 121 by being supported at the frame 111, and a pushing member 222 fixed to a rod 221a of the cylinder 221. The pushing member 222 is formed to have the same width as that of the assembly space.

The discharging device 240 is for drawing the fin plate assembly completely assembled in the rotary assembly portion 120 and drawn by the drawing device 220 and inserting the same into the tray 901. A preferred embodiment thereof is shown in FIG. 18.

As shown in the drawing, the discharging device 240 includes a guide rail 241 installed above the main conveyer 30 transferring the tray 901 and the rotary assembly portion 120, a slider 242 sliding along the guide rail 241, an elevating member 243 installed at the slider 242 to be capable of being elevated by a guide rod, a chuck 244 installed at the elevating member 243 for gripping the fin plate assembly 21, and a cylinder 245 installed at the slider 242 for elevating the elevating member 243. The discharging device 240 is not limited to the above preferred embodiment and any structures which can move the completely assembled fin plate assembly 21 toward tray 901 can be adopted therefor. For example, a manipulator can be used therefor.

Figure 26:
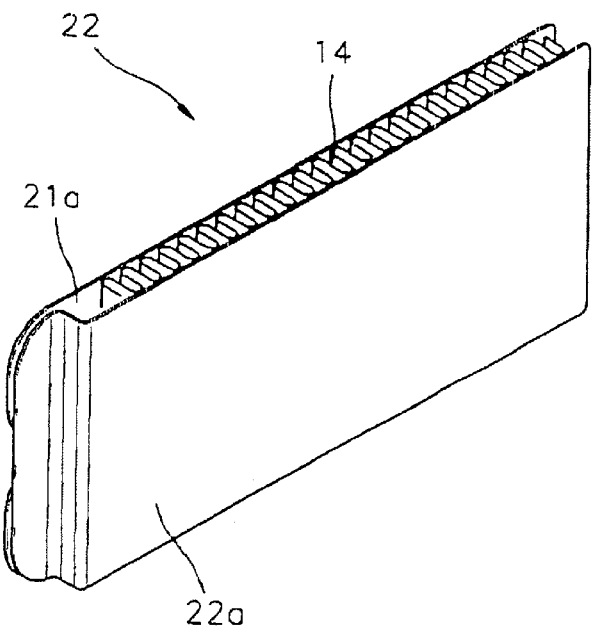
FIG. 26 is a perspective view showing an end plate assembly.
Figure 27A:
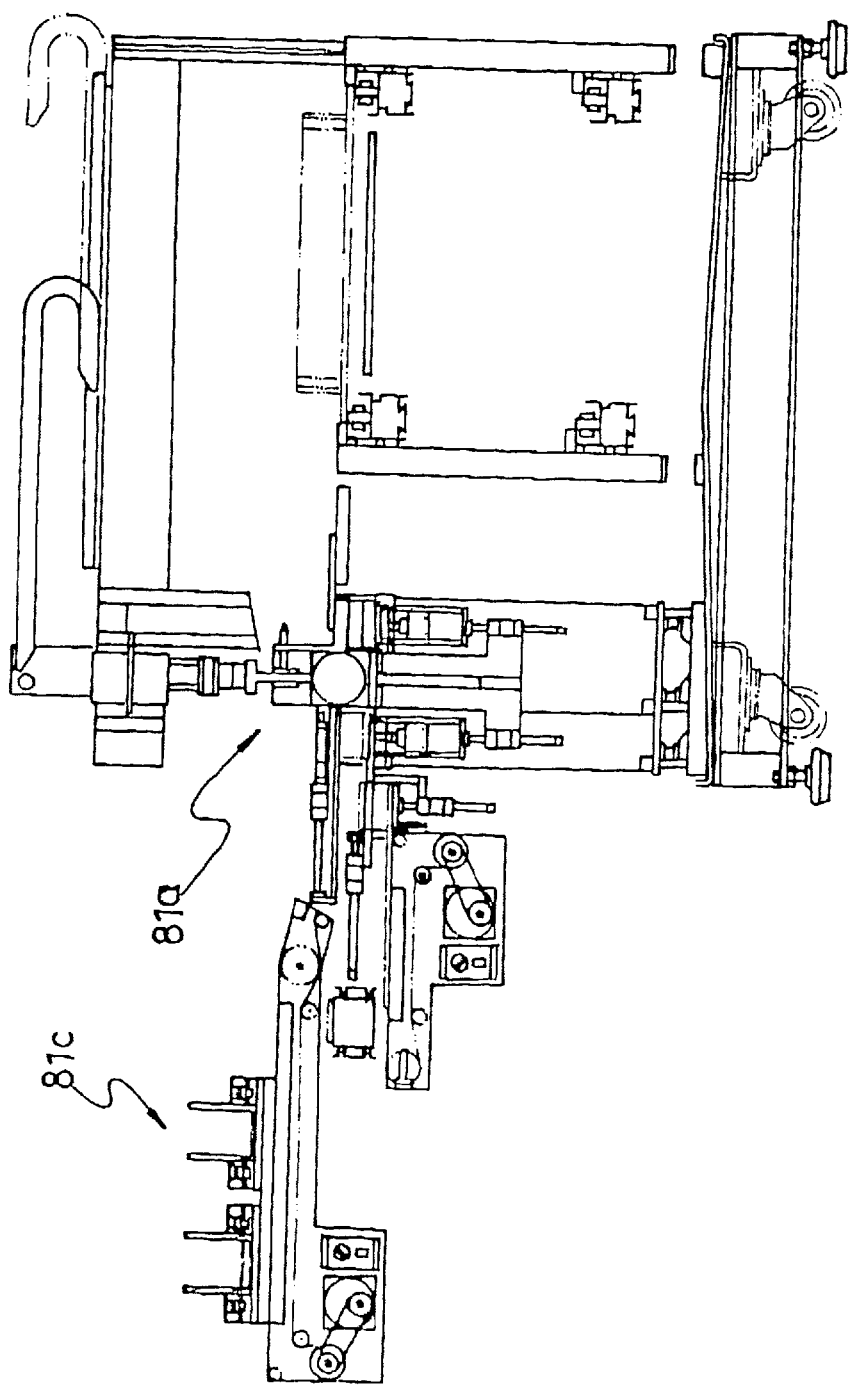
FIGS. 27A and 27B are a plan view and a side view of an end plate assembly supply device.
Figure 27B:
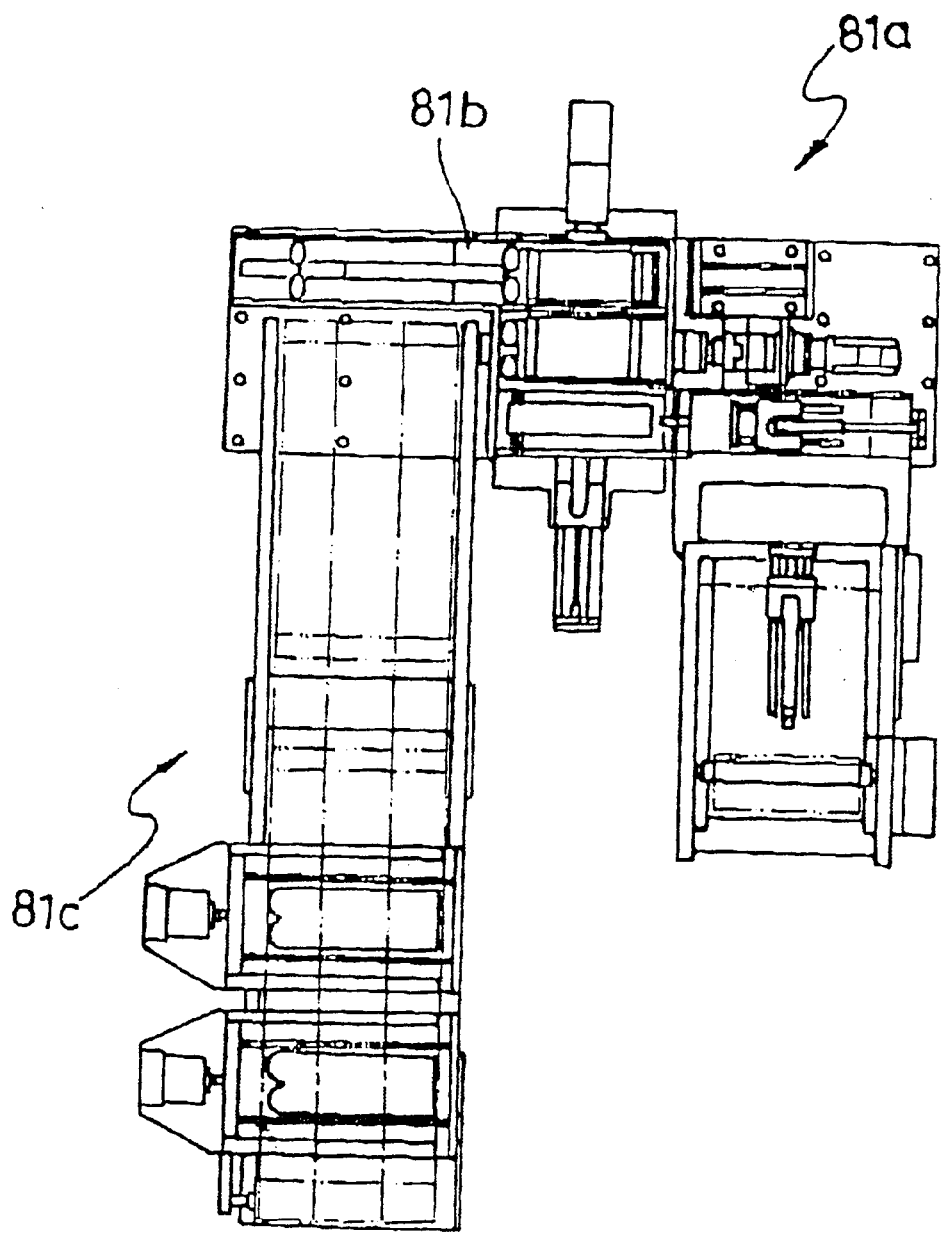
Figure 29:
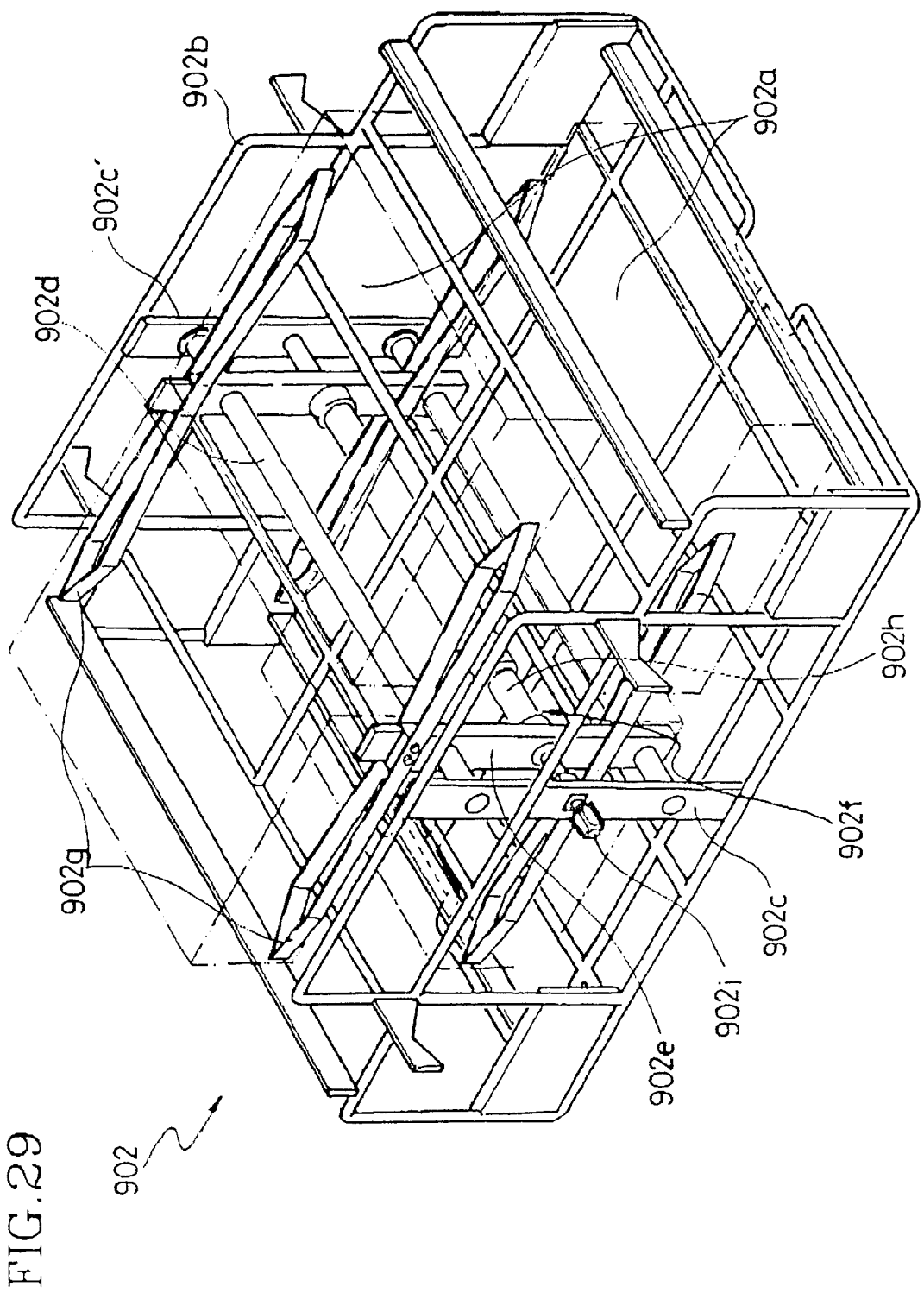
FIG. 29 is a perspective view of a cleaning tray.

The end plate assembly supply device 81, as shown in FIG. 26, is for loading the end plate assembly 22 assembled by interposing the fin between the end plate 22a and the molding plate 21a of the heat exchanger in the tray 901 transferred by the main conveyer 30. A preferred embodiment thereof is shown in FIGS. 27A and 27B.

As shown in the drawings, the structure of the assembly portion 81a for performing assembly by interposing the fin between the end plate 22a and the molding plate 21a is the same as that of the fin plate assembling device 100, and an end plate supply device 81c for supplying the end plate is added thereto. The end plate supply device 81c is installed at the conveyer 81d connected to the guide plate 81b for assembly and the conveyer 81a and includes a supply portion 81d for intermittently supplying the end plate 15a. As the supply portion 81d has the same structure as that of the plate delay supply device 500, a description therefor will be omitted.

Figure 28:
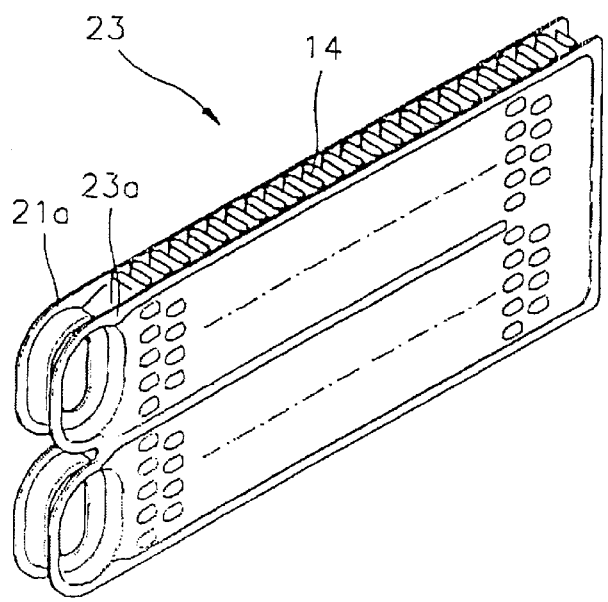
FIG. 28 is a perspective view showing a manifold plate assembly.

The special plate assembly supply device, as shown in FIG. 28, is for supplying the special plate 23a with a sealed tank and the molding plate 21a which are assembled by interposing the fin therebetween to the tray 901 transferred by the main conveyer 30. The structure thereof is the same as that of the end plate assembly supply device 81.

The manifold plate assembly supply device 82, although not shown in the drawing, is for loading the manifold plate assembly 24 from the supply tray (not shown) where the manifold plate assemblies 24 are loaded in the tray 901 transferred by the main conveyer 30, which includes a transfer device for transferring the supply tray and a manipulator for transferring the manifold plate assembly 24.

The test apparatus 90 is for checking the assembly state of the heat exchanger assembly which is completely assembled and, although not shown in the drawing, includes a bracket disposed above the tray 901 transferred by the main conveyer 30 and detection sensors installed at the bracket at predetermined intervals. The detection sensor preferably uses an adjacent sensor.

The picking device 83 is for picking the completely assembled heat exchanger loaded in the tray 901 and loading the same in a cleaning tray 902, which is formed of a manipulator. The cleaning tray 902, where the heat exchanger assembly 20 picked by the picking device 83 is supported, includes a case 902b having a loading portion 902a of the heat exchanger assembly 20 at the upper and lower portions thereof, a guide rod 902d supported by the support plates 902c and 902c' at both sides of the case 902b, pressing members 902e and 902e installed at the guide rod 902d to be capable of sliding, and a transfer device 902f installed at the support plates 902e and 902e' for transferring the pressing members 902e and 902e. An elastic member 902g for pressing the heat exchanger is installed at the pressing members 902e and 902e by being extended horizontally at the upper and lower end portions thereof. Here, the transfer device 902f includes a rotation shaft 902h coupled by a screw formed in the opposite direction of the support plates 902c and 902c'. A coupling portion 902i of a rectangular shape for rotating the rotation shaft 902h is formed at one end portion of the rotation shaft 902h.

A tray adjustment device 910 for transferring the pressing members 902e and 902e according to the type of the heat exchanger assembly 20 where the cleaning tray 902 is loaded, is further provided near the conveyer for transferring the cleaning tray 902.

Figure 30:
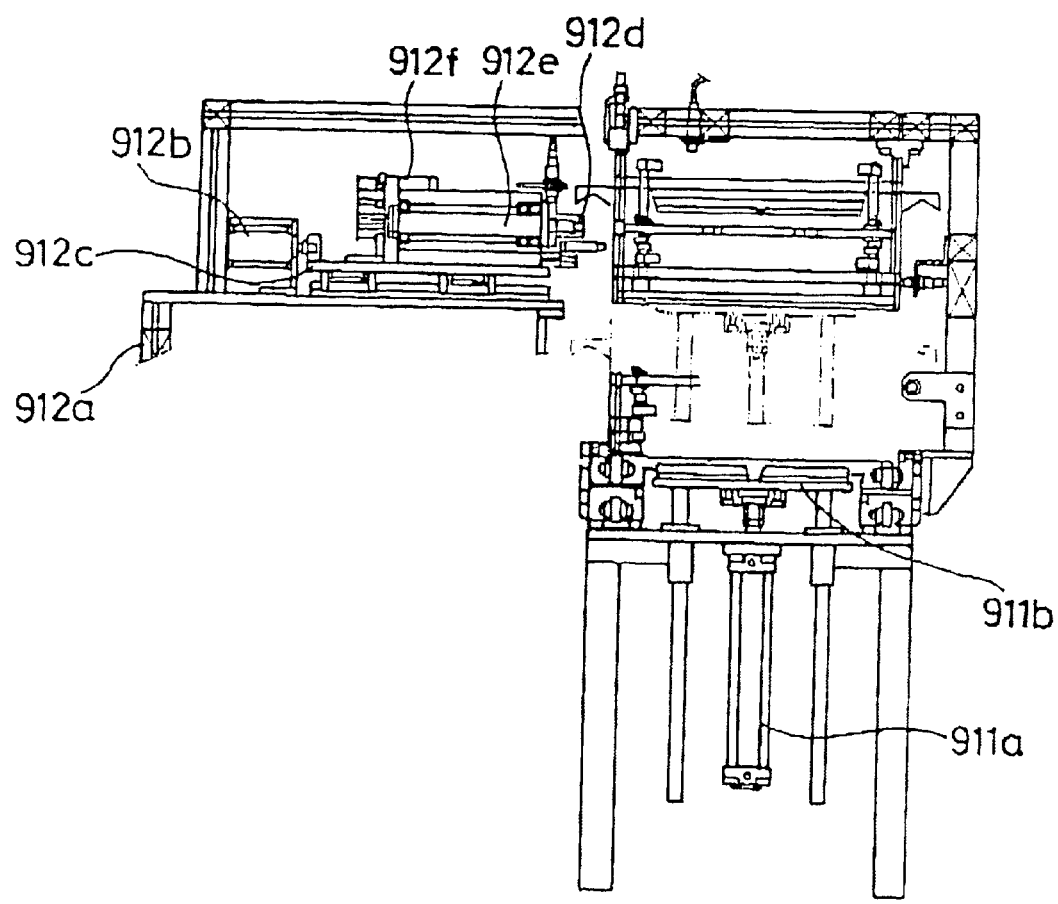
FIG. 30 is a front view of the cleaning tray.

The tray adjustment device 910, as shown in FIG. 30, includes an elevating portion 911 for elevating the cleaning tray 902 transferred along the conveyer, and an adjustment portion 912 for transferring the pressing members 902e and 902e by being coupled to the coupling portion 902i of the cleaning tray 902 elevated by the elevating portion 911 and rotating the same. The elevating portion 911 includes a cylinder 911a vertically installed at the conveyer and a support plate 911b installed at a rod of the cylinder 911a. The adjustment portion 912 is installed at the frame 912a to be capable of sliding toward the conveyer, and includes a mobile plate 912c moving back and forth by the cylinder 912b, an adjustment shaft 912e rotatably installed above the mobile plate 912c and having a combining portion 912d combined to the coupling portion 902i, and a motor 912f installed at one side of the mobile plate 912e for rotating the adjustment shaft 912 forward and backward.

The supply conveyer 84 is for transferring the heat exchanger completely cleaned by the cleaning device 85 to the loading and unloading device 800, which is configured by a common chain conveyer.

The heat exchanger loading device 86 is for loading the heat exchanger assembly picked from the cleaning device 85 in the brazing jig 904 to put the heat exchanger assembly in the brazing furnace, which is formed of a manipulator.

Figure 31:
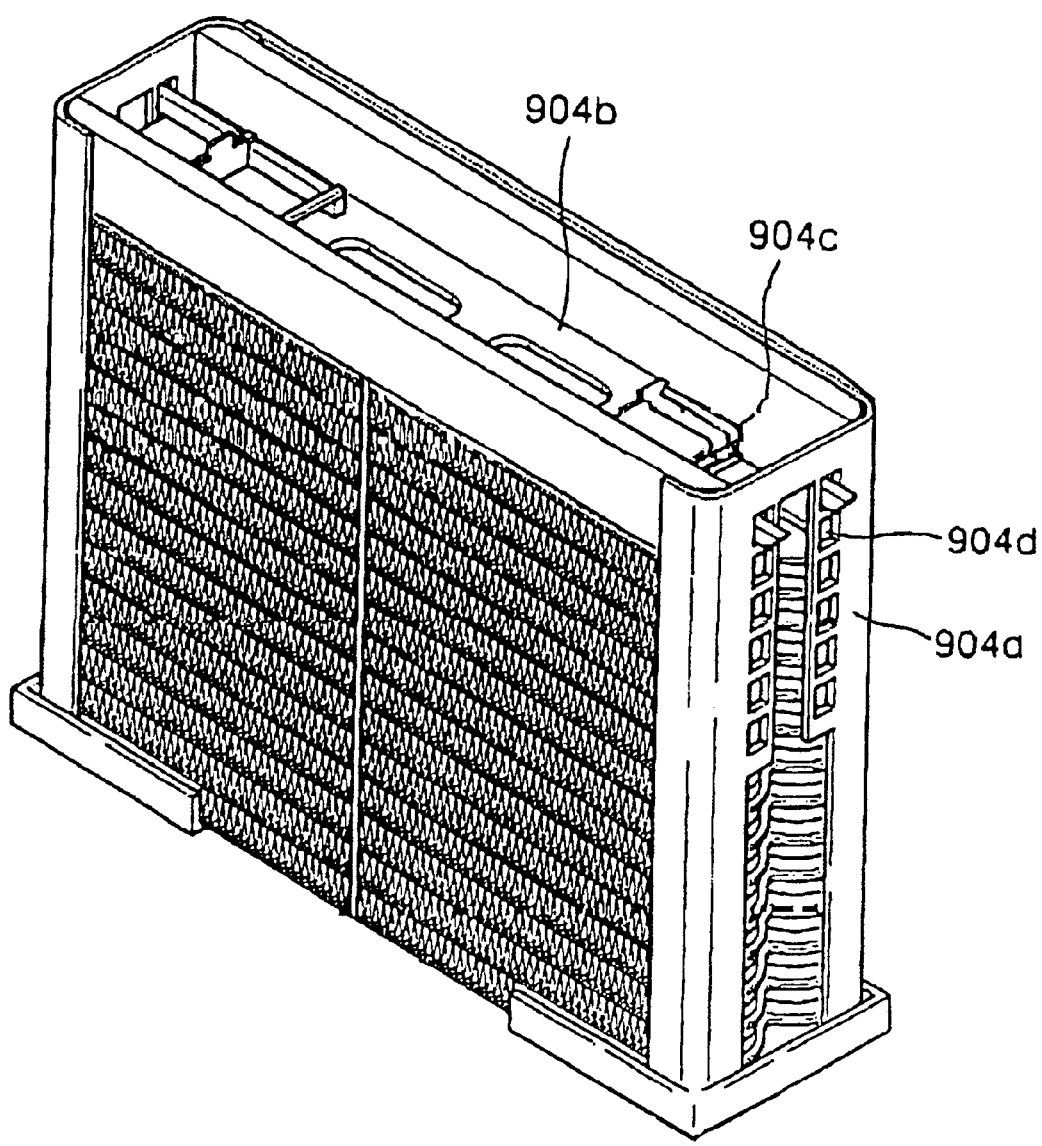
FIG. 31 is a perspective view showing a state in which a heat exchanger assembly is installed at a brazing jig.
Figure 32:
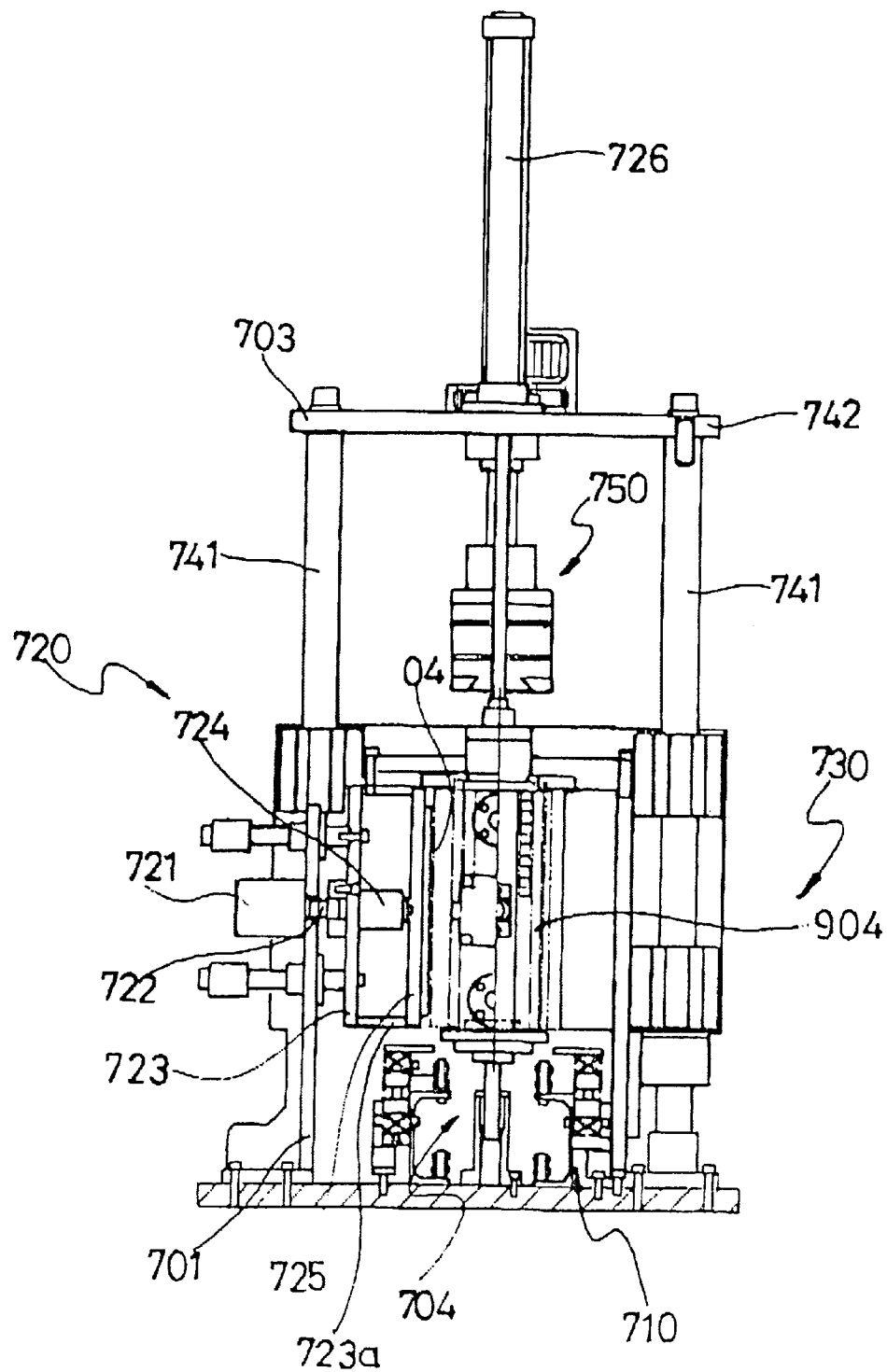
FIG. 32 is a front view showing of a clamping apparatus.

The clamping device 700, as shown in FIG. 31, is for combining a clamp 904c of the pressing and combining plate 904b to a coupling hole 904d formed in a main body 904a in a state in which the heat exchanger assemblies are stacked in the main body 904a of the brazing jig 904. A preferred embodiment thereof is shown in FIGS. 31 through 35.

As shown in the drawings, the clamping device 700 includes a chain conveyer 710 having the heat exchanger assembly 20 loaded therein for transferring the brazing jig 904 loaded in the tray 901, a base frame 701 installed at both sides of the chain conveyer 710, a tray elevating portion 704 installed between the base frames 701 for elevating the tray 901 where the brazing jig 904 is loaded, first and second aligning devices 720 and 730 installed at one side of the base frame 701 for aligning both sides of the heat exchanger assembly 20 supported at the brazing jig 904, a support plate 703 supported by the base frame 701, a third aligning device 740 installed at the support plate 703 for aligning the front and rear sides of the heat exchanger assembly loaded in the brazing jig 904, and a coupling portion 750 installed at the support plate 703 for pressing the combining plate 904b of the brazing jig 904 and simultaneously coupling the clamp 904c of the combining plate 904b by sliding the same so as to be coupled to the main body 904a.

The tray elevating portion 704 includes a cylinder 704a vertically installed and a plate member 704b elevated by the cylinder 704a and supported by a rod 704c. The first aligning device 720 installed at the base frame 701 at one side thereof includes a cylinder 721 supported at the base frame 701, a support plate 723 connected to a rod of the cylinder 721 and installed at a rod 722 supported at the base frame 701 to be capable of sliding, a cylinder 724 installed at the support plate 723, and a pressing plate 725 installed at a rod of the cylinder 724. Here, a guide portion 723a is provided at both sides of the support plate 723 to guide both sides of the pressing plate 725.

The second aligning device 730 includes a cylinder 731 supported at the base frame 702, a support plate 733 connected to a rod of the cylinder 731 and installed at a rod 732 supported at the base frame 702 to be capable of sliding, and a pressing plate 734 installed at the support plate 733.

The third aligning device 740 includes cylinders 741 and 742 vertically installed at the support plate 703 corresponding to the front and rear sides of the brazing jig 904, respectively, and brackets 743 and 744 vertically extended at rods of the cylinder 741 and 742, respectively. At least one cylinder 745 (746) is installed at each of the brackets 743 and 744, respectively, and front and rear surface pressing plates 747 and 748 are installed at the cylinders 745 and 746, respectively. In the first, second and third aligning devices 720, 730 and 740, the surfaces of the pressing plates 125, 734, 747 and 848 are formed to be uneven.

The coupling portion 750 includes a clamp block 752 supported by guide rods 751 installed at the support plate 703, a pair of clamp pads 753 and 754 installed at the lower surface of the clamp block 752 to be capable of sliding in the directions to face each other, a cylinder 755 installed between the clamp pads 753 and 754, and an elevating portion 760 installed at the support plate 703 for elevating the clamp block 752.

The elevating portion 760 includes a ball screw 763 screw-coupled to a rotation member 762 supported at a block 761 fixed to the support plate 703 and having an end portion thereof rotatably coupled to the upper surface of the clamp block 752, a gear 763 engaged with a gear tooth formed on the rotation member 762, and a motor 764 for rotating the gear 763 in the forward or reverse direction. The elevating portion 760 is not limited to the above embodiment and any structure which can elevate the clamp block 752 while controlling the position thereof can be adopted therefor.

The loading and unloading device 800 of the heat exchanger is for loading and unloading the brazing jig 904 where the heat exchanger assembly is loaded by the clamping device 700 in the brazing tray 903 to put or draw the brazing jig 904 in or from the brazing furnace (not shown). A preferred embodiment thereof is shown in FIGS. 36 through 41.

As shown in the drawings, the loading and unloading device 800 includes a frame 811, and a transfer device 810 having a first conveyer 820 installed above the frame 811 for transferring the brazing tray 903 where the heat exchanger is not loaded and a second conveyer 830 installed under the frame 811 parallel to the first conveyer 820 for transferring the brazing tray 903 where the heat exchanger is loaded. Also, the loading and unloading device 800 includes a first loading device 840 installed at one side surface of the transfer device 810 for loading the brazing jig 904 assembled to the brazing tray 903 transferred by the first conveyer 820 in the front surface of the frame 811, a lifting device 860 for transferring the brazing tray 903 where loading is completed by the brazing jig loading device 840 to the second conveyer 820, and a brazing tray loading device 850 installed between the second conveyer 820 and a support frame 900 put into the furnace for loading the brazing tray 903 transferred by the second conveyer 830, in the support frame 900.

The loading and unloading device 800 also includes, at the side surface of the transfer device 810, a brazing tray unloading device 870 for unloading the brazing tray 903 from the support frame 900 drawn from the furnace, a third conveyer 880 for transferring the brazing tray 903 unloaded by the brazing tray unloading device 870, and a tray transfer device 890 for transferring the brazing tray 903 transferred by the third conveyer 880 and where the completely brazed brazing jig 904 is removed, to the first conveyer 820.

The loading and unloading device of the heat exchanger according to the present invention having the above structure will be described in detail.

The first and second conveyers 820 and 830 are installed at the upper and lower portions of the transfer device 810. The distance between the upper and lower conveyers at the frame 811 must be maintained such that the brazing tray 903 loaded with the brazing jig 904 can be sufficiently transferred. A plurality of supports 821 and 831 installed at the frame 811 at predetermined intervals are provided at the first and second conveyers 820 and 830, and a plurality of chain guides 821a and 831a are installed at the supports 821 and 831 at predetermined intervals in a lengthwise direction. Shafts 822 and 832 are installed at both end portions of the frame 811, that is, at an inlet and outlet sides of the frame 811. Rollers 823 and 833 are installed at at least one portion corresponding to the chain guides 821 and 831. Chains 824 and 834 guided by the chain guides 821 and 831 are wound around the rollers 823 and 833. The shaft at one side is driven by driving motors 825 and 835. A stopper portion 836 for temporarily stopping the transferred brazing tray is installed at the outlet side of the second conveyer 830. The stopper portion 836 includes a cylinder 836a fixed to the frame 811 and a stopper 836b installed at a rod of the cylinder 836a and elevated. Limit switches 827 and 837 are installed at both sides of the frame 811 at a predetermined interval for detecting the position of the brazing transferred tray 903 to operate the stopper portion 836 or to control the driving motors 825 and 835.

The brazing jig loading device 840 is for loading the brazing jig 904 transferred by the conveyer in a state of being assembled to the jig in the brazing tray 903 transferred by the first conveyer 820. The brazing jig loading device 840 includes a first guide rail 843 installed between the brazing jig transfer conveyer 841 and the first conveyer 820 and supported by the support 842, a first slider 844 transferred by a rod-less cylinder (not shown) along the first guide rail 843, a first bracket 846 reciprocated by a reciprocation cylinder 845 supported by the first slider 844, an elevating cylinder 847 installed at the first bracket 846, and the chuck 848 installed at a rod of the elevating cylinder 847.

The lifting device 860 is for transferring the brazing tray 903 to the second conveyer 830 when the brazing jig 903 is completely loaded in the brazing ray 903 transferred by the first conveyer 820. The lifting device 860 includes a rail 681 installed under the first and second conveyers 820 and 830 and extended from the frame 811, a frame 862 vertically installed and reciprocating along the rail 861 toward the first and second conveyers 820 and 830, a fork 863 installed at the frame 862 to be capable of elevating, and an elevating portion 864 for elevating the fork 862. The elevating portion 864 is configured by using a chain connected to the cylinder or the fork 862, and a sprocket and a motor for transferring the chain. The rail 861 can be transferred by a cylinder (not shown).

Figure 33:
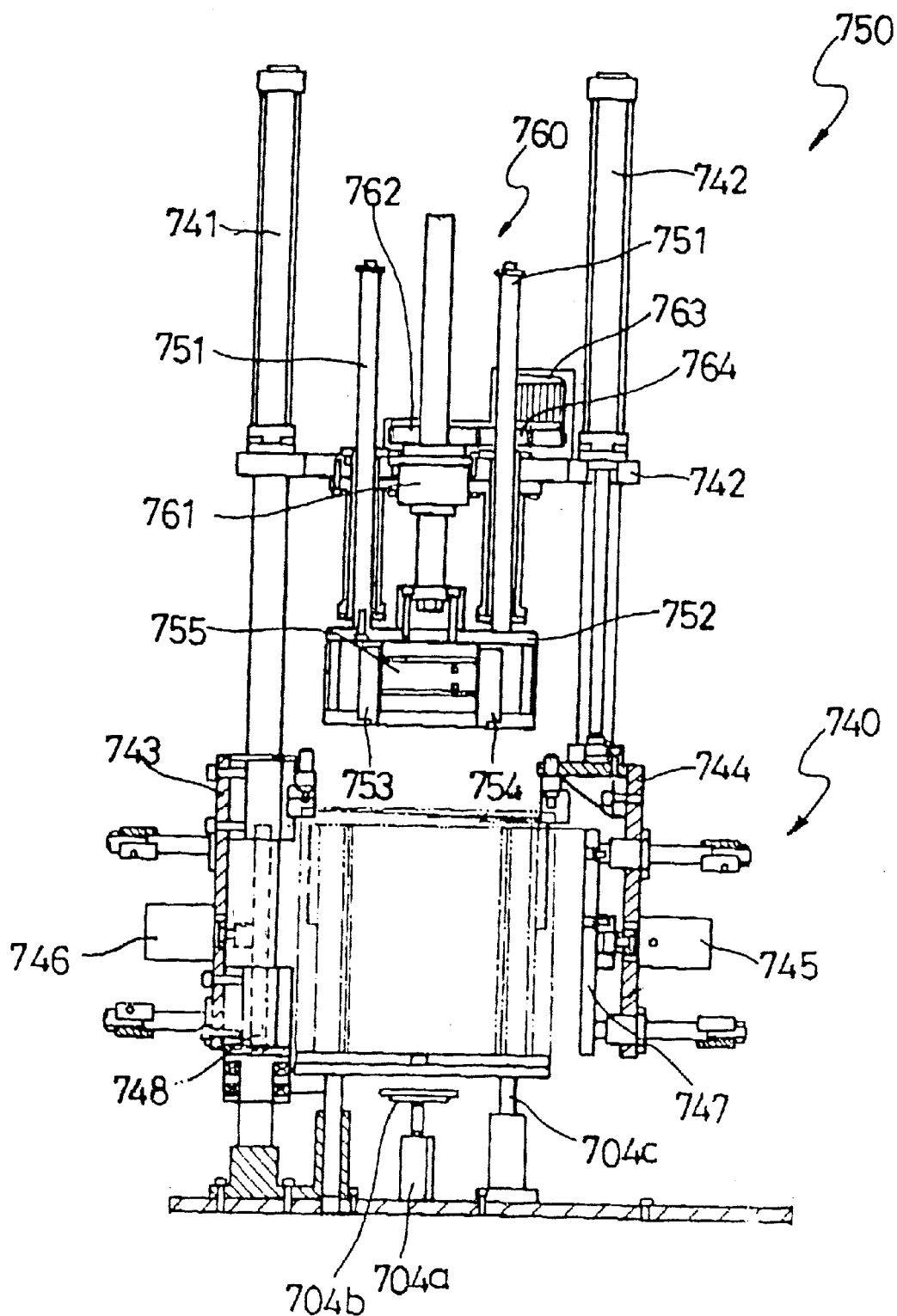
FIG. 33 is a side view of the clamping apparatus.
Figure 34:
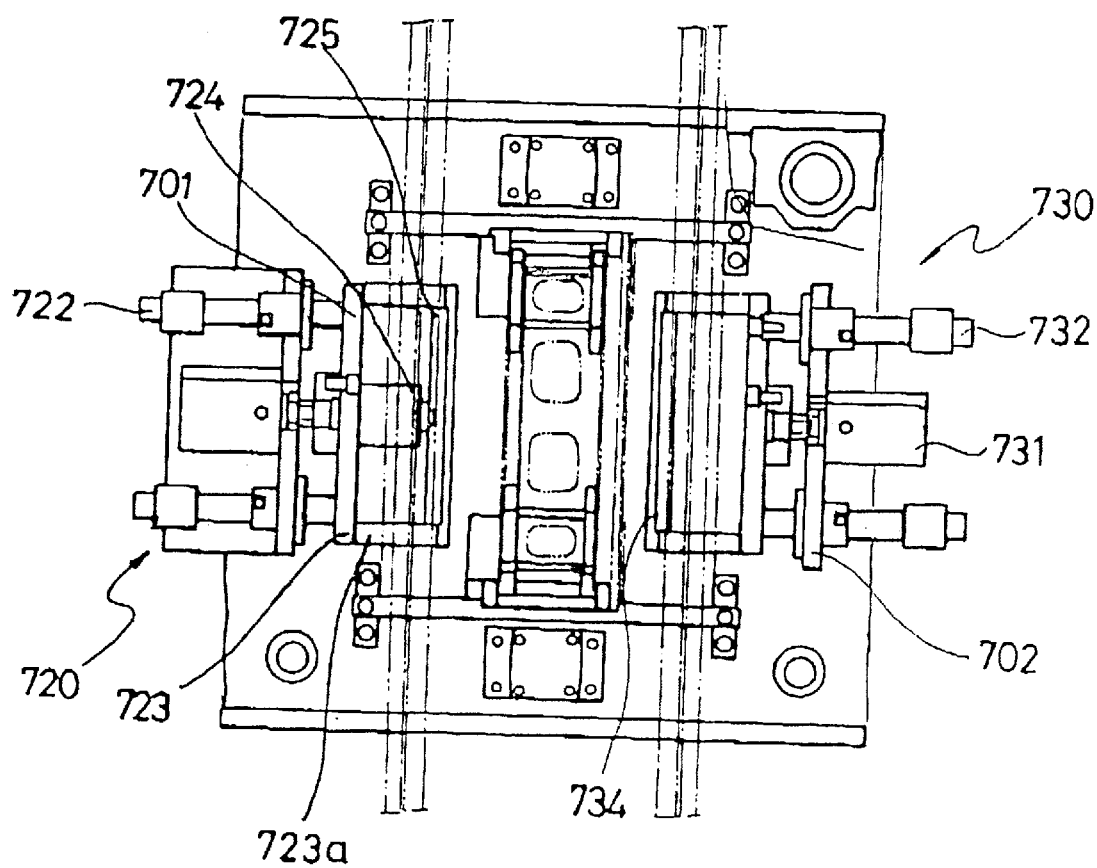
FIG. 34 is a plane view of a heat exchanger aligning apparatus and the clamping apparatus of FIG. 33.
Figure 35:
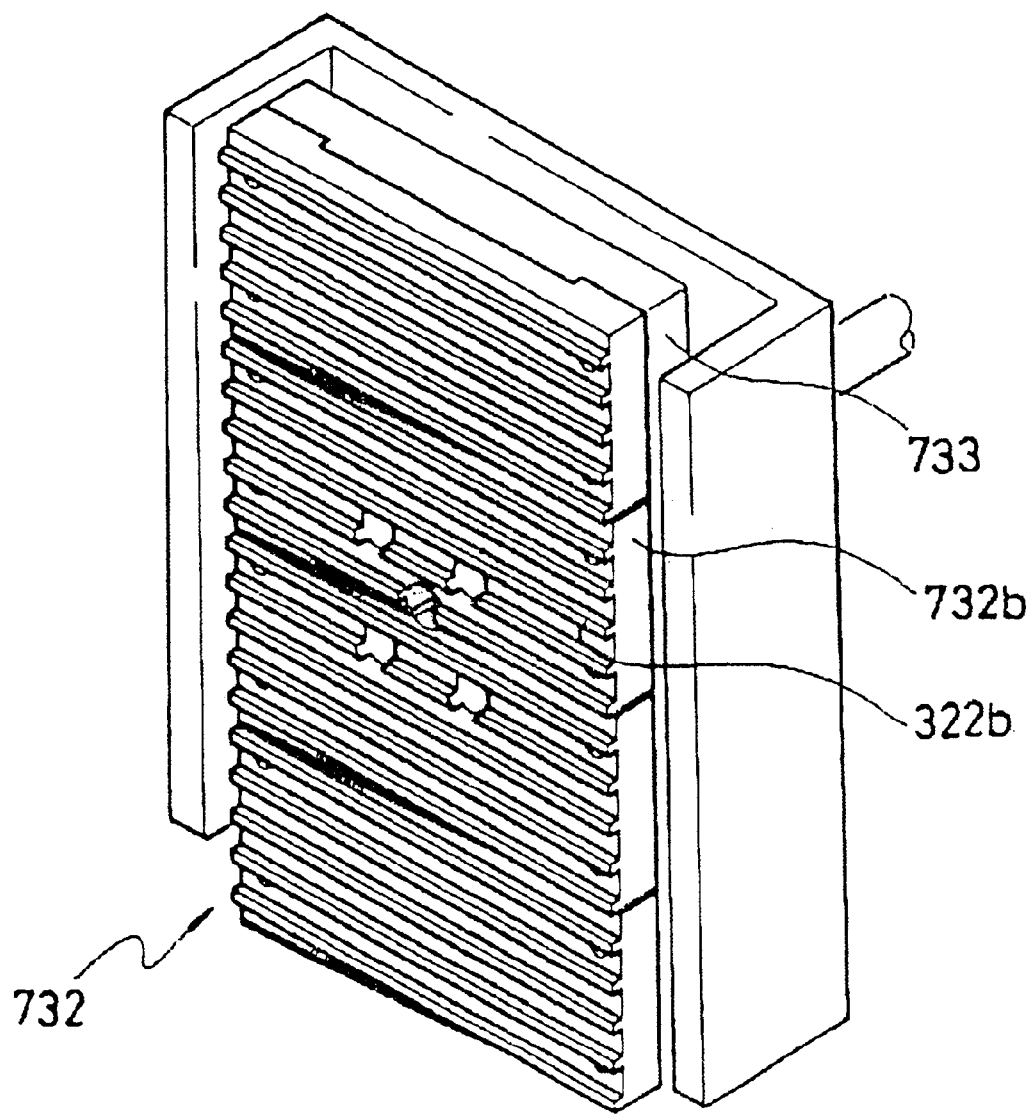
FIG. 35 is a perspective view showing a fin pressing plate of the aligning apparatus of FIG. 34.
Figure 36:
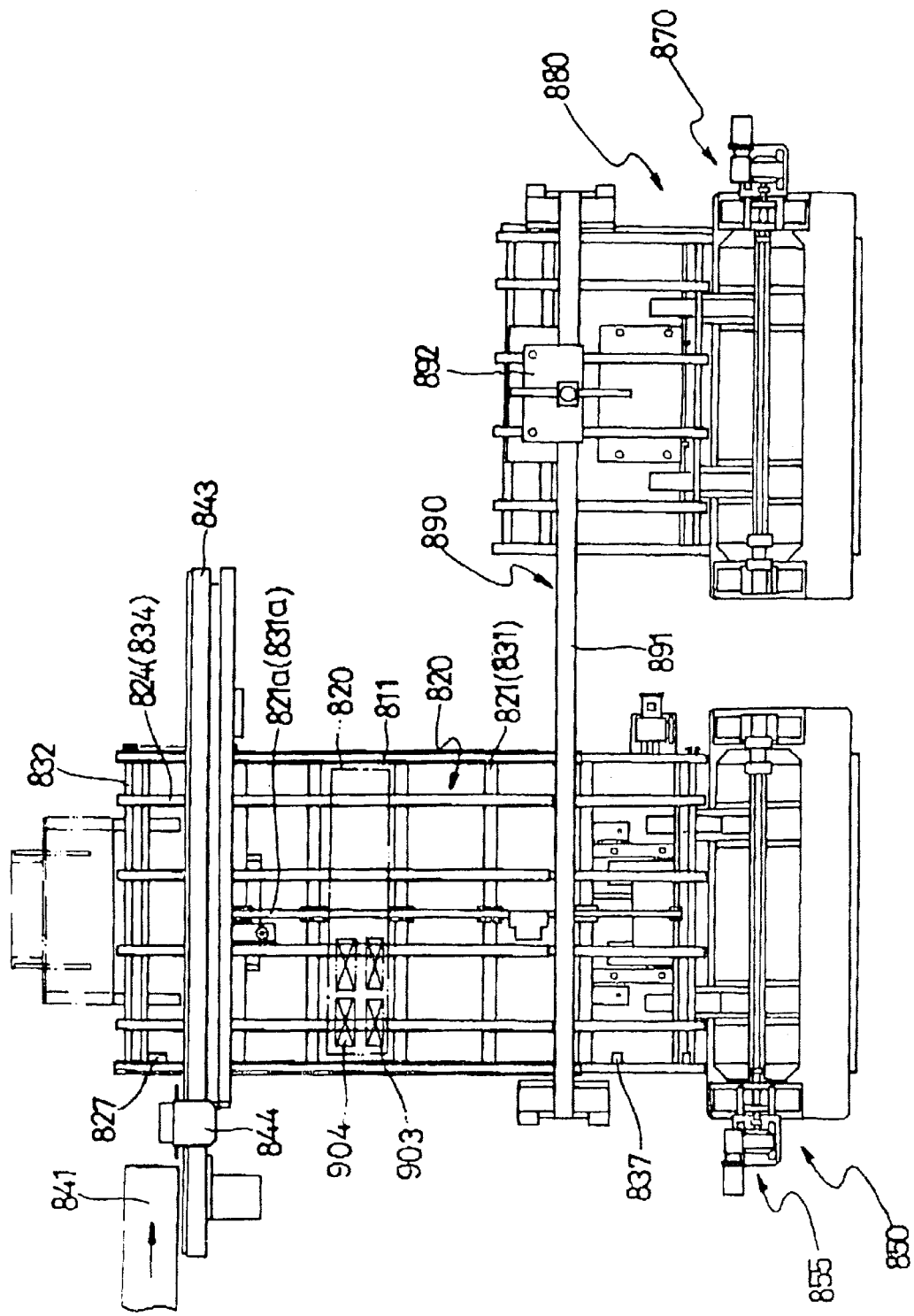
FIG. 36 is a plan view of a loading and unloading apparatus of the heat exchanger.
Figure 37:
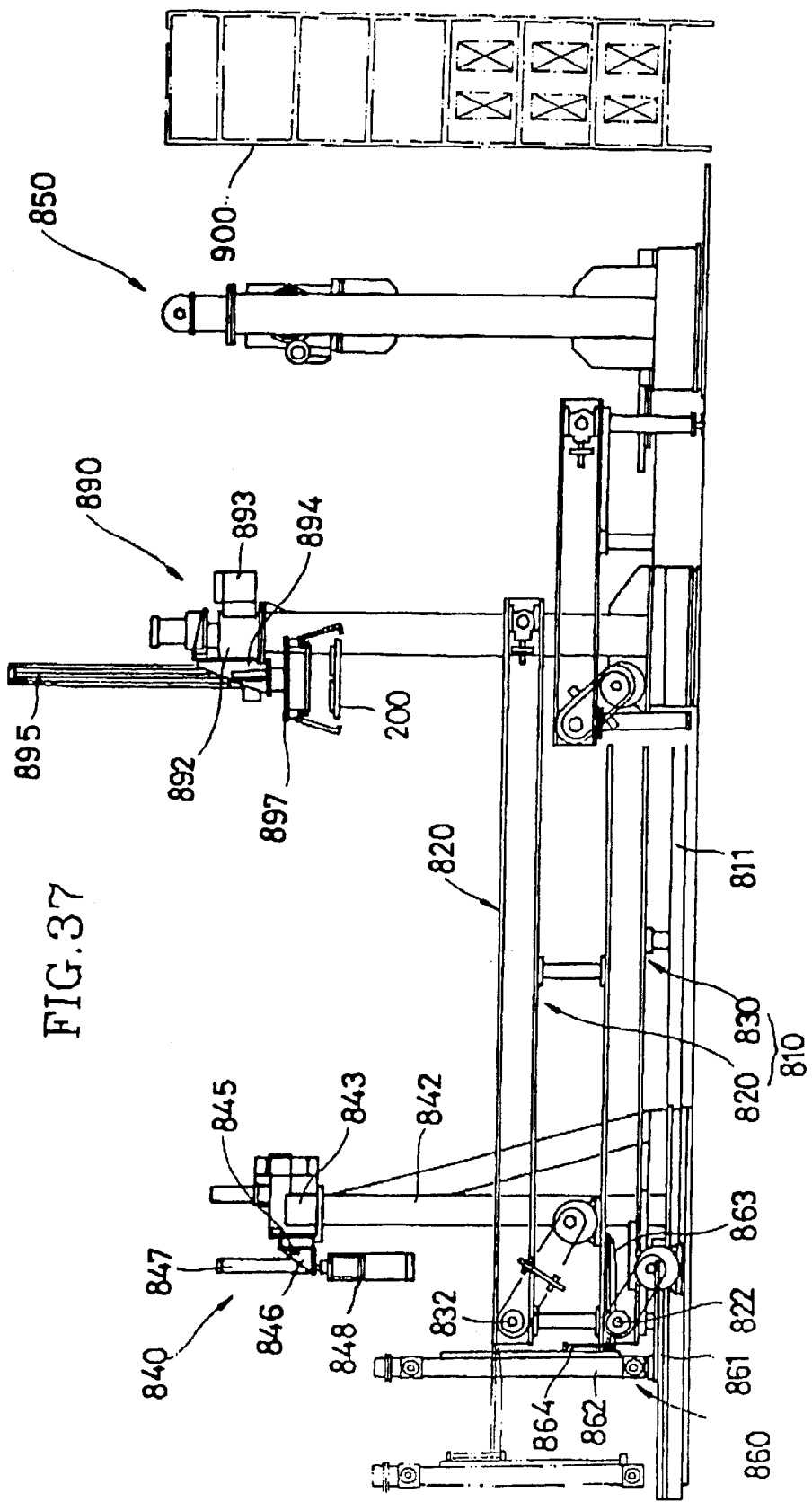
FIG. 37 is a side view of the loading and unloading apparatus of the heat exchanger shown in FIG. 36.
Figure 38:
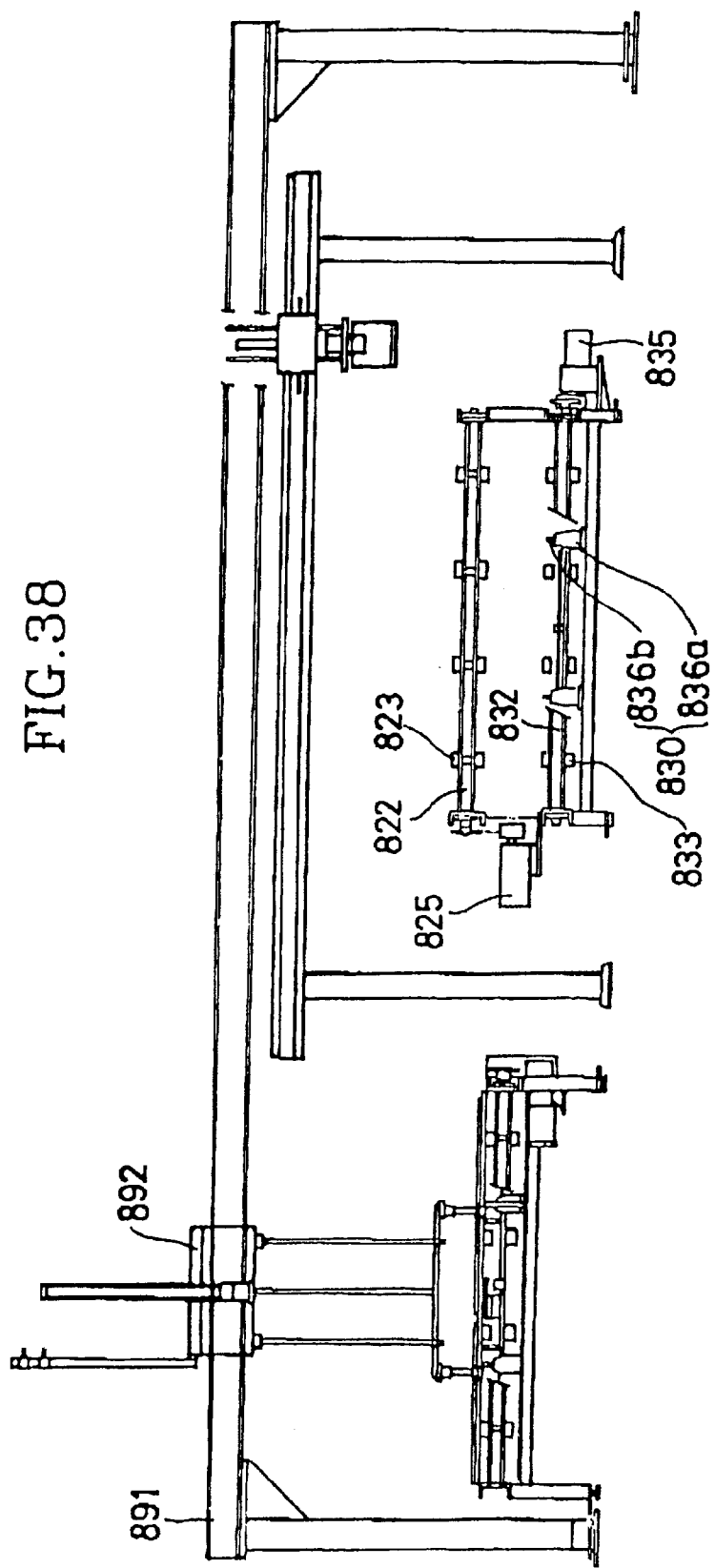
FIG. 38 is a front view of the loading and unloading apparatus of the heat exchanger shown in FIG. 36.
Figure 39:
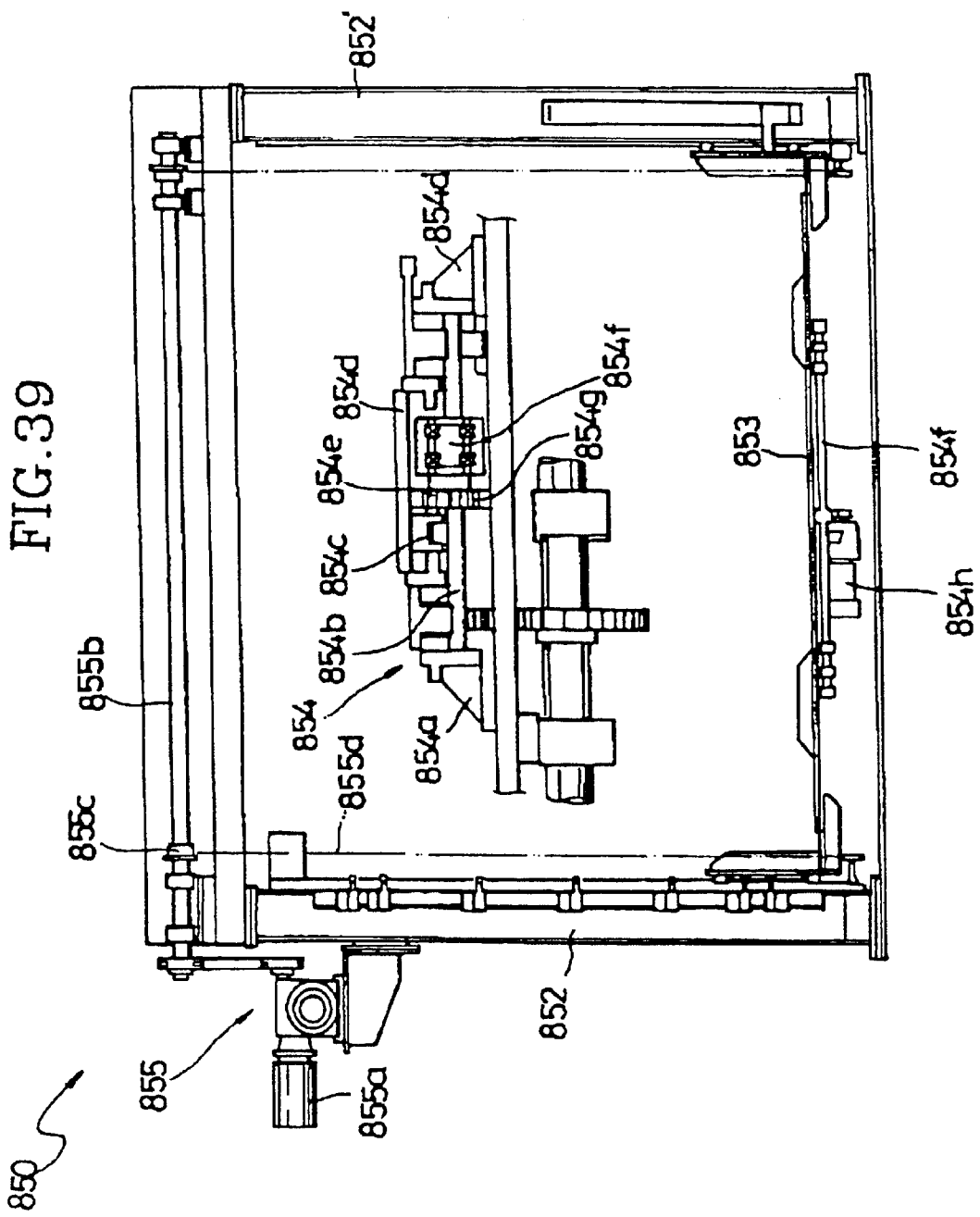
FIG. 39 is a front view of a tray loading device.
Figure 40:
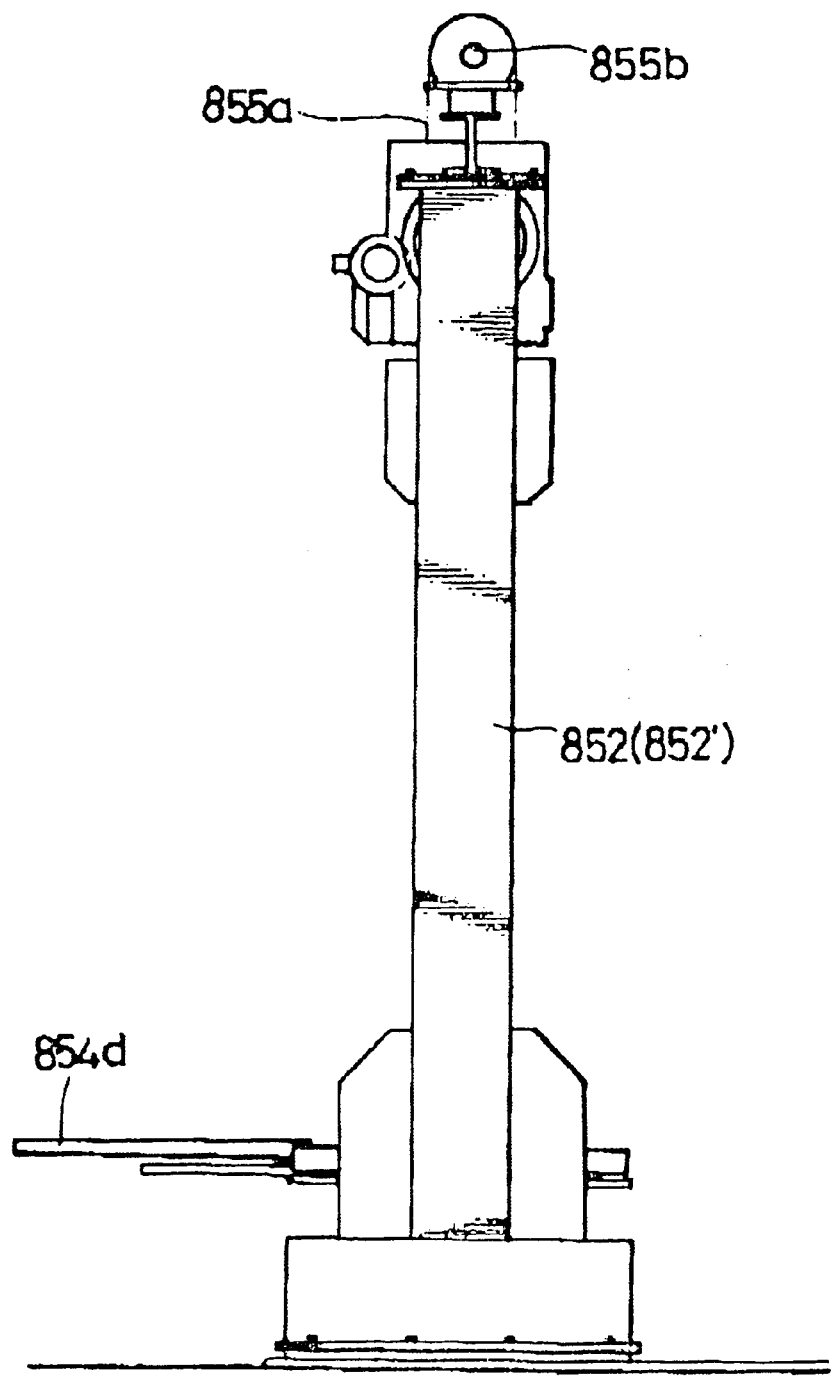
FIG. 40 is a side view of the tray loading device.
Figure 41:
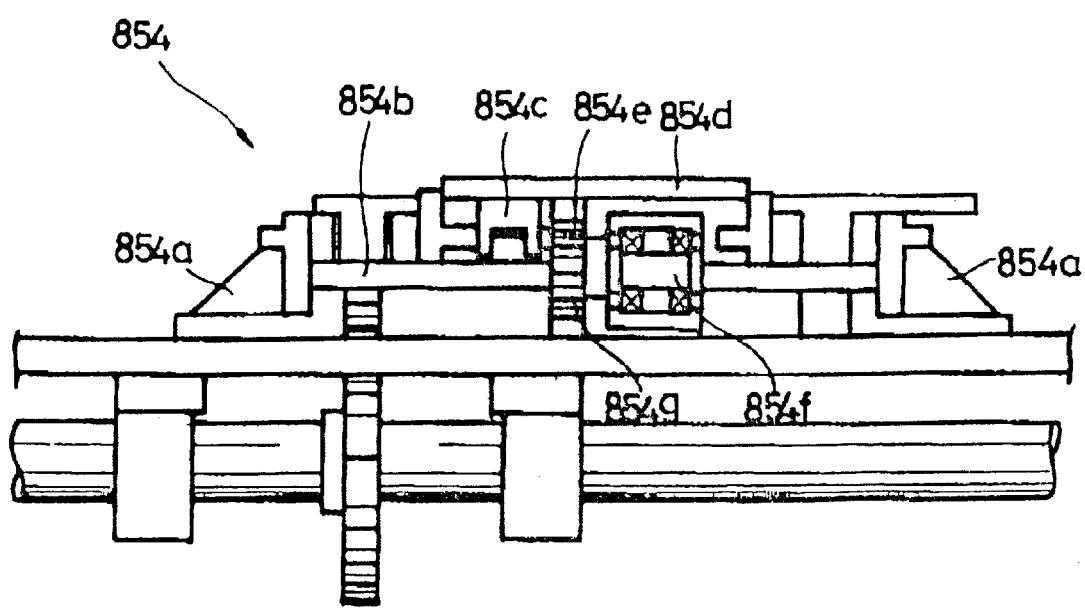
FIG. 41 is a view showing a transfer portion of a tray transfer device, by excerpting the same.

The brazing tray loading device 850 is for stacking the brazing tray 903 loaded with the heat exchanger which is intermittently transferred by the second conveyer 830 on and above the support frame 900 put into the brazing furnace. A preferred embodiment thereof is shown in FIGS. 30 and 33. As shown in the drawings, the brazing tray loading device 850 includes a base 851 installed at the outlet side of the second conveyer 830, left and right arms 852 and 852' installed at both sides of the base 851 and maintaining the same width as that of the second conveyer 830, an elevating plate 853 elevated by being supported at the left and right arms 852 and 852', and a transfer portion 854 installed at the elevating plate 853 for transferring the brazing tray 903. An elevating portion 855 for elevating the elevating plate 853 is installed above the left and right arms 852 and 852'. In the elevating portion 855, a rotation shaft 855b driven by a driving motor 855a is installed at end portions of the left and right arms 852 and 852'. A sprocket 855c is installed at the rotation shaft 855b, to which a chain 855d of which one side is the connected to the elevating plate 853 is coupled.

At least one transfer portion 854, installed at predetermined intervals at the elevating plate 853 elevated by the elevating portion 855, includes a pair of brackets 854a and 854a' separated a predetermined distance, a transfer plate 854b reciprocating along a rail 854c which is installed at a plate member 854b supported by the brackets 854a and 854a', a rack 854e installed on the lower surface of the transfer plate 854b, and a pinion 854g installed on a driving shaft 854d which is installed under the brackets 854a and 854a'. A motor 854h for driving the driving a shaft 854f is installed on the lower surface of the elevating plate 853. The power of the motor 854h is transferred to the driving shaft 854f through a power transfer device. A shaft, a sprocket and a chain, or a shaft and a gear can be used as the power transfer device.

The brazing tray unloading device 870 is for drawing the completely brazed brazing jig 904 from the support frame 900. The brazing tray unloading device 870 has the same structure as that of the brazing tray loading device 850. The third conveyer 880 is for transferring the brazing tray 903 drawn by the brazing tray unloading device 870 to a position for unloading the heat exchanger. As the third conveyer 880 has the same structure as that of the first conveyer 820, a detailed description thereof will be omitted.

The brazing tray transfer device 890 is for transferring the brazing tray 903 transferred by the third conveyer 880 and where unloading of the heat exchanger is completed, to the first conveyer 820. The brazing tray transfer device 890 is installed across the first and third conveyers 820 and 880, and includes a second guide rail 891 supported by a support, a second slider 892 transferred by a rod-less cylinder (not shown) along the second guide rail 891, a second bracket 894 reciprocating back and forth by a reciprocating cylinder 893 supported at the second slider 892, an elevating cylinder installed at the second bracket 895, and a chuck 897 installed at a rod of the elevating cylinder 896 for gripping the brazing tray 903. Here, the third conveyer 880 is further provided with a stopper for stopping transfer of other brazing tray 903 during unloading the brazing jig 904 where the completely brazed heat exchanger is loaded, from the brazing tray 903.

In the operation of the apparatus for assembling a heat exchanger according to the present invention having the above structure, the fin 14 and the molding plate 21*a* formed by the fin molding device 50 and the plate molding device 70, respectively, are supplied toward the fin plate assembling device 100 by the fin transfer conveyer 40 and the plate transfer conveyer 60. When the fin 14 and the molding plate 21*a* are supplied by the respective transfer conveyers, the fin plate assembling device 100 picks and assembles them. The process of assembly is described as follows.

To assembly a fin molding plate in a state in which the fin 14 and the molding plate 21*a* are transferred to both sides of the assembling device by the fin transfer conveyer 40 and the molding plate transfer conveyer 60, the cylinder 186 of the molding plate supply device 180 is operated to locate the slider 183 moving along the rail 182*a* of the rail plate 182 at the upper portion of the molding plate transfer conveyer 60. Under these circumstances, the cylinder 184 is operated to lower the absorbing portions 185 and 185' supported at the connection portion so that the molding plate 21*a* is absorbed by the absorbing pad 185*a* of the absorbing portions 185 and 185'. When the molding plate 21*a* is absorbed by the absorbing pad 185*a*, the cylinder 184 is operated to raise the absorbing portions 185 and 185' and thus the molding plate 21*a* is raised. As the cylinder 186 is operated, the slider 183 is moved toward the guide plate 161 so that the molding plate 21*a* is disposed perpendicularly above the guide plate 161. In a state in which the molding plate 21*a* absorbed by the absorbing portions 185 and 185' by the operation of the cylinder 184 is disposed above the guide plate 161, the vacuous pressure applied to the absorbing pad 185*a* is removed to transfer the molding plate 21*a* onto the upper surface of the guide plate 161 and, by operating the molding plate supply device 180 in the reverse order, the absorbing pad 185*a* is moved to the upper portion of the molding plate transfer conveyer 60.

When the molding plate 21*a* is placed on the guide plate 161, the rod-less cylinder 163 is operated to transfer the transfer pin 162 to the elevating plate 165*a* of the elevating device 165. When the molding plate 21*a* is disposed above the elevating plate 165*a*, the cylinder 165*b* is operated to elevate the elevating plate 165*a* to the same height of the assembly space formed by the rotary plates 124 and 124'. Here, as the motor 125 rotates, the rotary plates 124 and 124' maintain a horizontal state parallel to the molding plate 21*a*. In this state, the cylinder 167*b* of the pusher portion 167 is operated and the pusher is moved toward the rotary assembly. Then, the molding plate 21*a* disposed above the elevating plate 165*a* is inserted into the assembly space. Here, the tank of the molding plate 21*a* is inserted into the tank insertion portion 129. That is, the tank portion is held by being inserted between the tank gripping portion 129*a* and the rotary plate 124 so that the molding plate 21*a* closely contacts the inner surface of the rotary plate 124.

When the insertion of the molding plate into the assembly space is completed, the pusher 167*a* retreats by the operation of the cylinder 167*b* of the pusher portion 167 and the rotary plates 124 and 124' are rotated 180° by the operation of the motor 125. In this state, the molding plate 21*a* is inserted into the assembly space between the rotary plates 124 and 124' in the above-described same method. Here, the molding plate 21*a'* is supported by being inserted into the tank insertion portion 129 corresponding to the molding plate 21*a* earlier supplied with a tank so that the molding plate 21*a'* closely contacts the inner surface of the rotary plate 124' and the molding plates 21*a* and 21*a* are separated a predetermined interval.

When the insertion of the two sheets of the molding plates 21*a* and 21*a'* is completed, the fin feeding device 190 is operated and the fin 14 is supplied between the molding plates 21*a* and 21*a'* which are installed at the rotary plate 124 and 124'. In detail, the fin 14 transferred to the fin transfer conveyer 40 is transferred to the side surface of the elevating plate 191*a* of the elevating device 191 by the operation of the cylinder 195*b* of the second pusher portion 195 and again transferred to the upper surface of the elevating plate 191*a*.

When the supply of the fin 14 to the elevating plate 191*a* is completed, the cylinder 191*b* of the elevating device 191 is operated so that the elevating plate 191*a* where the fin 14 is installed is elevated to the heigh of the assembly space where the two sheets of the molding plates 21*a* and 21*a* are installed. In this state, the cylinder 202 of the fin insertion portion 200 is operated to move the pushing pin 203 toward the rotary assembly portion 120. The fin installed at the elevating plate 191*a* by the movement of the pushing pin 203 is pushed by the pushing pin 203 and inserted between the molding plates 21*a* and 21*a* supported by the rotary plates 124 and 124'. Here, the fin is inserted in a state of being compressed by the pressing plate 212 by the operation of the cylinder 211 of the fin compressing device.

When the insertion of the fin is completed, the motor 125 of the rotary assembly portion 120 is operated to erect the rotary plate 124'. Here, the molding plate and the fin supported at the assembly space between the rotary plates 124 and 124' are prevented from escaping from the assembly space because both end portions of the molding plates are hooked by the inner surface of the rotation space of the guide members 127 and 127' as the both end portions of the rotary plates 124 and 124' are rotated in the rotation space formed by the guide members 127 and 127' supported at the brackets 122 and 122'.

When the rotary plates 124 and 124' are erected vertically so that the molding plate and the fin are erected vertically, the pushing rod 222 is inserted into the assembly space through the opening of the base plate 121 as the cylinder 221 of the drawing device 220 is operated installed at the lower portion of the base plate 121 Then, the fin molding plate is raised and drawn through the drawing holes 127*b* and 127*b'* of the guide members 127 and 127'. The drawn fin molding plate is inserted between the fixed jaw 128*a* and the mobile jaw 128*b* of the gripping portion 128 installed at the guide members 127 and 127' and temporarily gripped.

When the drawing of the fin molding plate assembly is completed, the fin molding plate gripped by the chuck of the discharging device 240 is loaded in the tray 901 supported at the conveyer.

In the process of assembling the fin and molding plate by the fin molding plate assembling device 100, when a material for fin molding suppled to the fin molding device is replaced, the fin is supplied from the fin delay supply device 300 to the fin transfer conveyer. The operation of the fin delay supply device 300 is as follows.

Referring to FIGS. 4 through 10, the fin 14 transferred along the fin transfer conveyer 40 is selectively supplied by the operation of the connection device 302 to the fin supply line 301. Here, the connection device 302 is operated such that the fin 14 transferred along the fin transfer conveyer 40 can be continuously transferred along the fin transfer line 301, or selectively transferred to the fin supply line 301. The fin supplied to the fin supply line 301 is inserted toward the inlet of the loading conveyer 340 and sequentially transferred by the loading conveyer 340 toward the fin loading portion 330.

A predetermined amount of the fin 14 transferred to the outlet side of the loading conveyer 340 is loaded by the fin receiving apparatus 350 in the fin loading portion 330. In detail, as shown in FIGS. 4 and 6, the fin receiving portion 330 includes the receiving case supporter 333 installed at the loading frame 332 and the fin receiving case 330 installed at the receiving case supporter 333 to be capable of sliding and having receiving portions 334a for accommodating a plurality of fins 14. The loading frame 332 where the fin receiving case 330 is installed is intermittently rotated by the driving device 335 and the fin receiving case 334 is sequentially arranged at the outlet side of the loading conveyer 340.

The fin receiving case 334 arranged at the outlet side of the loading conveyer 340, as shown in FIGS. 7 and 8, is moved up and down with respect to the receiving case supporter 333 by the receiving case transfer device 360. The fin 14 transferred by the pushing device 370 to the outlet side of the loading conveyer 340 is sequentially loaded in the fin receiving case 334. By repeating the above steps with respect to the fin receiving cases 334 provided at the fin loading portion 330, a plurality of fins 14 are sequentially loaded.

Figure 9:
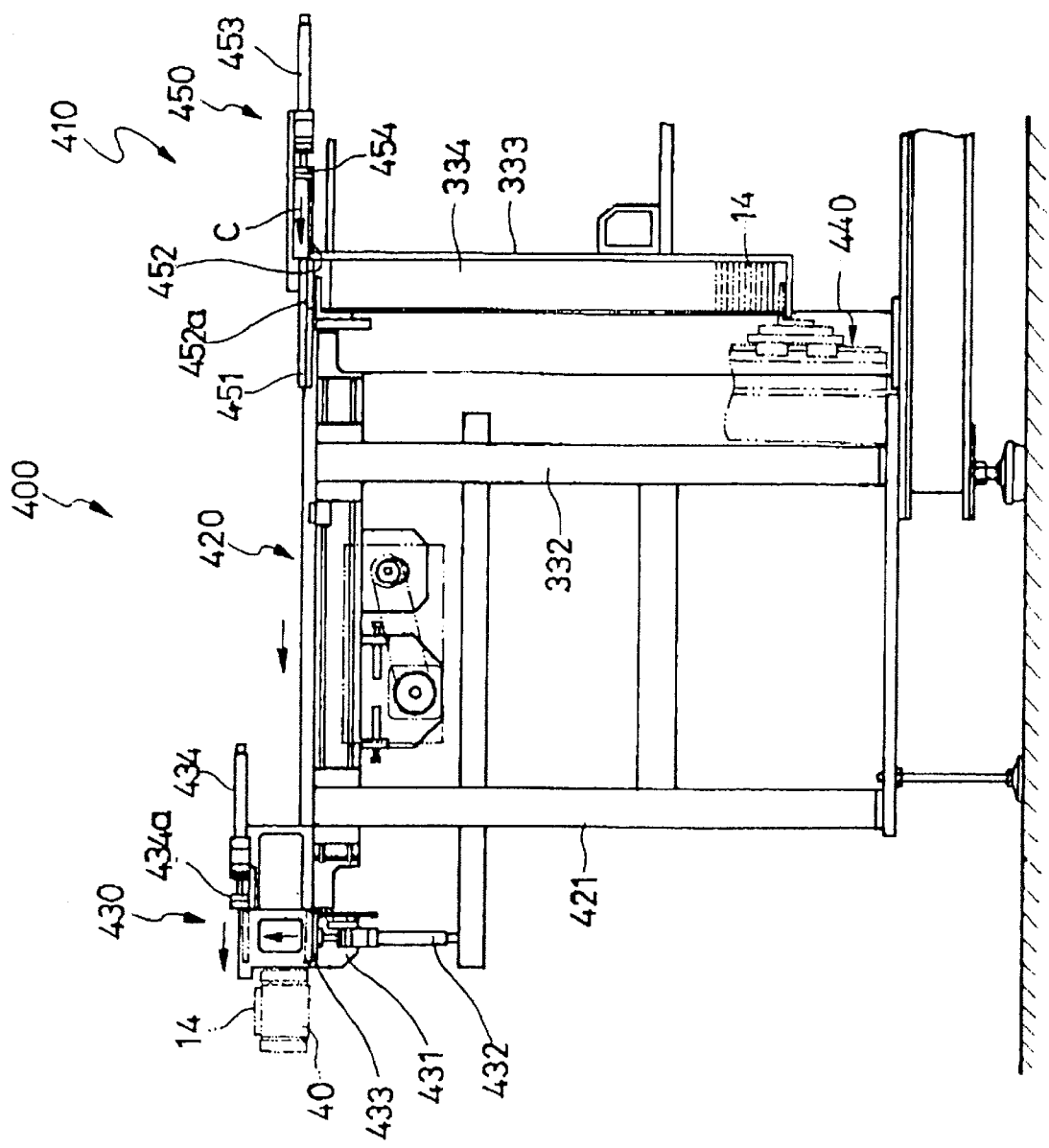
FIGS. 9 and 10 are a side view and a plan view showing a fin supply apparatus, respectively.
Figure 10:
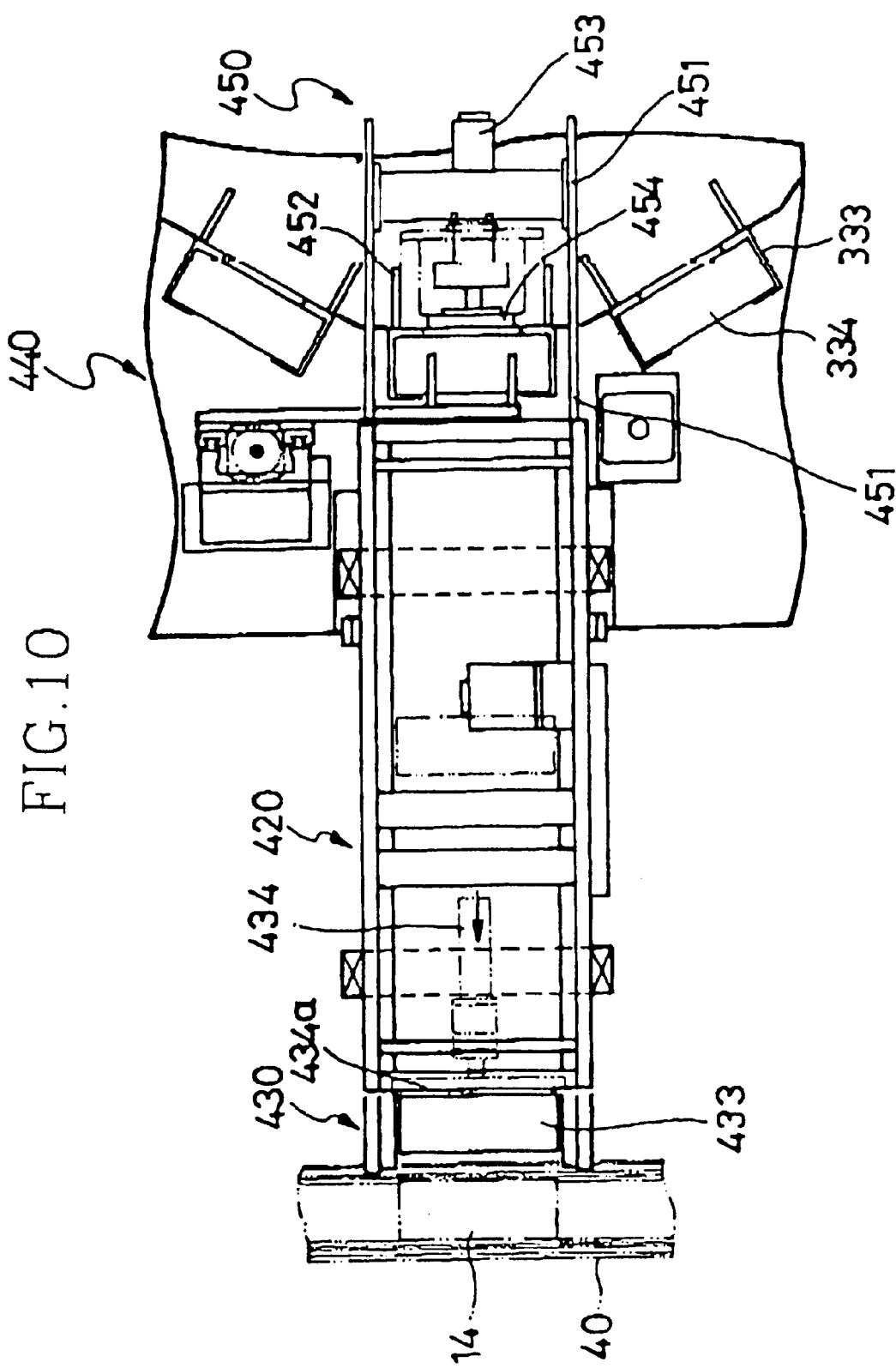

The fin 13 loaded in the fin loading portion 330 is sequentially supplied to the fin transfer conveyer 40 by the fin supply device 400, as necessary. As shown in FIGS. 9 and 10, as the loading portion 330 is rotated, the predetermined fin receiving case 334 is located at the inlet side of the supply conveyer 420. The fin 14 received in the fin receiving case 334 is sequentially discharged toward the inlet side of the supply conveyer 420 by the fin discharging device 410 including the receiving case transfer device 440 and the pushing device 460, disposed at the inlet side of the supply conveyer 420. The fin 14 sequentially transferred to the output side of the supply conveyer 420 is moved onto the fin transfer conveyer 40 by the pushing device 430 provided at the outlet side of the supply conveyer 420.

Also, in the above step of assembling the fin 14 and the molding plate 21a, when a material for fin molding supplied to the plate molding device is replaced, the molding plate is suppled from the plate delay supply device 500 to the molding plate transfer conveyer 60. The operation of the plate delay supply device 500 is as follows.

The molding plate 21a processed by a press (not shown) with a material supplied from a predetermined material roll is automatically supplied by the separation and transfer device, for example, a conveyer device (not shown), and stacked on the plate discharging device 510. When the stacked molding plate 21a is used for replacement of the material or the operation of the press is stopped, due to the interruption of supply of the molding plate 21a, the overall assembly line for assembling the molding plate 21a is temporarily stopped for a while. Thus, when the material is replaced or the press is temporarily stopped, the molding plate supply device 180 automatically supplies the molding plate 21a previously stacked.

The operation of the plate delay supply device is described with reference to FIGS. 13 through 16.

According to the driving of the cylinder 168, the connection rod 617 reciprocates by the cylinder 618. As the connection rod 617 is connected to the first and second roller brackets 611 and 612 where the first lower rollers 614 and 616 are disposed between the first and second lower body portions 521a and 522a of the first and second lower separators 521 and 522 and the third and fourth lower body portions 521a and 522a of the second and third lower separators 521' and 522' of the first accommodating portion 520, and where the second upper rollers 613 and 615 are supported between the first and second upper body portions 523a and 524a of the first and second upper separators 523 and 524 and the third and fourth upper body portions 523a' and 524a' of the third and fourth upper separators 523' and 524', the first and second roller brackets 611 and 612 advance.

When the first and second roller brackets 611 and 612 advance, as shown in FIG. 13, the first rollers 614 and 616 are moved along the inclined surfaces 521d and 522d provided at the first and second body portions 521a and 522a and the third and fourth body portions 521a' and 522a' to separate the first and second lower separators 521 and 522 and the third and fourth lower separators 521' and 522'. Thus, the molding plate 21a supported at the first, second, third and fourth lower protrusions 521c, 522c, 521c' and 522c' of the first, second, third and fourth lower separators 521, 522, 521' and 522' falls onto the molding plate transfer conveyer 60 through the molding plate discharging opening 501a.

In this process, the second upper rollers 613 and 615 are separated from the first and second upper inclined surfaces 523d and 524d provided at the first and second upper body portions 523a and 524a of the first and second upper separators 523 and 524 and the third and fourth inclined surfaces 523d and 524d of the third and fourth upper separators 523' and 524'. Thus, the first and second upper separators 523 and 524 and the third and fourth upper separators 523' and 524' contract by an elastic force of the spring 525 supported at the side plate thereof, so that the molding plate disposed above the molding plate discharged by the first, second, third and fourth upper protrusions 523c, 524c, 523c' and 524c' is supported.

When the first and second roller brackets 611 and 612 retreat by the operation of the cylinder 618, as the first rollers 614 and 616 move along the inclined surfaces 521d and 522d provided at the first and second body portions 521a and 522a and the third and fourth lower body portions 521a' and 522a', the first and second lower separators 521 and 522 and the third and fourth lower separators 521' and 522' contract due to an elastic force of the spring 525. Thus, the first, second, third and fourth upper protrusions 523c, 524c, 523c' and 524c' of the first, second, third and fourth upper separators 523, 524, 523' and 524' is lowered and supported by the first, second, third and fourth lower protrusions 521c, 522c, 521c' and 522c' of the first, second, third and fourth lower separators 521, 522, 521' and 522'.

The molding plate 21a is continuously supplied as the first, second, third and fourth lower separators 521, 522, 521' and 522' and the first, second, third and fourth upper separators 523, 524, 523' and 524' are moved relatively by the operation of the cylinder 618.

When the supply of the fin plate assembly from the fin molding plate assembling device to the tray 901 is completed, the tray 901 is lowered to the main conveyer 30 and transferred to the special plate assembly supply device 87, the end plate assembly supply device 81 and the manifold plate assembly supply device 82. Thus, as the end plate tube assembly 22 and the manifold plate assembly 24 are supplied to the tray 901 so that stacking of the heat exchanger assembly is completed.

When the stacking of the heat exchanger assembly is completed, the assembled heat exchanger assembly 20 is picked from the tray 901 by the manipulator and the picked heat exchanger assembly 20 is aligned by the aligning device (not shown) and loaded in the cleaning tray 902 to be cleaned by the cleaning device 85.

The completely cleaned heat exchanger assembly is loaded by the manipulator in the brazing jig 904 intermittently transferred by the supply conveyer 420 and transferred toward the clamping device 700, and installed at the brazing jig 904 in a state of being pressed to a predetermined pressure.

The operation of the clamping device 700 for clamping the heat exchanger to the brazing jig 904 transferred by the supply conveyer 420 in a pressed state is described as follows.

When the heat exchanger assembly is installed at the brazing jig 904 and transferred by the chain conveyer 710 to be located under the clamping device 700, the cylinder 704a of the elevating portion 704 is operated to raise the tray 901 and fix the position of the tray 901 where the brazing jig 904 is supported. In this state, the cylinders 741 and 742 of the third aligning device 740 is operated so that the brackets 743 and 744 where the front and rear side pressing plates 747 and 748 are installed are lowered and disposed at the front and rear sides of the brazing jig 904. The cylinders 745 and 746 are operated to advance the front and rear side pressing plates 747 and 748 so that the fin 14 of the heat exchanger assembly and the tube assembly supported at the brazing jig 904 are aligned.

When the front and rear alignment of the heat exchanger assembly supported at the brazing jig 904 is completed, the cylinders 741 and 742 are operated to raise the brackets 743 and 744 where the front and rear pressing plates 747 and 748 are installed.

Next, the cylinder 721 of the first aligning device 720 supported at the base plates 701 and 702 advances each support plate 723, and simultaneously, the cylinder 724 supported at the support plate 723 of the first aligning device 720 to allow the pressing plate 725 to closely contact the one side surface of the heat exchanger assembly supported by the brazing jig 904. In this state, the cylinder 731 of the second aligning device 730 is operated to reciprocate each support plate 733 so that the pressing plate 734 supported at the support plate 733 closely contacts and is separated from the one side surface of the heat exchanger assembly supported at the brazing jig 904 to align the heat exchanger assembly. Here, as the surface of the pressing plates 725 and 734 are formed to be uneven in a direction parallel to the molding plate of the heat exchanger, the pressing plates 725 and 734 are disposed between the tube assembly.

When the alignment of the heat exchanger assembly is completed, the pressing plates 725 and 734 are returned to their original positions by the operation of the cylinders 721, 731 and 724 of the first and second aligning devices 720 and 730.

The rotation member 762 is rotated by the operation of the motor 764 of the clamping device 750 to lower the ball screw 763 so that the clamp block 752 presses the combining plate 904b of the brazing jig 904. Here, the pressing force of the combining plate 904b of the clamp block 752 is controlled by the motor 764. In a state in which the heat exchanger assembly 20 is pressed by the combining plate 904b pressed by the clamp block 752, the cylinder 755 is operated to transfer the clamp pads 753 and 754 so that the clamp 904c installed at the combining plate 904b is coupled to the coupling hole 904d of the main body 904a. When the coupling of the clamp 904c is completed, the clamp pads 753 and 754 retreat by the operation of the cylinder 755 and the clamp block 752 is raised by the operation of the motor 764. The tray 901 where the brazing jig 904 is loaded is lowered by the elevating portion 704 and transferred by the chain conveyer 701.

When the installation of the heat exchanger assembly at the brazing jig 904 is completed, the brazing jig 904 is loaded in the brazing tray 903 by the loading and unloading device 800 of the heat exchanger, and simultaneously, the completely brazed heat exchanger is unloaded from the brazing tray 903 and the completed brazed brazing jig 904 is picked from the tray 901.

The operation of the loading and unloading device of the heat exchanger is described as follows.

First, when the brazing tray 903 where the brazing jig 904 is not installed to be brazed is located under the heat exchanger loading device by the first conveyer 820, the rod-less cylinder of the heat exchanger loading device 840 to transfer the slider 844 above the transfer conveyer 841 along the guide rail 843. Here, the chuck 848 is lowered by operating the elevating cylinder 847 so that the brazing jig 904 stacked as by the chuck 848 and supported at the jig is gripped. In this state, the elevating cylinder 847 is operated to raise the brazing jig 904 and simultaneously the slider 844 is transferred above the brazing tray 903 using the rod-less cylinder. Next, the elevating cylinder 847 is operated to load the heat exchanger in the brazing tray 903. When the loading of the brazing jig 904 in the brazing tray 903 is completed, the brazing jig 904 where the heat exchanger is completed stacked is transferred by the lifting device 860 to the second conveyer 830. As the brazing tray 903 is transferred by the lifting device 860, the fork 863 is lowered by the elevating portion 864 in a state in which the frame 862 retreats by the cylinder. The frame 862 advances to locate the brazing tray 903 under brazing ray 903 and the fork 863 is raised by the elevating portion 864 to lift the brazing tray 903. When the frame 862 retreats and the fork 863 is lowered, the frame 862 advances to put the brazing tray 903 on the second conveyer 830.

When the brazing tray 903 where the loading of the heat exchanger is completed is placed on the second conveyer 830, the second conveyer 830 is operated to transfer the brazing ray 903 toward the brazing tray loading device 850. The brazing tray 903 transferred in the above transfer process operates the limit switch 837 installed at the frame 811 to detect the position of the transfer.

When the brazing tray 903 is disposed in front of the brazing tray loading device 850 by the second conveyer 830, the driving motor 854h of the transfer portion 854 installed at the elevating plate 853 is operated to rotate the driving shaft 854f where the pinion 854g engaged with the rack 854e of the transfer plate 854d is installed, and thus the transfer plate 854d is transferred. Here, the transfer plate 854d is disposed under the brazing tray 903 transferred by the second conveyer 830.

In this state, the driving motor 855a of the elevating portion is operated to raise the elevating plate 853 so that the brazing tray 903 supported at the transfer plate 854d is raised. The transfer plate 854d is transferred to the support frame 900 by reversing the motor 854h of the transfer portion 854. By rotating the driving motor 855a of the elevating portion forward or reversely, the brazing tray 903 is placed on the transfer frame. When the brazing tray 903 is completely placed, the driving motor 855a of the elevating portion 855 is reversed to lower the elevating plate, and is simultaneously, by rotating the motor 854h of the transfer portion 854, the transfer plate 854d is transferred toward the second conveyer to repeat the loading of the brazing tray as described above.

When the loading of the brazing tray in the support frame is completed as the above loading work repeats, the support frame is input to the brazing furnace and brazed therein. When the brazing in the brazing furnace is completed, the support frame is drawn from the brazing furnace and transferred toward the brazing tray unloading device 870. The brazing ray 903 is transferred from the support frame 900 to the third conveyer 880 in the reverse order of the operation of the brazing tray loading device 850.

When the brazing tray 903 is transferred by the third conveyer 880 and disposed at the outlet portion thereof, the brazing tray 903 is stopped by the stopper and the completely brazed brazing jig 904 is unloaded manually or by the manipulator from the brazing tray 903.

When the unloading of the heat exchanger is completed, the brazing tray 903 where the heat exchanger is not loaded is transferred by the brazing tray transfer device 890 toward the first conveyer 820. That is, in a state in which the second slider 892 moving along the second guide rail 891 is disposed above the third conveyer 880, the second elevating cylinder 895 is operated to lower the chuck 897 and the brazing tray 903 is gripped by the lowered chuck. When the gripping of the brazing tray 903 is completed, the second elevating cylinder 895 is operated to raise the brazing tray 903 gripped by the chuck and simultaneously the slider is transferred using the rod-less cylinder (not shown) above the first conveyer 820. The chuck is lowered by the operation of the second elevating cylinder and the brazing tray 903 gripped by the chuck 897 is placed on the first conveyer.

The brazing tray placed on the first conveyer 820 is transferred to the front side of the heat exchanger loading device. The brazing jig 904 which is not braze-combined is loaded in the brazing tray 903.

As described above, in the heat exchanger assembling apparatus according to the present invention, as all steps of molding the fin and forming the plate of the heat exchanger, assembling them, and completing the brazing thereof are sequentially performed, the number of steps can be reduced and further improve productivity of manufacturing of the heat exchanger.

It is noted that the present invention is not limited to the preferred embodiment described above, and it is apparent that variations and modifications by those skilled in the art can be effected within the spirit and scope of the present invention defined in the appended claims.

What is claimed is:

1. A heat exchanger assembling apparatus comprising:
   a main conveyer for transferring a tray;
   at least one fin transfer conveyer and one molding plate transfer conveyer, installed at one side of the main conveyer to be parallel thereto and having a predetermined length;
   a plurality of fin plate assembling devices, installed between the fin transfer conveyer and the molding plate transfer conveyer in a lengthwise direction of the main conveyer;
   a fin molding device, connected to the fin transfer conveyer, for molding a fin;
   a plate molding device, installed at one side of the main conveyer, for manufacturing a molding plate and supplying the molding plate to the molding plate transfer conveyer;
   the fin plate assembling devices for assembling fins and molding plates to form fin plate assemblies and supplying the fin assemblies to the tray;
   an end plate assembly supply device, a special plate assembly supply device and a manifold plate assembly supply device, sequentially installed at an outlet portion of the main conveyer, for respectively supplying an end plate assembly, a special plate assembly and a manifold plate assembly to the tray; and
   a picking device, installed at an outlet portion of the main conveyer, for picking a heat exchanger assembly supported at the tray and loading the picked heat exchanger assembly in a cleaning tray.

2. The apparatus as claimed in claim 1, further comprising a molding plate delay supply device for supplying the plate to the plate transfer conveyer.

3. The apparatus as claimed in claim 1, further comprising a fin delay supply device for supplying the fin to the fin transfer conveyer.

4. The apparatus as claimed in claim 1, wherein the fin plate assembly device comprises:
   a frame;
   a rotary assembly, rotatably installed and rotated a predetermined angle by an actuator, for assembling the fin and the plate;
   the fin transfer conveyor and a molding plate transfer device, installed at both sides of the rotary assembly, for intermittently transferring the fin and the molding plate respectively;
   a molding plate insertion device, installed between the rotary assembly and the molding plate transfer device, for inserting the molding plate between rotary plates of the rotary assembly;
   a molding plate supply device, installed between the molding plate transfer device and the molding plate insertion device, for supplying the molding plate transferred by the molding plate transfer device to the molding plate insertion device;
   a fin feeding device for inserting the fin intermittently transferred by the fin transfer device between two sheets of molding plates installed between the rotary plates;
   a drawing device, installed at the frame, for drawing a completed assembled fin plate assembly from the rotary assembly; and
   a discharging device for discharging the fin plate assembly drawn from the rotary assembly.

5. The apparatus as claimed in claim 4, wherein the rotary assembly comprises:
   a base plate installed at the frame and having an opening formed therein;

brackets installed at both end portions of the base plate;

rotary shafts rotatably installed at the brackets;

a pair of rotary plates, both end portions thereof being supported at the rotary shafts, installed to be parallel to each other and forming space where two sheets of molding plates are inserted;

a motor installed at the frame for rotating the rotary shaft at one side thereof; and guide members installed at an inner surface of each of the brackets and forming rotation spaces where end portions of the rotary plates are inserted and rotated, where drawing holes through which the fin plate assembly is drawn are formed perpendicularly above the centers of the rotary shafts and molding plate insertion holes are formed at both sides with respect to the rotational centers of the rotary shafts in the guide members.

6. The apparatus as claimed in claim 5, wherein a tank insertion portion for supporting the molding plate in a horizontal state by inserting a tank portion of the molding plate between the rotary plates is formed.

7. The apparatus as claimed in claim 5, wherein the tank insertion portion comprises:

a tank support portion extended from the rotary shaft at one side toward between the rotary plates for sectioning a portion between the rotary plates into a tank insertion portion of the molding plate; and a protrusion portion protruding from an end portion of the tank support portion toward an inner surface of the molding plate for supporting the molding plate.

8. The apparatus as claimed in claim 4, wherein the molding plate insertion device comprises:

a guide plate installed to be parallel to the side adjacent to the rotary assembly and having a slot formed therein in a lengthwise direction thereof;

a transfer pin sliding along the slot;

a cylinder installed at the lower portion of the guide plate for reciprocating the transfer pin along the slot;

a molding plate elevating device installed at an end portion of the guide plate for transferring the molding plate transferred from the guide plate to the height of the rotational center of a rotary shaft; and a pusher portion installed adjacent to the molding plate elevating device for inserting the molding plate between the rotary plates.

9. The apparatus as claimed in claim 4, wherein the molding plate transfer device comprises:

a support installed at the frame;

a rail plate supported at the support and disposed at the upper portion of the guide plate and the molding plate transfer device, where a rail is formed in a lengthwise direction;

a slider installed at the rail to be capable of sliding;

a plurality of cylinders installed at the slider at predetermined intervals;

an absorbing device installed at an end portion of a rod of the cylinder; and a cylinder installed at the support for reciprocating the slider along the rail.

10. The apparatus as claimed in claim 4, wherein the fin feeding device comprises:

an elevating device installed between the fin transfer conveyer and the rotary assembly;

a pushing portion installed at the fin transfer conveyer for sequentially transferring the fin transferred by the fin transfer conveyer to an elevating plate of the elevating device; and a fin insertion portion for inserting the fin elevated by the elevating device between the molding plates installed in an assembly space.

11. The apparatus as claimed in claim 4, wherein the drawing device comprises:

a cylinder supported at the frame and disposed at the lower portion of the base plate; and a pushing member fixed to a rod of the cylinder and being inserted and drawn between the rotary plates through the opening.

12. The apparatus as claimed in claim 4, wherein the discharging device comprises:

a guide rail installed at the upper portion of the rotary assembly;

a slider moving along the guide rail;

an elevating member installed at the slider to be capable of elevating by a guide rod;

a chuck installed at the elevating member for gripping the fin assembly plate; and a cylinder installed at the slider for elevating the elevating member.

13. The apparatus as claimed in claim 2, wherein the molding plate delay supply device comprises:

a base plate;

a plate discharging apparatus for receiving a predetermined molding plate and stacking the received molding plate on the base plate and discharging the stacked molding plate as necessary; and a driving apparatus for operating the plate discharging apparatus.

14. The apparatus as claimed in claim 13, wherein the plate discharging apparatus comprises:

a first accommodating portion consisting of first and second lower separators and third and fourth lower separators including first and second lower body portions and third and fourth lower body portions installed at both sides of a molding plate discharging opening formed in the base plate, separated a predetermined distance and to be capable of sliding in directions facing each other, and first and second lower arms portions and third and fourth lower arm portions extended from one side of first and second lower body portions and third and fourth lower body portions, where first and second lower protrusions and third and fourth lower protrusions for supporting the edge of one side of the molding plate are formed, in which inclined surfaces are formed at the side surfaces of the first and second lower body portions facing each other and the side surfaces of the third and fourth lower body portions facing each other;

a second accommodating portion, stacked with the first accommodating portion, consisting of first and second upper separators and third and fourth upper separators including first and second upper body portions and third and fourth upper body portions installed to be separated a predetermined distance and to be capable of sliding in directions facing each other, and first and second upper arms portions and third and fourth upper arm portions extended from one side of first and second upper body portions and third and fourth upper body portions, where first and second upper protrusions and third and fourth upper protrusions for supporting the edge of one side of the molding plate are formed, in which inclined surfaces are formed at the side surfaces of the first and second upper body portions facing each other and the side surfaces of the third and fourth upper body portions facing each other;

an upper plate coupled to the base plate by a side plate for guiding the first and second upper separators and the third and fourth upper separators in directions facing each other; and a spring installed at the side plate and the first, second, third and fourth upper and lower body portions.

15. The apparatus as claimed in claim 13, wherein the driving apparatus comprises:

first and second roller brackets guided by first and second guide grooves formed at both sides of the base plate where the first and second accommodating portions are disposed;

first lower rollers installed between the first and second lower body portions and the third and fourth lower body portions of the first and second lower separators and the third and fourth lower separators of the first accommodating portion, installed at an end portion of the first and second roller brackets;

second upper rollers installed between the first and second upper body portions and the third and fourth upper body portions of the first and second upper separators and the third and fourth upper separators of the second accommodating portion;

a connection rod installed between the first and second roller brackets; and a cylinder installed at the base plate for reciprocating a connection rod.

16. The apparatus as claimed in claim 3, wherein the fin delay supply device comprises:

a connection device for selectively connecting a fin supply line with respect to the fin supply line along which the fin is supplied from the fin transfer conveyer and to the fin transfer conveyer;

a fin loading device connected to the connection device;

a loading portion in which the fin loaded by the fin loading device is loaded; and a fin supply device for supplying the loaded fin from the loading portion to the fin transfer conveyer.

17. The apparatus as claimed in claim 16, wherein the fin loading portion comprises:

a loading portion frame rotatably installed with respect to the base plate;

a fin receiving case supported by a plurality of receiving case supporters installed at the loading portion frame; and a loading portion frame driving device for rotating the loading portion frame.

18. The apparatus as claimed in claim 15, wherein the fin loading apparatus comprises:

a loading conveyer connected to the fin supply line;

a fin receiving apparatus installed at an end portion of the loading conveyer for elevating the fin receiving case with respect to the receiving case supporters; and a pushing device installed at an outlet side of the loading conveyer for transferring the fin transferred by the loading conveyer to a receiving portion of the fin receiving case.

19. The apparatus as claimed in claim 16, wherein the fin supply device comprises:

a fin picking device for picking the fin from the receiving portion;

a supply conveyer for transferring the picked fin toward the fin transfer conveyer; and a second pushing device for transferring the fin transferred by the supply conveyer to the transfer conveyer.

20. The apparatus as claimed in claim 16, wherein the connection device comprises a pivot conveyer forming part of the fin transfer conveyer to transfer the fin to the fin transfer conveyer in a horizontal state by being pivoted by a cylinder, and the fin to the fin supply line when pivoted.

21. The apparatus as claimed in claim 1, further comprising a loading and unloading device comprising:

a frame;

a first conveyer installed at the upper portion of the frame for transferring a brazing tray where the heat exchanger is not loaded;

a second conveyer installed at the lower portion of the frame to be parallel to the first conveyer for transferring the brazing tray where the heat exchanger is loaded;

a brazing jig loading device for loading the assembled heat exchange in the tray transferred by the first conveyer;

a lifting device installed at the front side of the frame for transferring the brazing tray completely loaded by the brazing jig loading device; and a brazing tray loading device installed between the frame and a support frame for loading the brazing tray transferred by the second conveyer in the support frame.

22. The apparatus as claimed in claim 21, further comprising an unloading device installed adjacent to the frame for unloading the brazing tray from the support frame drawn from a furnace and a third conveyor for transferring the brazing tray unloaded from the unloading device.

23. The apparatus as claimed in claim 21, wherein the brazing jig loading device comprises:

a guide rail supported by a support between a brazing jig transfer conveyer and the first conveyer;

a slider transferred by a rod-less cylinder along the guide rail;

a bracket reciprocated by a reciprocation cylinder supported by the slider;

an elevating cylinder installed at the bracket; and a chuck installed at a rod of the elevating cylinder.

24. The apparatus as claimed in claim 21, wherein the lifting device comprises:

a rail extended from the lower frame of the first conveyer and the second conveyer;

a frame vertically installed and reciprocating along the rail toward the first and second conveyers;

a fork installed at the frame to be capable of elevating; and an elevating portion for elevating the fork.

25. The apparatus as claimed in claim 21, wherein the brazing tray loading device comprises:

a base installed at an outlet portion of the second conveyer;

left and right arms installed at both sides of the base;

an elevating plate supported at the left and right arms and elevating;

a transfer portion installed at the elevating plate for transferring the brazing tray; and an elevating portion installed at the arm for elevating the elevating plate.

26. The apparatus as claimed in claim 25, wherein the elevating plate comprises:

a rotation shaft driven by a driving motor, installed at an end portion of the left and right arms;

a sprocket installed at the rotation shaft; and a chain having one end thereof connected to the elevating plate.

27. The apparatus as claimed in claim 25, wherein the transfer portion comprises:

a pair of brackets separated a predetermined distance;

a transfer plate reciprocating along a rail installed at a plate member supported by the brackets;

a rack installed at the lower portion of the transfer plate;

a pinion installed at a driving shaft installed at the lower portion of the brackets and engaged with the rack; and a motor installed at the lower surface of the elevating plate for driving the driving shaft.

28. The apparatus as claimed in claim 1, further comprising a clamping device for combining a main body of a brazing jig and a clamping plate so that the heat exchanger assembly loaded in the brazing jig after cleaning is completed is supported in an aligned and pressed state.

29. The apparatus as claimed in claim 28, wherein the clamping device comprises:

a conveyer for transferring the brazing jig installed at the tray;

a base frame installed at both sides of the conveyer;

a tray elevating portion installed between the base frames for elevating the tray where the brazing jig is installed;

first and second aligning devices installed at one side of the base frame for supporting both sides of the heat exchanger assembly supported at the brazing jig;

a support plate supported at the base frame;

a third aligning device installed at the support plate for aligning the front and rear sides of the heat exchanger assembly installed at the brazing jig; and a coupling portion installed at the support plate for pressing the combining plate of the brazing jig and simultaneously sliding a clamp of the clamping plate to be coupled to the main body.

30. The apparatus as claimed in claim 29, wherein the first aligning device comprises:

a cylinder supported at the base frame;

a support plate connected to a rod of the cylinder and installed at a rod supported at the base frame to be capable of sliding;

a cylinder installed at the support plate; and a pressing plate installed at a rod of the cylinder, and the second aligning device comprises:

a cylinder supported at the base frame;

a support plate connected to a rod of the cylinder and installed at a rod supported at the base frame to be capable of sliding; and a pressing plate installed at the support plate.

31. The apparatus as claimed in claim 29, wherein the third aligning device comprises:

a cylinder vertically installed at a support plate corresponding to the front and rear surfaces of the brazing jig;

a bracket vertically extended at a rod of the cylinder where at least one cylinder is installed thereon; and a pressing plate reciprocating by the cylinder installed at the bracket.

32. The apparatus as claimed in claim 29, wherein the surface of the clamping plate is uneven.

33. The apparatus as claimed in claim 29, wherein the clamping device comprises:

a clamp block supported by guide rods installed at the support plate;

a pair of clamp pads installed at the lower surface of the clamp block in direction facing each other to be capable of sliding;

a cylinder installed between the clamp pads; and an elevating portion installed at the support plate for elevating the clamp block.

34. The apparatus as claimed in claim 1, fulther comprising a plate separation device for separating the molding plate supplied from the plate molding device and supplying the separated molding plate to at least two plate transfer conveyers.

35. The apparatus as claimed in claim 34, wherein the molding plate separation device comprises:

a support installed at the fame of the plate transfer conveyers;

a pair of guide rails installed at the support across the plate transfer conveyers and the conveyer disposed between the plate transfer conveyers;

a transfer block installed at each of the guide rails to be capable of sliding;

a cylinder vertically installed at the transfer block;

at least one absorbing member installed at a rod of each cylinder for absorbing the molding plate; and a cylinder installed at the guide rail for transferring the transfer member along the guide rail.

* * * * *